(12) United States Patent
Mohi et al.

(10) Patent No.: US 8,195,200 B2
(45) Date of Patent: Jun. 5, 2012

(54) LOCATING SYSTEM AND METHOD

(75) Inventors: Norman Mohi, New York, NY (US);
Kevin S. Judge, Palos Verdes Estates, CA (US); Richard G. Keegan, Palos Verdes Estates, CA (US); Robert Olivier, Venice, CA (US); James Hume, Rancho Palos Verdes, CA (US); Mark Scislowski, Bellflower, CA (US)

(73) Assignee: Norbelle LLC, New York, NY (US)

( * ) Notice: Subject to any disclaimer, the term of this patent is extended or adjusted under 35 U.S.C. 154(b) by 1632 days.

(21) Appl. No.: 11/417,821

(22) Filed: May 3, 2006

(65) Prior Publication Data

US 2007/0037587 A1 Feb. 15, 2007

Related U.S. Application Data

(63) Continuation-in-part of application No. 10/421,967, filed on Apr. 23, 2003, now Pat. No. 7,474,896, which is a continuation-in-part of application No. 09/899,612, filed on Jul. 5, 2001, now Pat. No. 6,980,813.

(60) Provisional application No. 60/218,454, filed on Jul. 14, 2000.

(51) Int. Cl.
*H04W 24/00* (2009.01)

(52) U.S. Cl. .............. 455/456.5; 455/456.1; 455/456.6
(58) Field of Classification Search ............. 455/456.1, 455/456.6
See application file for complete search history.

(56) References Cited

U.S. PATENT DOCUMENTS

| | | | | |
|---|---|---|---|---|
| 5,610,616 | A * | 3/1997 | Vallot et al. | 342/357.44 |
| 6,163,297 | A * | 12/2000 | Rose | 342/418 |
| 6,166,685 | A * | 12/2000 | Soliman | 342/357.29 |
| 6,549,844 | B1 * | 4/2003 | Egberts | 701/205 |

* cited by examiner

*Primary Examiner* — Lester Kincaid
*Assistant Examiner* — Andy Gu
(74) *Attorney, Agent, or Firm* — Lawrence S. Cohen

(57) ABSTRACT

A mobile rover has a navigation receiver receiving radio positioning data from radio positioning entities. The mobile rover can report its position to a mobile controller unit or another entity so that the location of the mobile unit can be tracked based on the radio positioning data received by the mobile rover. The radio positioning data can be processed by processing systems within the mobile rover, mobile controller, or other entities such as a position determination entity or a position determination entity proxy. The processing systems can also perform calculations to augment the radio positioning data to provide more accurate estimates of the position of the mobile controller and/or the mobile rover. The mobile controller and/or the mobile rover may be cellular telephones within a cellular network.

8 Claims, 36 Drawing Sheets

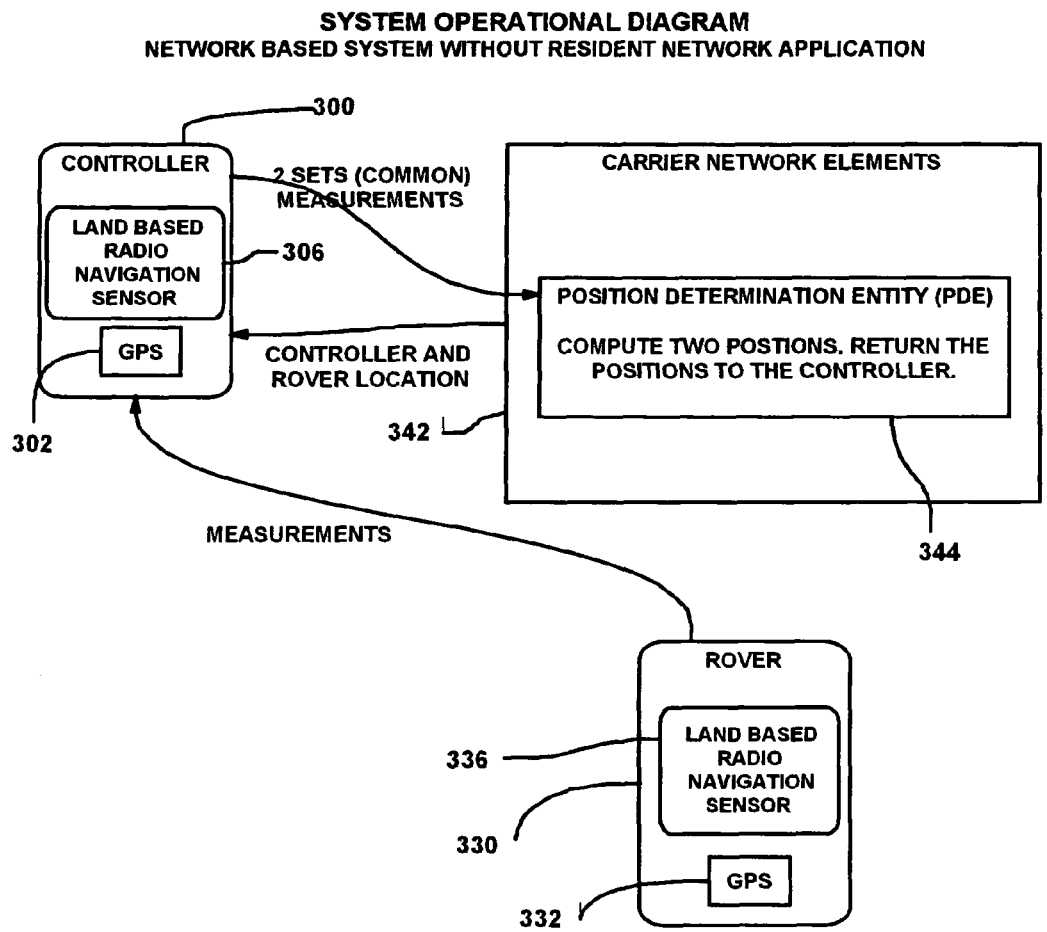
FIG 23a (Option 1)

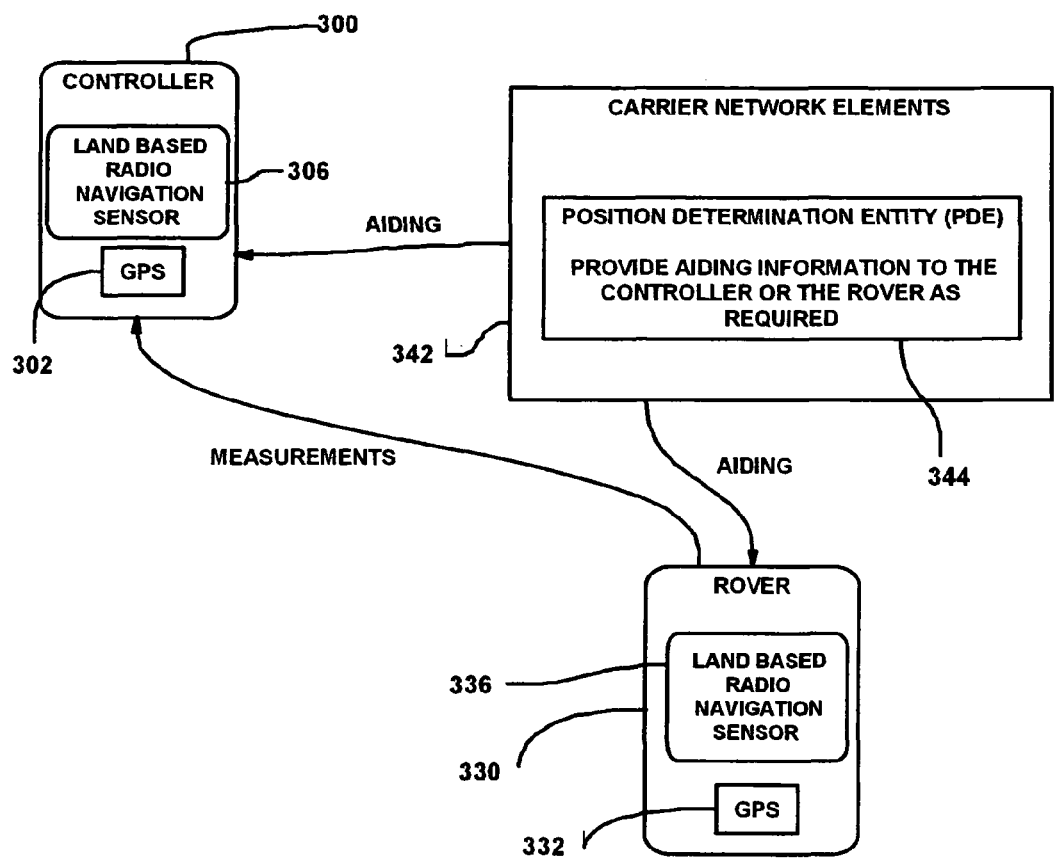
FIG 23b (Option 2)

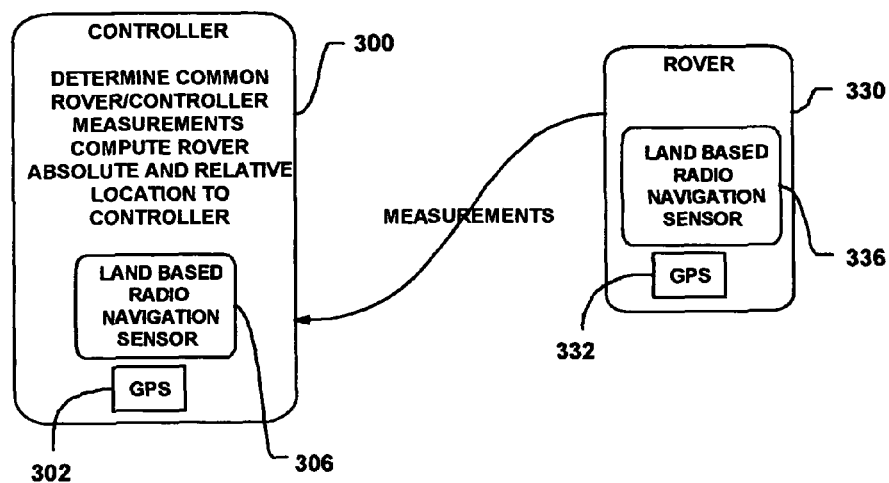
FIG 23c (Option 3)

LOCATING SYSTEM AND METHOD

RELATED APPLICATIONS

This application is a continuation-in-part of and claims the benefit of U.S. patent application Ser. No. 10/421,967 filed on Apr. 23, 2003 U.S. Pat. No. 7,474,896 which is a continuation-in-part of and claims the benefit of U.S. patent application Ser. No. 09/899,612 filed on Jul. 5, 2001 U.S. Pat. No. 6,980,813 which is a non-provisional U.S. patent application of and claims the benefit of U.S. Provisional Application No. 60/218,454 filed on Jul. 14, 2000 that claims priority of that date, the content of all of which are included herein by reference.

FIELD

The invention relates to tracking systems that use a radio positioning system such as the Global Positioning System (GPS) and wireless radio communications such as cellular telephone.

BACKGROUND

There are systems that involve a tracking function performed by a centralized and stationary unit. Examples of such systems are shown in U.S. Pat. Nos. 5,594,425; 5,312,618; and 5,043,736. In the usual case, a target's location information is transmitted to a monitoring station where the information is processed and actions taken accordingly. A variation to this is shown in U.S. Pat. No. 5,389,934 which allows the searcher/controller to be mobile; where in one embodiment the system described is a rover which when called by a telephone would become active, relay a voice description of its location and then become inactive; and another embodiment provides an arrow visual to point in the direction of the target, but does not take advantage of the specific spatial relationship calculations used in the present invention.

Currently there is under consideration and implementation a concept referred to as E911 which contemplates that a cell phone user can make a "911" emergency call and a system will exist with a location technology that will enable locating the cell phone without any need to have the user interact. The location technology, the cell phone network and the cell phone (sometimes referred to as a handset) will enable the cell phone's location to be determined and communicated to a responding emergency service. Numerous location technologies and standards are presently under consideration and implementation in conjunction with wireless networks in general and cellular networks in particular not only for implementation of the E911 capability, but for other purposes as well.

Many papers, announcements and reports describe these location technologies, how they function with wireless networks, in particular cellular networks, their pros and cons, and the ways in which they can provide useful services. A simple Internet search will suffice to find many such publications. Some of them are:

"*Geolocation and Assisted-GPS*", Goran M. Djuknic and Robert E. Richton, a white paper published by Lucent Technologies-this document has a particularly helpful description of the various geolocation technologies;

"*Location Technologies for GSM, GPRS and UTMS Networks*", a White Paper by SnapTrack, A QUALCOMM Company;

"*Geolocation and Assisted-GPS*", by Djuknic and Richton, Bell Laboratories, Lucent Technology published in Computer magazine, February 2001;

"*Assisted GPS: A Low-Infrastructure Approach*", by LaMance, DeSalas and Jarvinen, in GPSWorld, Mar. 1, 2002;

"*An Introduction to SnapTrack Server-Aided GPS Technology*", by Mark Moeglin and Harvey Krasner, published on Aug. 10, 2001 as a White Paper;

"*Satellite-Based Positioning Techniques*", by Jari Syrjarinne, published by Nokia.

"*Hybrid Wireless Assisted GPS Architecture*" a publication by SnapTrack;

"*A Position Determination Service Standard for Analog Systems*" published by TIA/EIA, Jun. 6, 2000 (see also TIA/EIA-553-A);

"*Position Determination Service Standard for Dual Mode Spread Spectrum Systems*" publication of TIA as standard 3GPP2 C.S0022-0-1;

"*High performance wireless location technology*" a news release by TruePosition, Inc.;

"LOCATION TECHNOLOGIES FOR ITS EMERGENCY NOTIFICATION AND E911", By Robert L. French and Clement J. Driscoll a paper prepared for ION National Technical Meeting, Santa Monica Calif., Jan. 22-24, 1996. The content of all of these references is incorporated by reference into this specification.

Also an Internet search for the relevant standards bodies such as TIA's 3GPP (principally dealing with GSM networks) and 3GPP2 (dealing with CDMA networks) will provide information about the process of evolving technical standards. With such helpful descriptive material available it will not be necessary to provide exhaustive descriptions except to the extent necessary to understand the configurations of systems and operation of methods of the present invention.

Some of the location technologies are; Assisted GPS (AGPS), network wireless triangulation using Time Difference of Arrival (TDOA), Advanced Forward Link Trilateration (AFLT), Enhanced Observed Time Difference (EOTD), and/or Angle of Arrival (AOA) as well as hybrid solutions such as AGPS augmented with other location technologies that make use of all available measurements be they satellite or land based signals. For the purposes of this specification and claims the phrase: "land based location technology" or "land-based location technology source" will be used to define any location technology that makes use of measurements obtained from land based transmitters to form a position solution; such as: AFLT, TDOA, EOTD, AOA, or UTDOA. Also, for purposes of this specification and claims, the phrases "satellite based location technology" or "satellite-based location technology source" will be used to define any location technology that makes use of data transmitted from satellites in satellite-based positioning systems to form a position solution. Such satellite-based positioning systems include, but are not limited to: the Global Positioning System (GPS), the Global Navigation Satellite System (GLONASS), and the GALILEO satellite radio navigation system (GALILEO). Further, the phrase "location technology source" as used herein refers to a system utilizing a particular type of location technology. Finally, except if the context clearly indicates otherwise, the words "position" and "location" are used interchangeably and are considered synonymous.

As indicated above, location or position systems may be satellite-based or land-based systems. Typically, these systems comprise one or more location measurement data sources, (for example, radio positioning entities such as satellites, in the case of satellite-based systems, or land-based transmitters, in the case of land-based systems) that provide data which a location subject, that is a unit whose location is being sought (for example, a cell phone with a GPS receiver) uses to make position and other navigation data measurements. Further, although a location subject will receive measurement data needed to determine its position, the calculation of position and other use of the data may be done elsewhere, in which case the location subject may transmit or otherwise relay the measurement data to another location subject or other device or system which will perform the calculations necessary to determine the location of the location subject. Other location measurement data sources may not be radio positioning entities, but may still provide data used to make position and navigation data measurements. Another example of a location measurement data source may be an optical entity that provides position information to a location subject. As used herein, a location technology source comprises one or more location measurement data sources.

Units having a GPS receiving capability may use low cost GPS receiver chipsets that come in two basic architectures. These two types of architectures are generally referred to as a closed-loop receiver architecture and an open-loop receiver architecture. The two types of architectures can be distinguished by the complexity of the architectures and the positioning accuracy provided.

A closed loop receiver is a receiver that creates a complete replica of the received signal through a reconstruction process that is synchronized to the incoming signal through a tracking process. All measurements, both code pseudorange and carrier phase, are made on the reconstructed signal. The tracking process is based upon a coherent comparison (containing both amplitude and phase information) of the reconstructed signal and the receive signal. The basic limitation of a closed loop receiver is the signal level at which the signal can no longer be tracked. For carrier phase tracking, the theoretical threshold for GPS is in the mid twenties in CNo dbHz terms. For carrier frequency tracking, the performance is usually limited by the quality of the GPS reference oscillator, but for most crystal based oscillators this limit falls in the high teens in CNo dbHz terms.

A closed loop receiver produces extremely good measurements, both position (pseudorange) and velocity (carrier). In addition, the pseudorange can be averaged for very long time since all platform dynamics and satellite dynamics can be eliminated by technique referred to as Carrier Aided Smoothing (CAS), since the only non-constant term left in the code tracking result is the ionosphere divergence between code and carrier. Since this divergence occurs very slowly, long averaging times can be applied. Because the pseudorange measurements can be integrated for a very long time, all but the very close in (slowly changing) multipath errors can be reduced significantly.

Closed loop receivers typically achieve relative positioning results, based upon pseudorange measurements, approaching sub-meter performance. The velocity performance, which is based upon the carrier phase measurements, can obtain cm/sec. The obvious limit to closed loop receivers is the tracking thresholds of either the carrier phase-tracking or carrier frequency-tracking loop. The CNo presented above, as tracking thresholds, are typical of a signal obscured by dense foliage or light indoor signal reception, assuming reasonable antenna performance. However, reasonable antenna performance is not necessarily a valid assumption in a cellular handset, where antenna/receiver implementation loss can approach 6-7 dB.

An open loop receiver creates an approximate replica of the received signal, but does not attempt to synchronize this replica through a tracking process. Measurements are based upon power maximization algorithms. The primary process employed by these receivers is one of searching for the satellites in a number of possible time-frequency locations. The pseudorange measurement is derived from the time bin with the maximum power; although some interpolation between adjacent bins containing high-power measurements may be used to refine the estimate of pseudorange. The Doppler measurement is derived from the frequency bin with the largest detected power. The maximum power candidates are produced by coherently integrating the complex signal for maximum of 20 milliseconds, which is the Binary Phase-Shift Keying (BPSK) data rate of the signal and limits the length of coherent integration. Further integration can be performed after the complex signal is turned into a power measurement in order to achieve greater sensitivity; or the ability to discern a signal presence in a time-frequency bin at very low CNo. Many manufacturers of these receiver types claim sensitivity down to the low teens in CNo dbHz terms.

Typically, receivers of this type are designed to achieve an acceptable level of performance and not an optimum level performance. This target has resulted in performance levels inferior to closed loop receivers, even in clear sky, high signal level environments. The goal is to provide a set of measurements that will produce a position solution that achieves the stated requirements of the FCC in the E911 mandate. They are not designed to produce continuous measurements that can be utilized to calculate a robust navigation solution, including not only position but also velocity. Furthermore, since open loop receivers typically produce unrelated measurements, the point solutions derived can be contaminated by anomalous behavior resulting from phenomena like multipath. Without some consistent measurement history, it becomes very difficult to detect such anomalous behavior.

Open loop receivers achieve absolute positioning performance of greater than 10 meters in clear sky environments, and much worse, hundreds of meters, in signal obscured environments like urban canyons. The relative performance of open loop receivers is not much better than the absolute performance, since no averaging of measurements or position is employed. The main advantages of open loop receivers are that the time required to gather a measurement suite is usually shorter than a closed loop receiver and that measurements can be generated at signal levels that cannot be tracked by closed-loop receivers.

Both closed loop and open loop receivers may use the location assistance techniques described above. GPS receivers typically found in cellular handsets are of the open-loop variety, which meet the E911 positioning mandates, but do not provide a high level of position accuracy, especially for receivers in motion.

SUMMARY

The invention resides in a system and method for locating and tracking a mobile rover unit from a mobile controller unit in which the controller and rover are in communication over a communication network and a location technology is used for obtaining and transmitting location related measurement data applicable to computation of the location of the controller and the rover so that the controller can determine the relative spatial position of the rover relative to the controller and the absolute positions of the rover and the controller on a map so that the user of the controller can selectively display the relative spatial position of the rover relative to the controller, preferably displayed as a bearing line from the controller to the rover, or the absolute map position of the rover.

Other information relating to the rover can be determined and provided to the controller including distance from the controller to the rover, the rover's speed, and a history of location of the rover.

The invention further resides in a system and method that can be referred to as autonomous GPS for locating and tracking at least one rover unit from a mobile controller unit, where the mobile controller unit has a radio communication device and a GPS module and the rover has a radio communication device and a GPS module, the controller also having a computer specially programmed to receive GPS position information from the rover unit by way of the radio communication device and using its own GPS module, calculate the relative position and bearing of the rover unit, and using a display on the controller unit showing a relative bearing, distance and altitude difference, or alternatively, map positions of the controller and the rover using available map data. The radio communication module enables the controller and the rover to communicate with each other and is preferably a cellular telephone network. The GPS information sent by the rover to the controller can be in the form of processed map coordinate data such as latitude and longitude or it can be in the form of unprocessed raw measurement data such a pseudorange data. In the preferred embodiment the controller and the rover track the same GPS satellites which enables a high accuracy result for providing the relative spatial positions of the controller and the rover as well as their absolute map positions The invention further resides in forms of the system and method in which location technologies such as land based location technologies or GPS are assisted by network elements that can gather measurement data, perform calculations, provide assistance data to the rover and controller handsets, and send calculated or raw position data to them.

The invention includes features usable in the controller such as showing a history of the position of the rover, showing the height and velocity of the rover and other useful information.

The controller unit allows the user to select from displayed options, a selected rover from a stored directory of rovers to activate a "FIND" process to obtain the selected rover's GPS position relative to the controller's GPS position. Also, the rover unit has a stored history of its positions so that a historical trail of the rover's positions can be sent to the controller and displayed. Also, selective alarms may be programmed from the controller, into the rover or directly into the rover so that when the rover violates the alarm limit, the rover automatically signals the controller and the controller's display shows the rover's relative or absolute position, along with a signal as to the basis for the alarm. Alarms may be spatial such as a boundary or radius passed or may activate at a speed limit, if the rover starts to move faster than the alarm limit. Also, the rover may be equipped with a manually activated alarm to signal the controller.

Thus the invention has as one use for keeping in touch with children, periodically determining a child's location or trail of movement, or alarm limit violation.

While use of GPS is described herein, other radio positioning systems can be used. These include GALILEO, GNSS, LORAN, GLONASS and others.

Further embodiments of the invention include or are used with location technologies that operate in conjunction with cellular networks. Such systems are under development for other purposes such as to implement the E911 requirements; they can be adapted to provide the location information to enable the controller to locate and track the rover including the feature of selectively displaying on the controller display the relative spatial position of the rover to the controller and the absolute positions of the controller and the rover. Usually absolute position will be on a map, but absolute position can be expressed and displayed in other forms such as by giving coordinates, or latitude and longitude, street intersection, address, neighborhood, etc.

In a particular embodiment the invention uses an application server that operates with the communication network and its associated location elements such as a PDE. The primary purpose of the application server is to obtain either directly or indirectly the position measurement data of both the controller and the rover including the source or entity indicators, such as in the case of GPS satellites, the PRN numbers or in the case of land based technologies the transmitting antenna identification. Then, the application server will filter the incoming transmission from the controller and the rover to determine the most common sources of measurement data. Once the most common sources are identified, the positions of the controller and the rover are determined using the most common sources as determined by the application server. Of course complete commonality gives the best result, but this is not always possible, so the application server is programmed not only to specify sufficient numbers of location data sources for proper location calculation but also to use the best selection of commonality.

The invention can be implemented in a service for users whose handsets are appropriately equipped with a specially programmed application server deployed in communication with the communication network being employed. The application server does the filtering to obtain the most commonality of satellites or of ground based sources of measurement data.

Another method for achieving precise relative location of the rover with respect to the controller is to compute relative differential corrections from the measurement taken at the controller and applied to the measurements taken at the rover. This is done by using pseudorange residuals from the measurements taken at the controller to create corrections and then applying the corrections to the rover measurements. The corrections can be generated either within the controller or within the network.

An embodiment of the present invention is a method for determining navigation data for at least one location subject using location measurement data provided by one or more location measurement data sources in which theoretical ranges from the location subject to one or more location measurement data sources are calculated, range related parameters are obtained from the location measurement data sources, augmented ranges are calculated based on the theoretical ranges and the range related parameters, and an updated location is calculated based on the augmented ranges. Another embodiment of the present invention is a system for locating and tracking one or more mobile units in which at least one position processing system is used to calculate a location for at least one mobile unit based on theoretical ranges to location measurement data sources and measured ranges to those location measurement data sources.

An embodiment of the present invention is a method for calculating navigation data for one or more location subjects in which location measurements are obtained and the location measurements are augmented by one of the following steps: normalizing location measurement data to maintain a consistent initial condition for a measurement set, smoothing the location measurement data, and eliminating any location measurement data outside specified limits. The augmented location measurements may then be time aligned and position values for the one or more location subjects may then be determined based on the time aligned location measurements. The position values may be filtered to provide navigation data. Another embodiment of the present invention is a system for locating and tracking one or more mobile units, operable with a wireless communication network, where at least one position processing system receives location measurement data, performs calculations to augment the location measurement data, determines expected position values, and calculates navigation data for at least one mobile unit based on the expected position values.

An embodiment of the present invention is a method for providing improved pseudorange values to a location subject using pseudorange data provided by a plurality of location technology entities of a least one location technology source, the method comprising steps of: (a) obtaining pseudorange data from each location technology source; (b) establishing a position for the location subject; (c) determining a theoretical range between the position of the location subject and each location technology source; (c) calculating a plurality of range residuals, each range residual being calculated for each location technology entity based on a difference between the theoretical range to the location technology entity and the pseudorange data obtained from the location technology source; (d) calculating a residual mean and a residual sigma for the plurality of range residuals; (e) establish a threshold value based on the residual sigma; (f) determine if a difference between the range residual for any one location technology entity and the residual mean is greater than the threshold; (g) if there is no difference greater than the threshold, calculate an improved pseudorange value for each location technology entity by subtracting the residual mean from the pseudorange data obtained from that location technology entity; (h) if there is a difference greater than the threshold, determine if valid pseudorange data has been obtained from enough location technology entities to establish a position; (i) if valid pseudorange data has been obtained from enough location technology entities, calculate an improved pseudorange value for each location technology entity which has a difference less than or equal the threshold by subtracting the residual mean from the pseudorange data obtained from that location technology entity; and (j) if valid pseudorange data has not been obtained from enough location technology entities; repeat steps (a) through (j).

An embodiment of the present invention is system for locating and tracking one or more mobile units, in which the system has a position determination entity, where the position determination entity receives navigation messages from at least one mobile device and sends navigation messages to the mobile device; and the system has a position determination entity proxy that extracts and saves some or all information from navigation messages sent from the mobile device to the position determination entity and/or extracts some or all information from navigation messages sent from the position determination entity to mobile device. Another embodiment of the present invention is a method in which navigation data is sent to a position determination entity and a portion of the navigation data is extracted by a position determination entity proxy.

An embodiment of the present invention is a system for locating on demand a mobile rover unit having a controller processing system that obtains controller position data from a controller location data receiver to calculate a present controller heading of a mobile controller and the controller processing system processes controller position data, the present controller heading, and rover position data to display a bearing line relative to the rover relative to the controller heading and position on the controller display, and wherein the controller processing system compares the present controller heading to one or more previous controller headings to determine if the present controller heading is valid. Another embodiment of the present invention is a system having a processing system operable to obtain controller position data from a controller location data receiver to calculate a present controller heading of a mobile controller and the processing system processes the controller position data, the present controller heading, and rover position data to calculate a bearing to the rover relative to the present controller heading and position, where the processing system compares the present controller heading to one or more previous controller headings to determine if the present controller heading is valid. Another embodiment of the present invention is a method for determining if a heading value for a first moving unit receiving navigation updates is valid by comparing a current heading with one or more previous headings to determine if one or more differences between the current heading and the one or more previous headings are less than defined angular thresholds.

An embodiment of the present invention is a system for locating a mobile rover unit relative to a mobile controller unit where a user establishes a geographic zone for a rover and a controller processing system and/or a rover processing system perform calculations to determine whether the rover is inside or outside a geographic zone. Another embodiment of the present invention is a method for reporting the location of a mobile device where calculations are performed to determine whether the mobile device is inside or outside a geographic zone.

BRIEF DESCRIPTION OF DRAWINGS

FIG. 23a (option 1) is a system operation diagram.
FIG. 23b (option 2) is a system operation diagram.
FIG. 23c (option 3) is a system operation diagram.
FIG. 24b shows the message flow through the system depicted in FIG. 24a.

FIG. 32A shows a simplified screen for selecting a device to be tracked.

DETAILED DESCRIPTION

Figure 1:
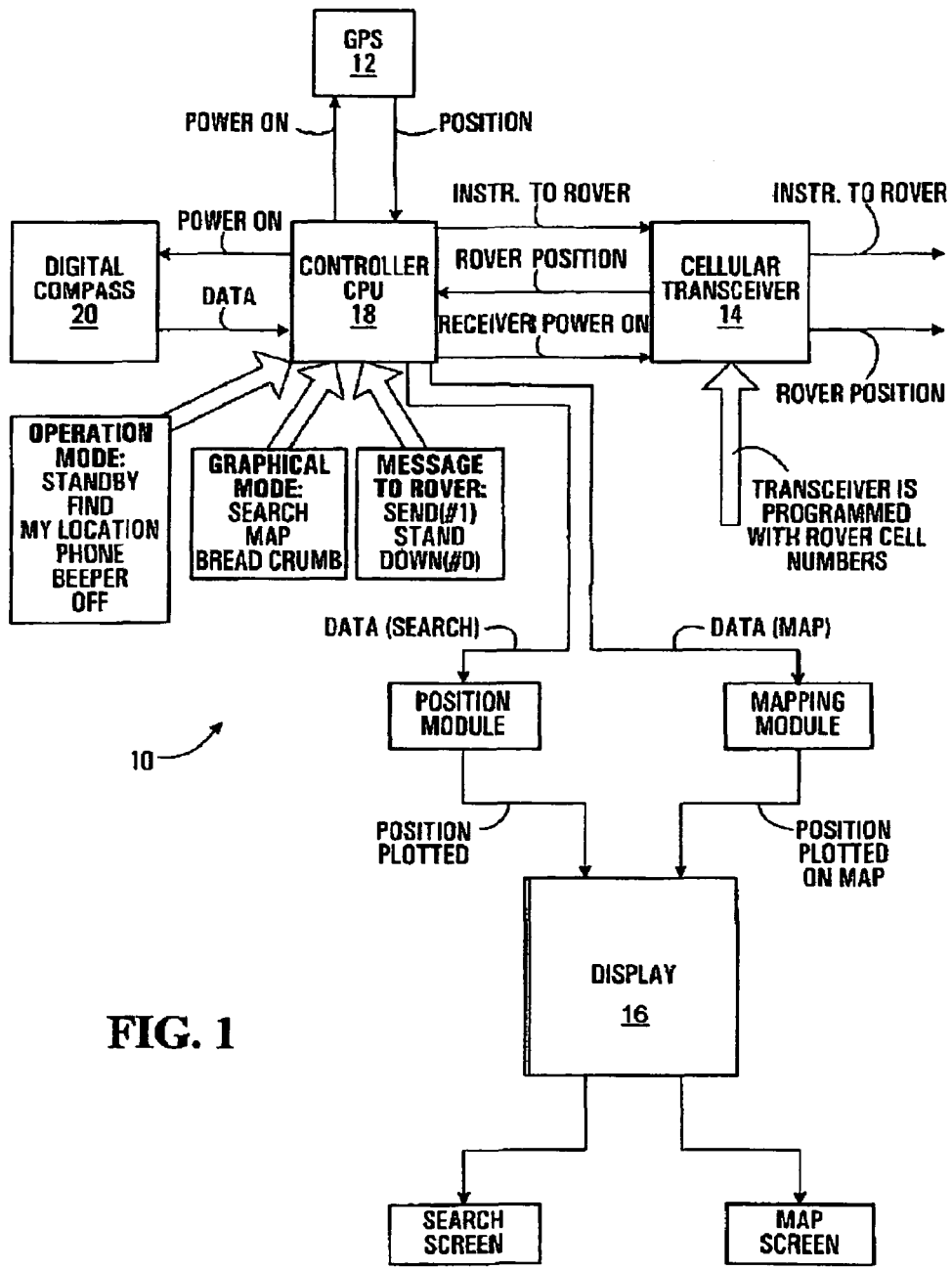
FIG. 1 shows a controller unit operational diagram.

The method and apparatus of the present invention is intended, as a primary application, to enable a person to find a valuable asset that could be a person, upon command and to high precision. An exemplary purpose is such as to enable a parent to find a child.

An embodiment of the present invention is a system that comprises a personal hand held unit, generally referred to herein as a controller, and a small, compact, and optionally concealable unit, generally referred to herein as a rover or tag. Each controller unit gives the user the ability to ascertain the precise location of one or more rover units. In addition to all the functions and features of the system as described herein, the system is unique in that each controller unit is a self contained, mobile unit that can provide to the user all the real-time information necessary to locate and find any rover. While this detailed description explains the process of a controller finding a rover, the system can also support a controller finding one or more other controllers.

For purposes of this specification and for interpreting the claims the following definitions are adopted.

A controller or controller unit is a device, which may be a handset, that is configured to display or otherwise indicate the location or presence of other devices through the use of location technology source data. The terms controller and controller unit are respectively used herein interchangeably and no distinction is intended.

A rover or rover unit is a mobile device, which may be a handset, that is adapted to have its location displayed on or otherwise available to a controller for the purpose of the controller user being able to find and track it along with the other features described between a controller and a rover, although not all features need be present in order that a device be considered to be a rover. The terms rover and rover unit are respectively used herein interchangeably and no distinction is intended. A rover may be a device designated or considered to be a controller. Therefore a rover refers to the capability of the device to serve the functions defined herein for a rover regardless of any other functions or designation. Therefore, the term "rover" as used herein means a handset that functions as a rover, which can include a device equipped solely as a rover or a device equipped to function both as a controller and a rover, unless the context requires otherwise.

The term "tag" generally refers to a device that may have its location determined by a controller using the apparatus or methods described herein. For example, a tag may be a rover equipped for use as a cell phone or a tag may be a device that functions solely to have its location determined by a controller.

A device described herein whose location is to be determined may also be referred to generally as a "location subject." Consequently, the more general term "location subject" refers to controllers, rovers, and tags. As will be explained, the location of a location subject is determined through the use of location measurement data from a location technology source.

The terms "position" and "location" are used interchangeably unless the context indicates otherwise.

The term "absolute location" is understood in the field to refer to a location in a coordinate system, the most common being latitude and longitude in a map system.

The term "heading" is well understood in the field. A GPS receiver can determine its heading by obtaining a plurality of fixes while moving. In this description the controller is in some embodiments equipped with a compass to determine heading. In the context of use of GPS it is preferred to use GPS information to obtain heading because in general it is a more accurate measurement instrument for that attribute. The GPS heading can be used to calibrate an on-board compass.

The phrase "relative spatial position to the rover relative to the controller" and phrases of like meaning mean relative position of the rover relative to the position and heading of the controller.

The terms "controller," "rover," "tag," "location device," "location sensor," and "location subject" all refer to a unit whose location is the subject of determination. Such a unit, in most systems, has a one or more receivers of signals that will be processed to establish position of the unit (the unit itself may also be referred to as a location receiver). Such a unit may also be a transmitter of signals in a system employing uplink signals for obtaining position.

As discussed above, "location technology source" refers to a system using a particular type of location technology. The term "location measurement data sources" refers to the entities within a particular location technology source transmitting electromagnetic signals that may be used to determine the location of a location subject. The term "location measurement data" refers to the data within the electromagnetic signals from one or more of the location measurement data sources used for location determination. The receiver of the electromagnetic signals is generally referred to herein as the "location data receiver."

The location measurement data may comprise a "range related parameter" that is related to the range between a location subject and a location measurement data source. For example, a range related parameter for a GPS-enabled location subject is pseudorange.

The terms "navigation data," "navigation information" or "navigation messages" generally refer to information containing any data that may be related to the position, speed, heading, location, acceleration, orientation or other such navigational parameters of a location subject or parameters related to the location technology source providing location measurement data to the location subject.

The term "position processing system" generally refers to hardware or software or some combination thereof that operates on location measurement data and/or navigation data to calculate location related results.

The terms "absolute navigation" or "absolute navigation data" generally refer to a determination of a location of a location subject based solely on location measurement data received by that location subject.

The terms "relative navigation" or "relative navigation data" generally refer to a determination of a location of a location subject based, in part, on location measurement data received by another location subject.

Other definitions contained in this description are apparent from their contextual presentation.

The controller unit comprises several primary sub-components including a radio communication module such as a cellular telephone module, a radio positioning receiver/processor module such as a GPS receiver/processor module, an electronic compass (the term "electronic compass" or "digital compass" refers to the use of binary electronics to provide the compass reading data), a display, a computer and associated electronics to operate it. The controller provides three distinct and interactive and useful functions. First, the controller unit is a fully functional cellular telephone with all the typical functions and features. Second, the controller unit can display its own position and the position of a rover unit on a street map. Third, the controller unit provides the relative spatial location (position) of any rover displaying a bearing arrow and distance. Relative spatial position or relationship of a rover to a controller means the bearing of the rover relative to the position and heading of the controller. Other information can also be displayed on the controller such as the rover's speed, the rover's height relative to the controller, and a trail of prior positions of the rover.

To operate the system as a locator for a rover, the user selects the FIND feature on the controller screen. The screen displays all the pre-programmed rover names and location addresses such as cellular telephone numbers. The user selects a specific desired rover and touches GO on the interactive screen. The controller unit opens communication with the rover unit by cellular telephone. Using each unit's GPS or other location technology module, the controller unit determines its relative spatial relationship with the rover. In one display mode, the controller unit displays the rover unit's location on a street level map, which is capable of zooming and scrolling. Through continuing data from the rover unit, the rover unit's position is tracked on the map as GPS information is sent from the rover unit to the controller unit. In another display, the bearing of the rover unit relative to the location and heading of the controller is displayed as an arrow accompanied by information. In order to obtain use of this arrow feature, a heading for the controller unit has to be established. Heading can be established on an initiation basis by use of a compass without movement. Also, as is well known, GPS can only provide heading when the receiver is moving. The arrow displays the bearing of the rover relative to the controller taking into account the location of the rover unit, the location of the controller unit, and the heading of the controller unit based on its GPS or other location sensor data and optional digital compass data. The information displayed along with the arrow preferably includes controller unit to rover unit distance, rover unit velocity, rover unit height relative to the controller unit, the time at which the rover unit's data was ascertained and the rover unit's coordinate system location such as latitude, longitude and elevation. The arrow display is used primarily when the controller unit and the rover unit are relatively close, such as in a neighborhood, where a directional arrow is useful for the controller unit user. To implement these displays, the controller unit receives GPS data which makes it possible to determine the relative spatial relationship of the controller unit and the rover unit to high precision, as good as 1 meter accuracy. In order to achieve this precise relative spatial relationship, the rover unit and the controller unit gather and share GPS measurements of pseudorange and carrier phase or only pseudorange measurements from the same GPS satellites. Much of the error in GPS positioning occurs due to errors that are common to the two receivers making measurements close in time and space. Therefore, having knowledge of the two receiver's GPS measurements allows for removal of the common errors and consequently, a precise calculation of the relative spatial orientation of the two units as well as good knowledge of the units' absolute position. Optionally, the bearing and distance information can be presented in an audible fashion.

The methods and apparatus to obtain the high precision relative position between the rover unit and the mobile controller unit may be implemented using known techniques. When the rover and controller are fairly close together, their satellite suite reception is likely to have great overlap, perhaps even complete commonality. As they are more separated the commonality may decrease. In use, the preferred method is that the controller will query the rover to have the rover send to the controller time tagged pseudorange and carrier phase measurement or only pseudorange measurements on a per satellite basis, and the controller will only use the information from those satellites which it is commonly tracking. The information will be used in the controller unit to compute a precise directed distance between the controller and the rover. This information can be displayed on a map on the controller as two points or location indicators, one for the controller and one for the rover. Also, the rover can be tracked by time-sequenced positions that can be derived from prior information stored in the rover.

An optional procedure would be that the controller asks the rover to send data only for a specified subset of satellites such as all or some of those, which are being tracked by the controller.

Another optional procedure would be that the controller sends its satellite suite information to the rover and the rover does the computation and sends back its calculated position using only the common satellites.

A further option would be that the controller tells the rover which satellites it is tracking and the rover sends back information from the four common satellites with the best Geometric Dilution of Precision (GDOP).

In another embodiment, the controller unit can be sent historical GPS information for the rover unit, which can be displayed as a series of points on the display map or using the controller unit position as a series of points relative to the controller unit to show a trail of travel of the rover over time both historically and contemporaneously, while being displayed.

Another feature is that the controller unit can activate an audible alarm or chime on the rover unit to facilitate finding the rover audibly.

In another feature, preselected limits or boundary conditions set for the rover unit which when the limit or boundary condition is violated or exceeded can self-activate a communication to the controller unit and an alarm signal and automatically display the relative spatial relationship or map relationship between the controller unit and the rover unit. As a cellular telephone, the controller unit can establish voice communication with the rover unit.

Should the controller unit not have the necessary map data for the current positions of the controller unit and the rover unit, it can access a central database via a cellular radio link and download the necessary map data and then resume tracking of the rover unit. Also a normally active alarm condition can activate the system to find the rover on the controller unit.

In the exemplary application, a parent is in possession of a controller unit while a rover unit is in the possession of a child. As described below, the person operating the controller unit can find the rover unit and sees on the display the relative spatial location (position) or the absolute map location of the rover unit. Other capabilities are also available, as described below.

It is contemplated in the exemplary application that a parent or equivalent will be in possession of a controller unit, and rover units will be in the possession of one or more children. The rover units can be very small, and are preferably concealed, as it is a purpose of the invention to allow locating of the child even in the event of foul play, although much of its use contemplates merely checking up on the child, or finding a lost child.

To be operable at least one controller unit and at least one rover unit is needed. There may be a plurality of controller units, such as for two or more persons who desire to track rover units. There will be as many rover units as needed for the persons to be tracked, such as one or more children. Each controller unit can track all of the rover units, or if desired only selected rover units. A set-up procedure is implemented in which the cellular numbers of each rover unit are programmed into the controller unit, along with an identity code, for establishing contact between the controller unit and the rover unit. The contact may be established, for example, by having the controller automatically dialing the rover. However, other mechanisms may be used to establish contact between the controller and the rover. Also, each rover unit is programmed for contacting the controller unit, or if there are more than one controller units, for contacting the multiple controller units selectively or automatically in a selected order or simultaneously. The rover may establish contact with the controller, for example, by dialing the controller unit. Again, other mechanisms may be used to establish contact between the rover and the controller. Notably, the basic system does not need any steps to be taken at the rover unit to operate the system (except in the case of the "alarm" procedure which will be explained). Therefore, the cellular transceiver of the rover unit is activated by commands from the cellular transceiver of the controller unit.

Figure 2:
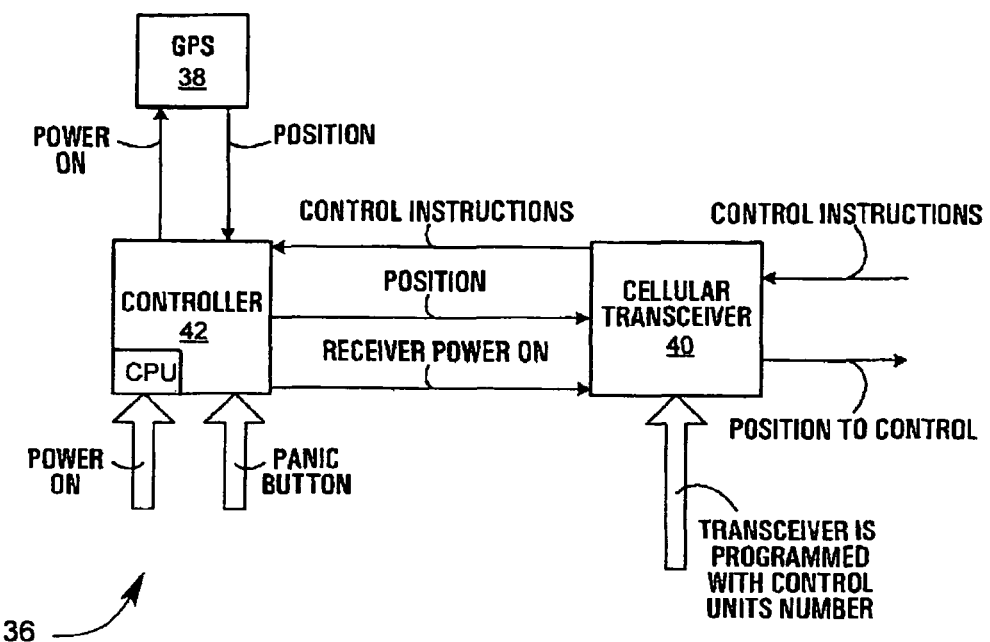
FIG. 2 shows the rover unit operational diagram.

FIGS. 1 and 2 show general block diagrams for the controller and the rover unit modules and their interrelationship. The controller unit 10 has a GPS receiver module 12, a cellular transceiver module 14, a display module 16 and control electronics module including a specially programmed CPU 18. The control electronics module may optionally include a digital compass 20. The digital compass 20 comprises a device that determines the orientation of the controller unit in relation to magnetic or geographic North. The digital compass 20 may comprise a device simply providing magnetic compass data in a digital form or a more complex processing technology calculating and providing orientation data. The display 16 is preferably an interactive display such that various command options can be displayed and activated by touching the display screen. In a non-interactive display command options can be actuated by conventional button operation. Software modules include the Operation Mode Module 22, the Graphical Mode Module 24, and the Message To Rover Module 26. Outputs of the CPU 18 include the Position Module 28, which operates the Search Screen Module 30, and the Mapping Module 32, which operates the Map Screen Module 34.

The rover unit 36 has a GPS receiver 38, a cellular transceiver 40, and a control electronics module 42 including a specially programmed CPU. Use of the apparatus and method is best understood with reference to the flow diagrams of FIGS. 3-11 as well as the screen diagrams of FIGS. 12-15.

Figure 3:
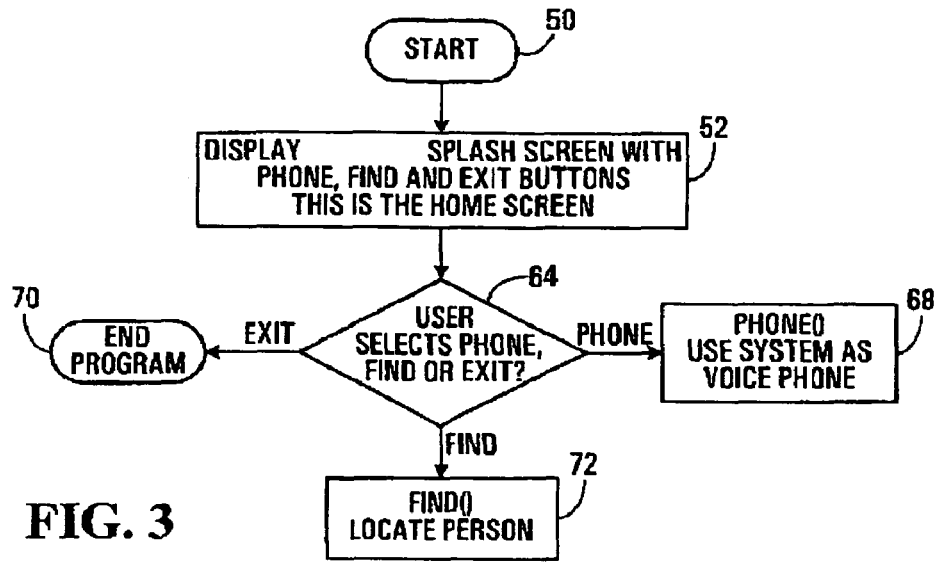
FIG. 3 is a flow chart of the controller start procedure.

Referring to FIG. 3, the controller unit is activated by a power-on step indicated as START 50. This initiates the step 52 of causing the display to open. As shown on FIG. 12, this display, called the home screen 54, has buttons for PHONE 56, FIND 58, EXIT 60, and HOME 62 (which is preferably muted on the home screen 54). The user selects one of these as at step 64 on FIG. 3. PHONE selection allows use as at 68 as a conventional voice cell phone between the controller unit and a selected rover unit or as a general use cellular phone. EXIT selection turns off the controller unit as at 70. FIND selection begins the find procedure as at 72.

Figure 4:
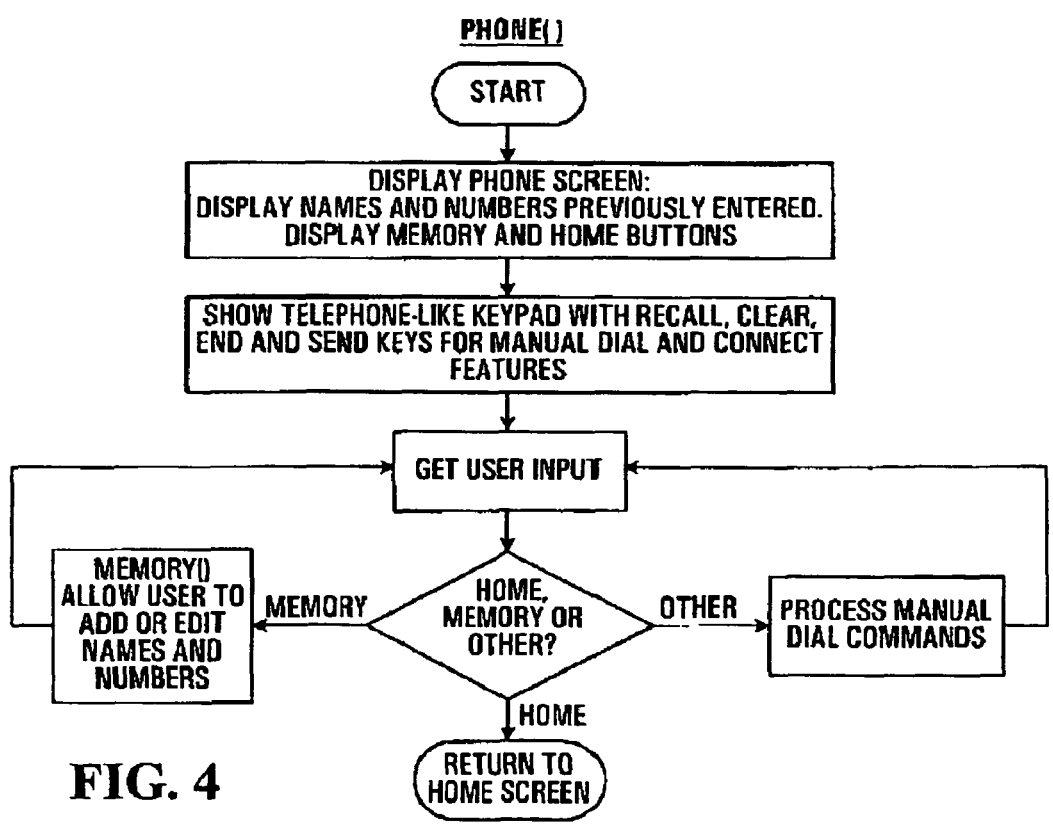
FIG. 4 is a flow chart of the phone start procedure.
Figure 5:
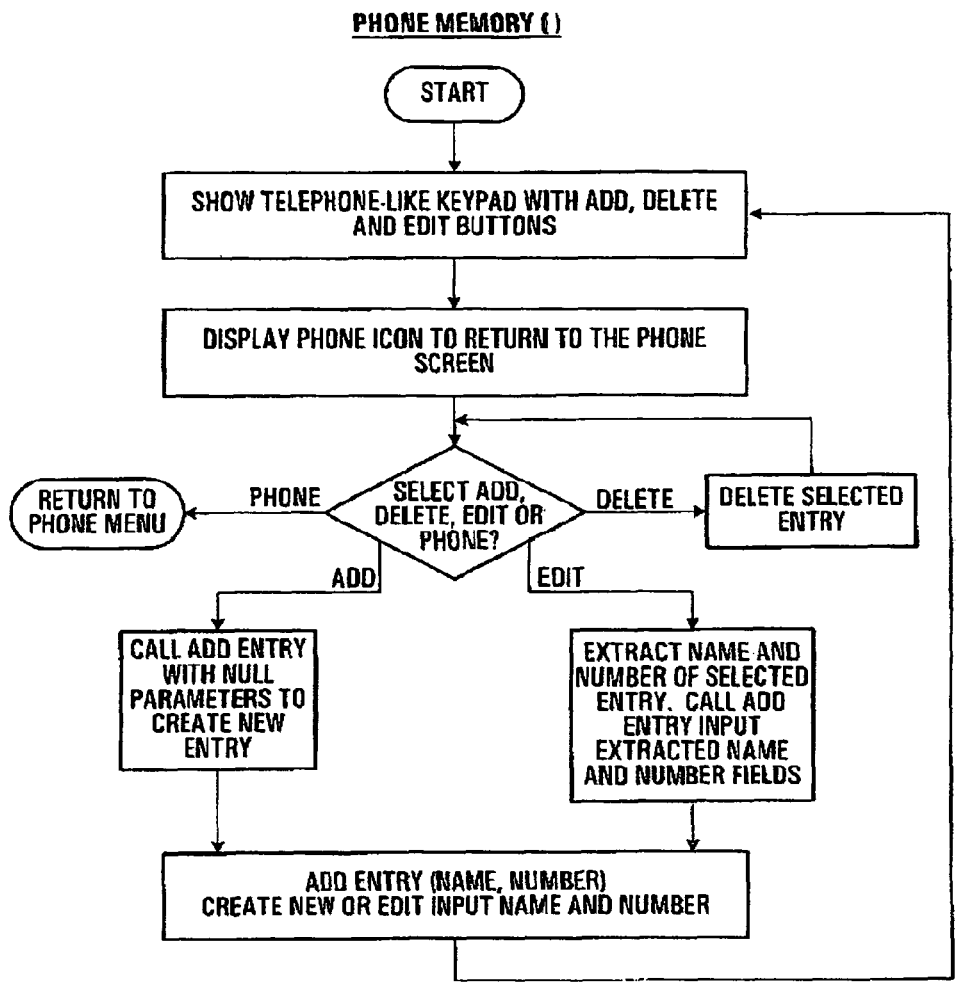
FIG. 5 is a flow chart of the phone memory procedure.
Figure 6:
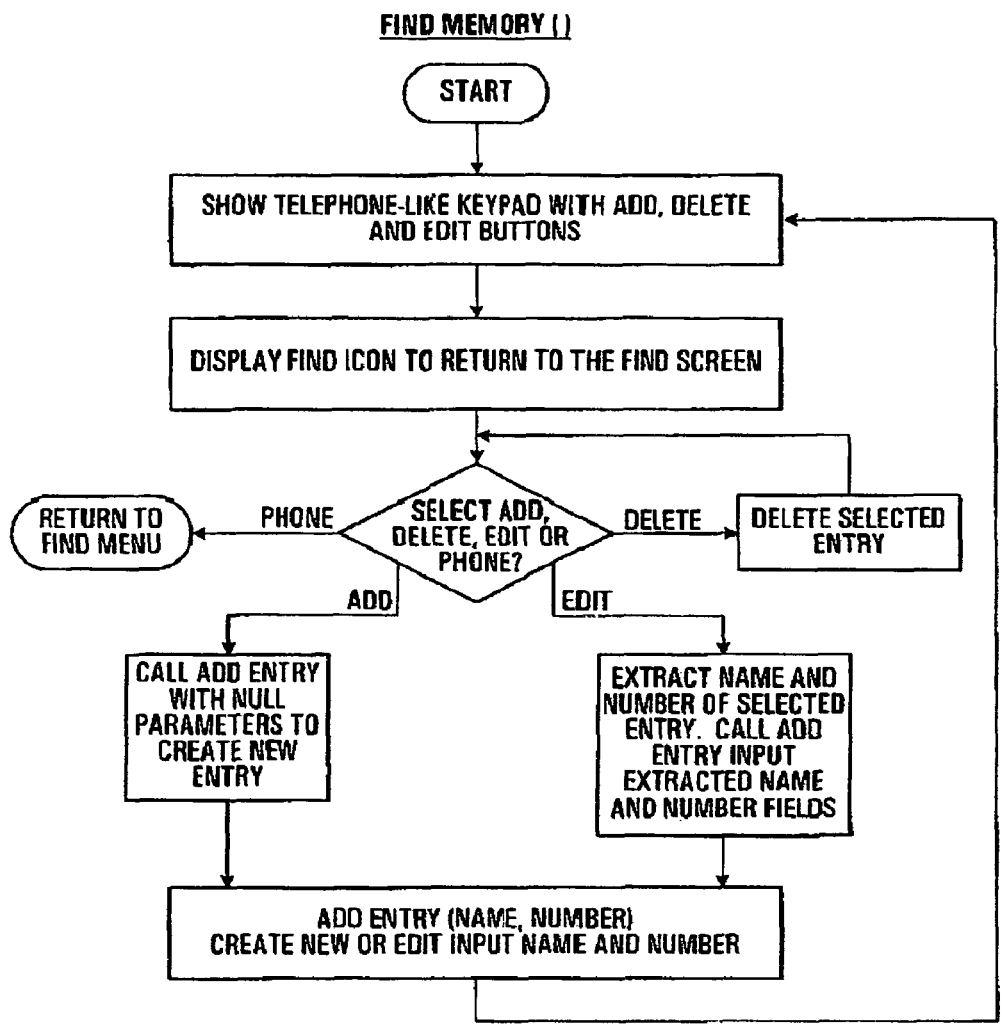
FIG. 6 is a flow chart of the find memory procedure.
Figure 13:
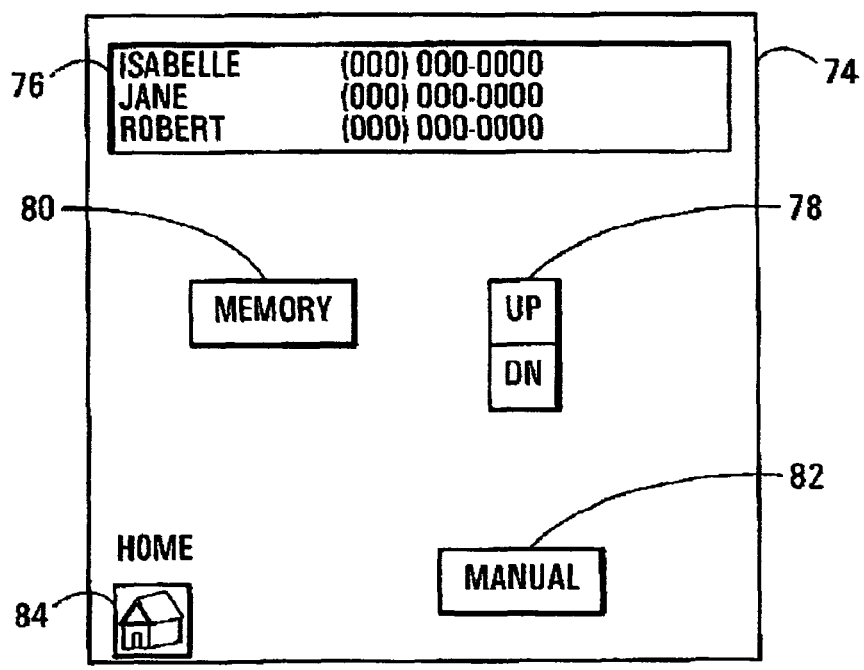
FIG. 13 is a diagram of an interactive phone screen.
Figure 14:
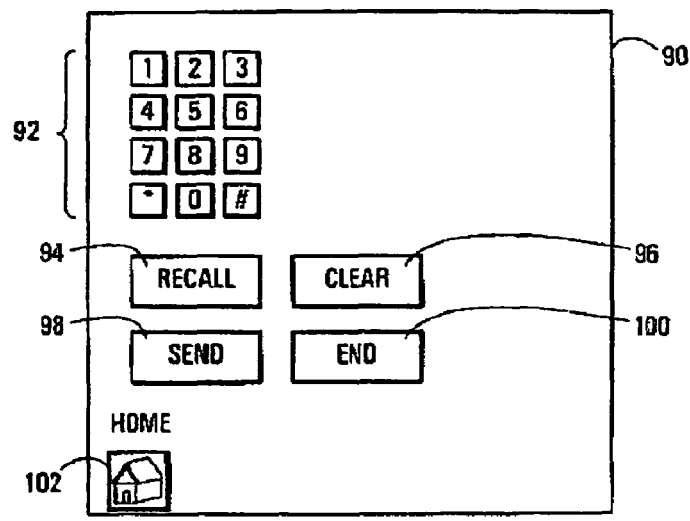
FIG. 14 is a diagram of an interactive manual phone screen.

FIG. 4 shows the procedure if the PHONE button 56 (FIG. 12) was touched. This opens the PHONE screen 74, FIG. 13, which has a scrollable list of preprogrammed numbers 76, an UP/DOWN scrolling button 78, a memory button 80, for adding or deleting numbers, a MANUAL button 82 for going to the screen of FIG. 14 for normal telephone use, and a home button 84 to return to the HOME screen 54, FIG. 12. If the manual button 82 is touched, the screen 90 of FIG. 14 appears. It has a touch pad 92, a RECALL button 94, a CLEAR button 96, a SEND button 98, END button 100 and HOME button 102. The screens of FIGS. 13 and 14 are for programming numbers (FIG. 13) and using the controller unit as a voice cellular telephone (FIG. 14). The use of the buttons on FIG. 14 is conventional to cellular telephones.

Figure 12:
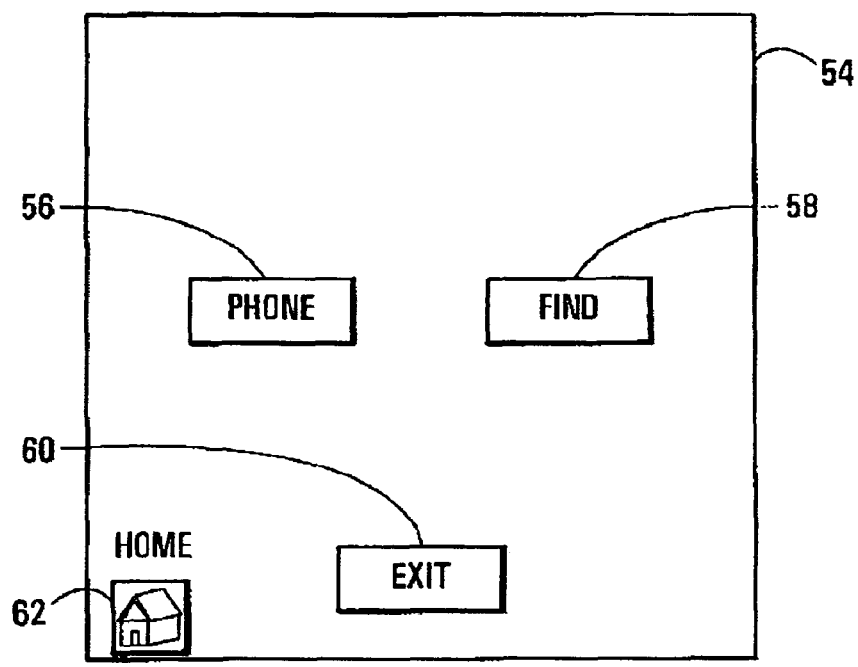
FIG. 12 is a diagram of an interactive home screen.
Figure 15:
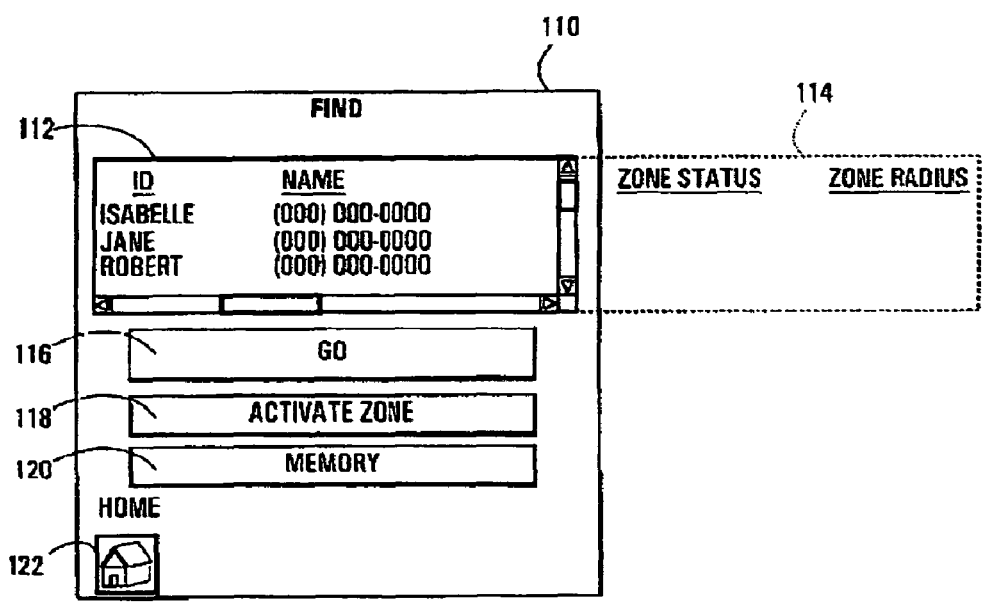
FIG. 15 is a diagram of an interactive find screen.

At FIGS. 3 and 12, if the user selects FIND 58, the find procedure of the invention is begun. A FIND screen 110 as shown at FIG. 15 appears on the display. This screen has a scrollable NAME window 112, which may be scrolled vertically to select a rover or horizontally as shown at 114 to display preprogrammed alarm criteria for each rover such as ZONE STATUS and ZONE RADIUS. FIG. 32A shows a simplified screen for selecting a rover or tag to be tracked.

Figure 16:
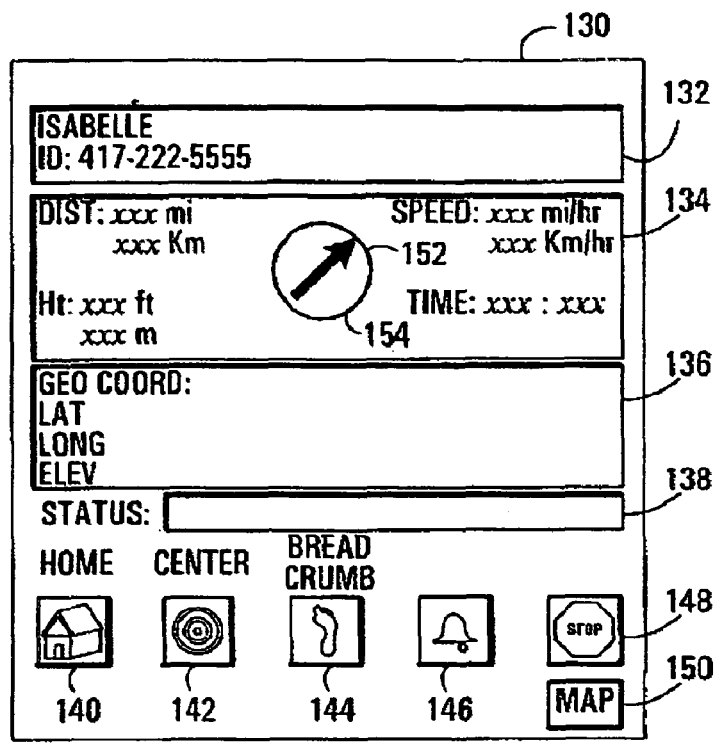
FIG. 16 is a diagram of an interactive find detail screen.

The GO button 116 of the FIND screen FIG. 15 activates the FIND DETAIL screen 130 of FIG. 16. The ACTIVATE ZONE button 118 allows programming and activating a zone radius. The zone radius will be displayed at ZONE RADIUS and communicated and stored in the rover unit, which may be programmed to automatically call the controller unit and sound and/or display an alarm if the zone radius is passed. Other methods may also be used to alert the controller unit if the zone radius is passed, such as by contacting an application server (described in additional detail below) and having the application server notifying the controller unit or another entity through a text message, email, or other communication means. ZONE STATUS shows whether the zone option is on or off. The MEMORY button 120 stores a zone radius selection. The HOME button 122 returns the display to the HOME screen 54, FIG. 12. The memory/programming procedure is shown in the flow diagram of FIG. 6, FIND MEMORY.

Figure 7:
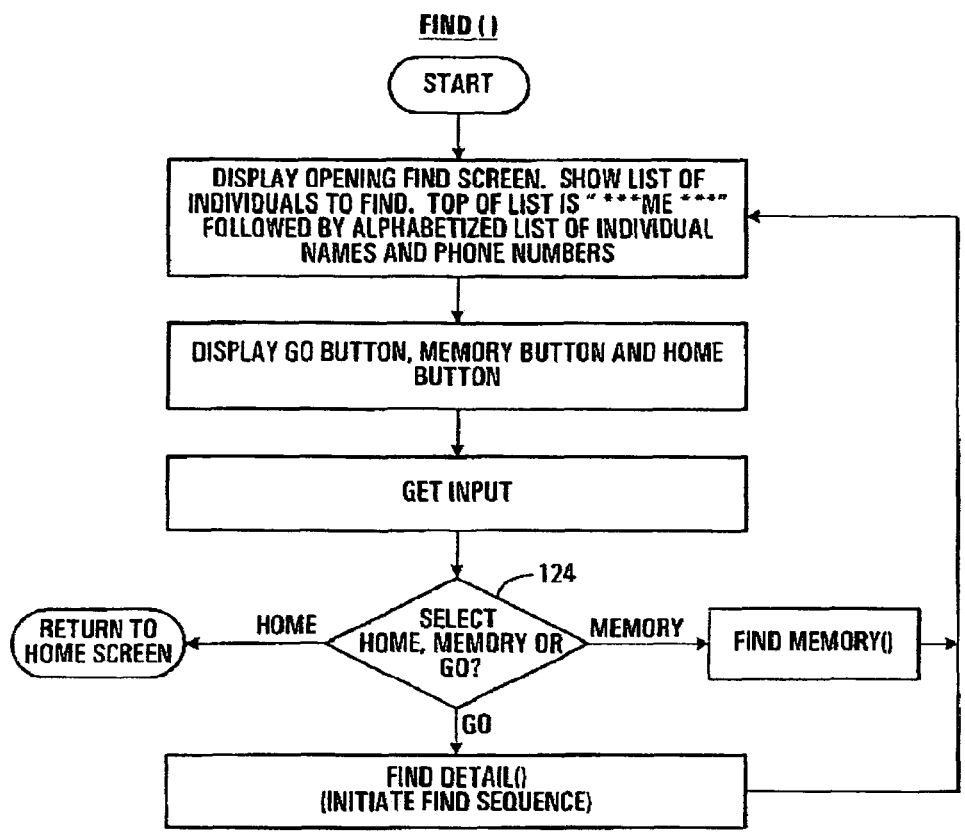
FIG. 7 is a flow chart of the find procedure.

With the FIND screen 110, displayed, the procedure shown in FIG. 7 is implemented. The scrollable NAME window 112 has a list of names and phone numbers that have been preprogrammed. The user now selects HOME 122, MEMORY 120, or GO 116. If the MEMORY button 120 is touched, the FIND MEMORY procedure begins (FIG. 6) which allows programming or deleting on the NAME window 112.

Figure 8:
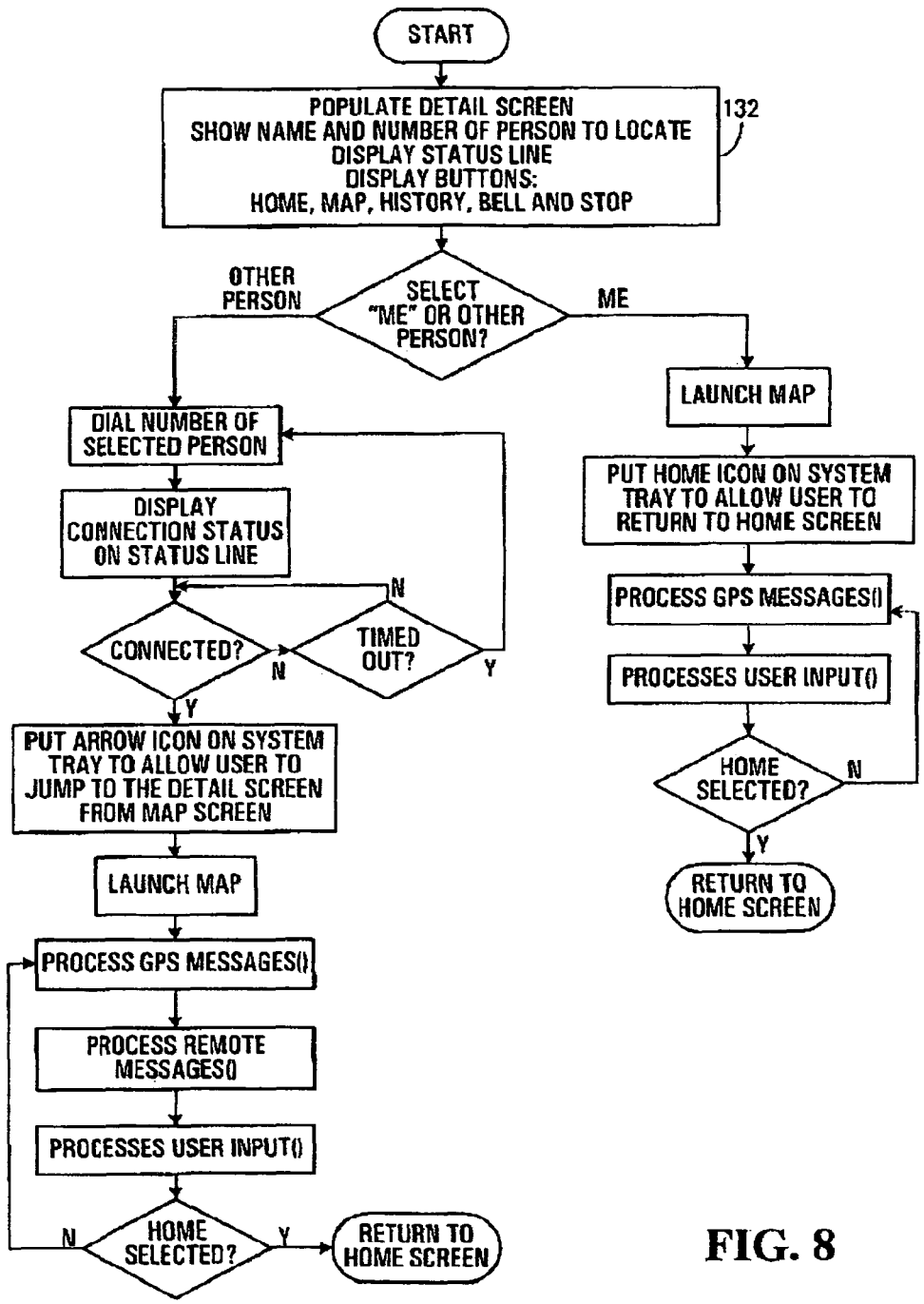
FIG. 8 is a flow chart of the find detail procedure.
Figure 9:
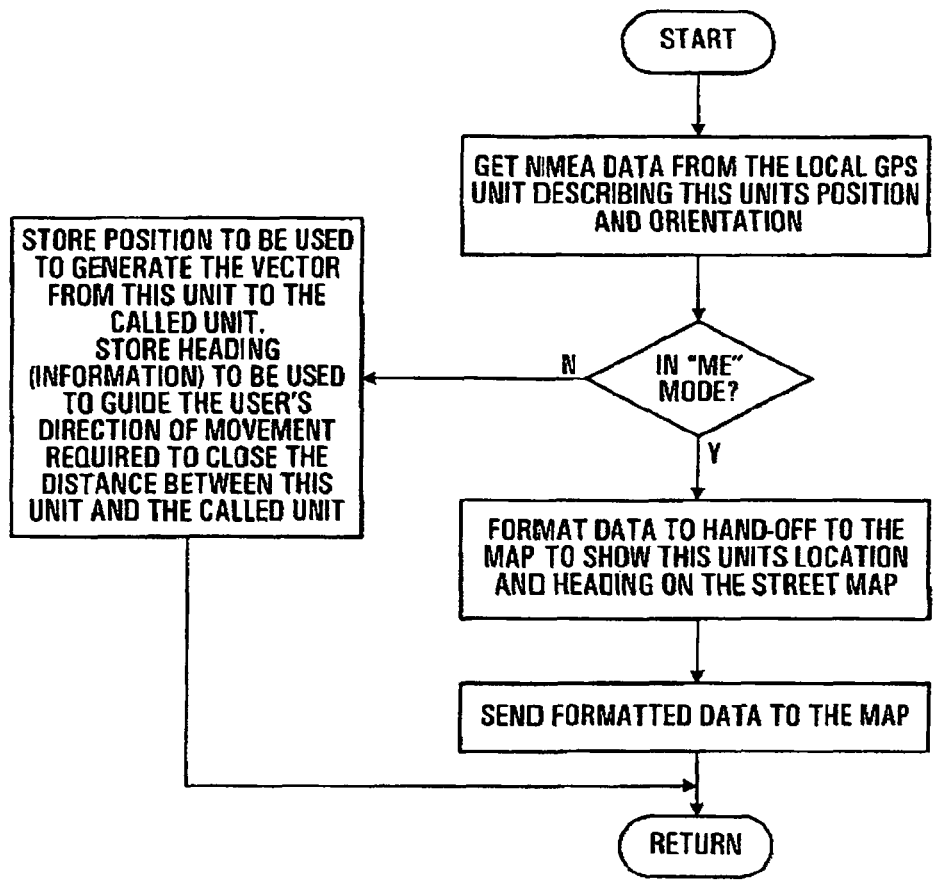
FIG. 9 is a flow chart of the process GPS messages procedure.
Figure 10:
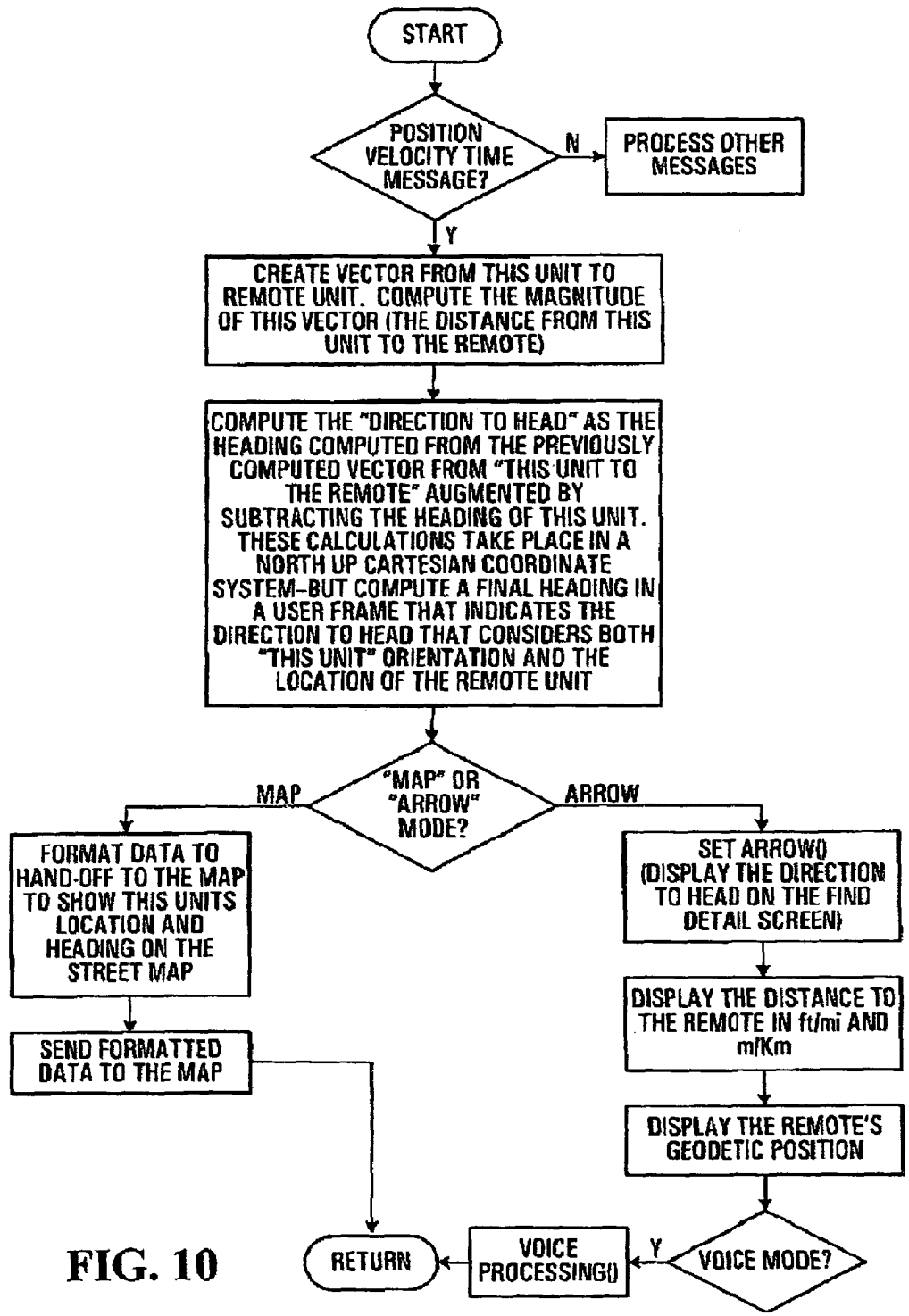
FIG. 10 is a flow chart of the process remote messages procedure.
Figure 11:
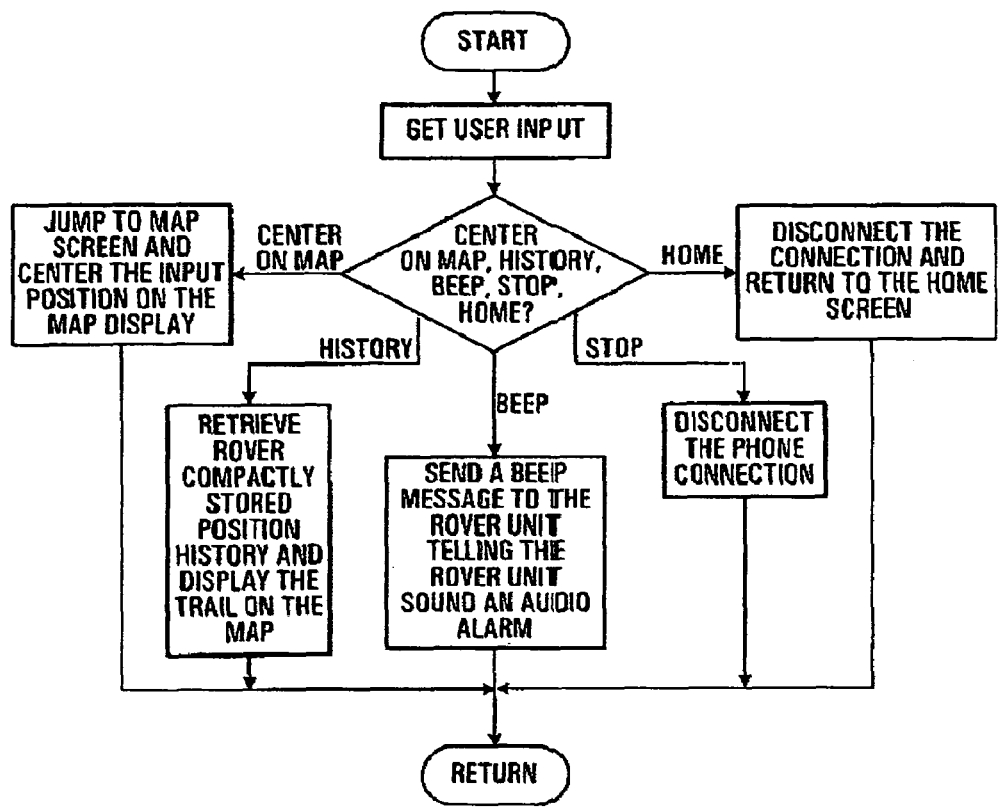
FIG. 11 is a flow chart of the process user input procedure.

If the GO button 116 has been touched, the FIND DETAIL procedure of FIG. 8 is begun and the FIND DETAIL screen 130, FIG. 16, is displayed. As shown in FIG. 8, the FIND DETAIL procedure starts at 132 from the prior touching of the GO button 116 of the FIND screen 110 of FIG. 15 to bring up the FIND DETAIL 130 screen of FIG. 16.

Figure 32B:
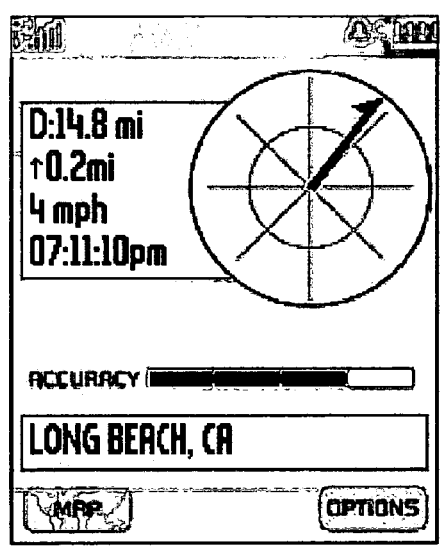
FIG. 32B shows a simplified screen for providing location and heading data for a tracked device.

The FIND DETAIL screen 130 has an identification window 132, a location and data window 134, a geographical coordinates window 136, a status window 138, and buttons, HOME 140, CENTER 142, BREAD CRUMB 144, ALARM 146, STOP 148 and MAP 150. FIG. 32B shows a simplified screen that provides heading data to a tracked rover or tag.

Within the location and data window 134, a reserve 152 shows a bearing arrow 154 for relative spatial positioning of the rover to the controller, in which the arrow shows the bearing of the rover unit relative to the controller unit. This is accomplished using the electronic compass module 20 (FIG. 1) or, alternatively, using movement of the controller to determine its heading from GPS. Relative distance, relative height, and speed of the rover and time are also displayed.

Figure 17:
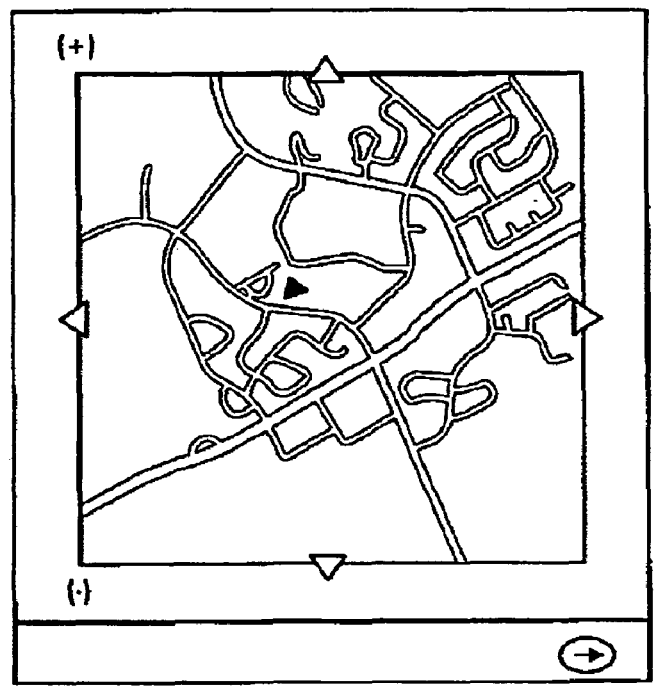
FIG. 17 is a diagram of an interactive map screen.
Figure 32C:
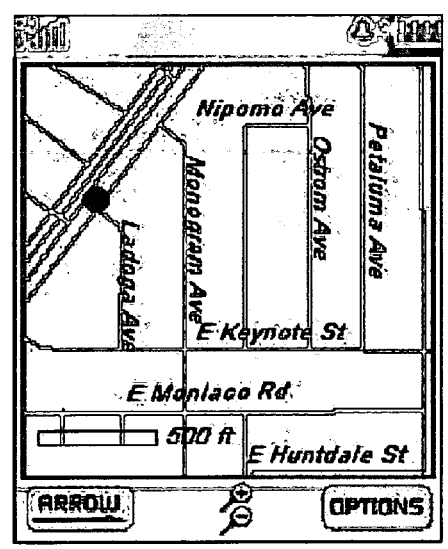
FIG. 32C shows another example of a map screen

Touching the HOME button 140 returns to HOME screen 54 shown in FIG. 12. Touching the MAP button 150 brings up the MAP screen of FIG. 17 that will show the positions of the controller and the rover on the map so long as they are sufficiently close to appear on the same map; otherwise the rover will be shown on a map. The BREAD CRUMB button 144 is used with the MAP button 150 which will also activate the MAP screen FIG. 17 and will show the positions of the controller and the rover on a map, and with the BREAD CRUMB feature activated, will show a number of prior positions of the rover and will continue to display sequential periodic positions of the rover. The MAP screen FIG. 17 has an arrow icon or button which when activated will return the display to the FIND DETAIL screen FIG. 16. The various functions and options can be selected from displays rather than from discrete buttons. The CENTER button 142 centers the target/rover on the map of FIG. 17 in case the user has scrolled off. The ALARM button 146 activates an alarm on the rover so that it may be found audibly. FIG. 32C shows another example of a map screen.

Further Embodiments

In a further embodiment the invention can be implemented by the controller and rover locations being provided wholly or in part or with the assistance of location technologies integrated with or otherwise working in conjunction with the cellular network with which the controller and rover are connected. In a more general case any communication network may be contemplated, including wireless networks as well as wired (including electrical as well as optical connection) networks.

As is already discussed an important feature of the invention is the acquisition of high accuracy relative spatial position of the rover relative to the controller. The following steps define a preferred way of doing it.

The first step is to identify common sources of location measurement data from a location technology. In the case of GPS or another satellite system the commonality is the common satellites that are being tracked by the controller and the rover. When the controller and rover are close it is expected that an exactly common suite of satellites can be identified. But, there may be instances when complete commonality is not available, so the general case is to define the most common suite of satellites even if one of the units has to use a satellite not used by the other. Of course as commonality is compromised, the level of accuracy of relative position may (but not necessarily) be decreased. In the case of land based location technologies the commonality refers to transmitting stations, referred to generally as land based signal sources.

Once the most common sources of measurement data are identified, there will be two sets of measurement data, one set for the controller, and one set for the rover.

Also calculations are made to determine the position of the rover relative to the controller. The employment of common measurement data provides high accuracy for determination and display of the relative spatial location of the rover relative to the controller. These calculations result in a 3D vector that represents the chord between the controller and the rover including the relative height between them. The magnitude of the vector is the distance between the controller and the rover.

In order to be able to display the FIND arrow, which is derived from the relative spatial location, the heading of the controller has to be determined. This can be done in a number of ways; using an electronic compass in which case the controller does not have to be moving or when GPS is used, obtaining heading from GPS data as the controller moves. This heading information is utilized in conjunction with the controller to rover vector to enable display of the bearing arrow on the controller, which shows the direction of the rover from the controller. Also other information is calculated and displayed including relative height, relative distance, rover speed and the time that the location measurements data were captured by the rover.

Using the measurement data location information, latitude and longitude can be calculated. This allows for display of the locations of the controller and rover on a map.

As will be seen from both the foregoing and the following, configurations of a system and method vary based on among other things, where calculations are carried out. In this respect it will be appreciated that the calculation tasks do not have to be done all in one place but rather can be distributed to different portions of the system.

In the case of the system and method described above with reference to FIGS. 10-17 all the calculations are done within the rover or the controller. This type of system can be referred to as a handset based system. In the various embodiments to follow calculations may be done in a computer which is part of or otherwise available to the communications network so that selected calculations may not be done in the rover or the controller. That computer is hereafter also referred to as an application server that can be an independent, even dedicated computer, or it can be integrated into another computing facility with the special application enabled to do the selected computing.

The controller and rover can operate in conjunction with a variety of location technologies and in a number of alternative configurations. In broad terms these implementations can be considered as having two categories of location technologies; these being satellite based and land based location technology. While not necessarily exhaustive it is convenient to consider the following more specific categories as being applicable alternative embodiments of the present invention:

1. Fully autonomous GPS. One form of autonomous GPS is the handset based configuration described above. Another is use of a server based configuration in which the rover and controller acquire GPS satellites and obtain their measurement data without any assistance.

2. Both the controller and the rover use either AGPS only or a land based location technology only.

3. A hybrid in which either of the controller or the rover uses independent (autonomous) GPS while the other uses AGPS.

4. Another hybrid in which both the controller and the rover use a combination of AGPS and a land based location technology, but they obtain the best commonality of signal source of each.

5. Another hybrid that would defeat the advantages gained by the use of common measurement sources, where either the controller or the rover use satellite based location (such as AGPS or autonomous GPS) and the other uses land based location technologies.

In a general embodiment the rover and the controller are in mutual communication via a communications network such as a cellular telephone network and they each have a capability to have their location determined and provided to at least the controller by a location technology. In one set of implementations the location information is either exclusively provided by information communicated via the cellular network, or is assisted by information provided via the cellular network. In particular, the high accuracy relative spatial positions of the controller and the rover is accomplished by an application server that operates by receiving communications from the controller and the rover over the communications network. These communications provide the location measurement data and in particular the exact signal sources of the location measurement data that have been received by the controller and the rover from one or more location technologies. Then the application server filters the incoming signals from the controller and the rover to determine the most common set of signal sources, preferably completely common signal sources. In the case of GPS as the location technology, the communications from the controller, and the rover give the PRN numbers for the location measurement data so that location measurement data from common satellites can be used to calculate the positions of both the controller and the rover. In the case of land based location technologies, the common transmitting antennas are identified and the measurement data from them is used. Then, with the rover's location being provided to the controller the special features of the invention can be implemented, such as the FIND feature by which the relative spatial position relationship between the controller and the rover, in particular in the embodiment in which an arrow is displayed on the controller's display showing the relative direction of the rover and also showing the distance to the rover. It is possible with this embodiment to provide sufficiently high accuracy of the relative location of the controller and rover as well as their absolute location to enable the features described above to be implemented.

In the case of autonomous GPS, the controller and rover acquire GPS satellites in a normal unaided way and then receive measurement data from the satellites. That measurement data is sent to the application server where the filtering for commonality is done. The rest of the process and system elements are described in detail below.

The assisted GPS (AGPS) system as implemented in the carrier network to provide location based services has been defined in a number of publications including *"Location Technologies for GSM, GPRS and UMTS Networks"*, a White Paper by SnapTrack, A QUALCOMM Company and *"Geolocation and Assisted-GPS"*, by Djuknic and Richton, Bell Laboratories, Lucent Technologies and *"Assisted GPS: A Low-Infrastructure Approach"*, by LaMance, DeSalas and Jarvinen, in GPS World, Mar. 1, 2002. The content of all of these publications is incorporated by reference herein.

In the AGPS approach, typically the process involves an interaction between a wireless handset and the Position Determination Entity (PDE) in the carrier network. This interaction assists the handset in acquiring GPS satellites to be used in calculating the position of the handset. It is the purpose here to limit the explanation of AGPS as it is exhaustively described in the published literature such as mentioned above and known to those skilled in the art. The primary benefits of AGPS are increased speed in the time-to-first-fix (TTFF) and increase in sensitivity for acquiring satellites. That is, the handset can more quickly determine its position and can utilize weaker GPS signals.

The assistance provided by the PDE is available in two fundamentally different techniques. One technique requires the PDE to transmit satellite ID, code phase and Doppler information for each satellite that should be acquired and from which measurements should be taken. Another technique requires the PDE to transmit via the carrier network to a handset a rough reference location and time and the orbit parameters for the satellites; in this case the handset is required to compute the code phase and Doppler for the satellites from which measurements should be taken; these measurements are then forwarded to the PDE. The PDE would then use this information to arrive at the absolute location of the handset in a suitable coordinate system such as latitude, longitude, and elevation values (geodetic) or Earth Centered Earth Fixed (ECEF) coordinate system.

As currently contemplated, there are a number of variants or hybrids that make use of the basic AGPS concept. For purposes of the present description, and pursuant to the foregoing, given that there are various ways to implement AGPS, the following definition is intended to comprehend all means and methods that result in faster acquisition of satellites and greater acquisition sensitivity, that definition being; a means or method by which a handset is provided information from a source other than directly from the GPS satellites themselves that identifies the satellites to be tracked by the handset and provides the data needed to acquire and commence tracking those satellites so as to speed-up the commencement of tracking and to increase acquisition sensitivity.

In another embodiment, an application server is introduced that is configured to communicate with the carrier network location service elements to implement the invention. The following describes application of AGPS to and as an embodiment of the present invention using an application server.

When a controller requests to find a rover, the rover and the controller interact with the PDE in the carrier network, in essence asking for AGPS service. Within this request the handsets have to give the PDE certain specifying information about their operating parameters that tells the PDE how to communicate and what to communicate to the handset for providing AGPS service. After the controller and the rover have acquired and are tracking GPS satellites, the application server will interact with the system components in a manner such that the improved relative positioning between the controller and the rover useful for this invention is available. Namely, in order to obtain high precision relative position between the controller and rover, the application server will compare the satellite constellation received by each unit as a function of time. The application server will determine the greatest overlap of this data and guide the system to perform its absolute location calculation of each unit based on these more common satellites for a given time. In other words, after acquisition and tracking of satellites by the controller and the rover, the intent is to provide GPS data received by the two mobile devices, the controller and the rover, to the PDE where the specific satellites at a given time are as common as possible between the two. Of course complete commonality is preferred and will give the highest position precision of relative spatial position between the rover and the controller. Once the PDE performs its location calculation of each unit, the coordinates will be passed to the application server, which will use the information to very accurately determine relative distance and bearing of the rover with respect to the controller. This information will then be forwarded to the controller for presentation to the user as described above. During the location-gathering period, this process will continue in regular intervals as to allow for real-time, very accurate location tracking of the rover by the controller.

In another embodiment each set of locations ascertained by the PDE can be relayed to the controller where the relative distance and bearing calculations will be carried out by the controller itself.

In yet another embodiment, the raw data (such as pseudoranges) collected by the PDE can be forwarded to the controller for position calculation as well as the relative distance and bearing calculations.

In still another embodiment, following the initial AGPS assist, the handsets independently collect raw data such as pseudoranges. The rover raw data is continuously sent to the controller for absolute and relative tracking. In this scenario the handsets can function together independent of the application server until such time that server assist might once again be required to calculate the relative distance and bearing of the rover relative to the controller. This alternating between server assist and independent or autonomous operation will take place as needed.

In another embodiment of the present invention, an application server may act as a Position Determination Entity Proxy (PDEP). The PDEP forwards data moving between a controller and the PDE and/or a rover and the PDE without modifying the data, but inspecting the data as it moves through the PDEP. This embodiment may be particularly applicable to controller and rover devices which have GPS receivers, but do not provide GPS data such as pseudorange data to third party software programs running on the controller or rover. The PDEP allows this pseudorange data to be extracted as it is transferred to the PDE or elsewhere in the network. Hence, commercially available units having GPS receivers (or other location technology source receivers) may be configured as controllers or rovers without requiring any modification to the hardware or software of those units.

In all of the embodiments outlined, the system can enable the controller to track and locate multiple controllers or rovers if so desired (a rover is defined according to its role in the system and method—to be located and tracked by a controller—so a controller can be the rover when it is being located and tracked). In addition, the controller user can request to ascertain its own location to be provided on a map for navigation purposes as described above.

The other general category for land based location technologies is also referred to as network based wireless triangulation systems. An example of such a system has been defined by a company named True Position. In this approach, typically the process involves Location Measuring Units (LMU) at multiple base stations collecting the raw call data from mobile handsets. The data is then used to triangulate the position of the wireless transmission using Time Difference of Arrival (TDOA) and/or Angle of Arrival (AOA) calculations. A similar approach is used for Enhanced Observed Time Difference (EOTD) where LMUs provide base station synchronization and data is sent to the Serving Mobile Location Center (SMLC) for calculations. Using this approach, when a controller requests to find a rover, the application server will interact with the components described above in a manner such that the improved relative tracking as described above can be achieved. Here, the application server will compare the data and determine the greatest overlap of base stations as a function of time between the controller and rover. The location processing of each unit will then take place in the usual manner based on the common conditions. Once the PDE (or SMLC) performs its location calculation of each device, the corrected coordinates will be passed to the application server, which would use the information to determine, more accurately, relative distance and bearing of the controller to the rover. This information will then be forwarded to the controller for visual and audible presentation to the user as described above. During the location gathering period, this process will continue in regular intervals as to allow for real-time, very accurate location tracking of the rover by the controller.

In a different embodiment each set of locations ascertained by the PDE can be relayed to the controller where the relative distance and bearing calculations will be carried out by the controller itself.

In another embodiment, the raw data from land based radio navigation devices collected by the PDE (or SMLC) can be forwarded to the controller for position calculation as well as the relative distance and bearing calculations.

In yet another embodiment, a non-mobile central unit such as a computer may track controllers and/or rovers. In all of the embodiments outlined, the system can enable the controller to track and locate multiple controllers or rovers if so desired. In addition, the user of the controller can request to ascertain his own location to be provided on the map for navigation purposes as outlined above.

Given the two location technologies (GPS/Assisted GPS and land based location); it is very likely that many systems may turn out to be hybrids. In other words, use AGPS where possible and switch to land based location when necessary due to signal reception and then back again, or the location solution may be formed by the use of measurements from both navigation measurement sources (GPS and land based location).

For all of the various embodiments that have an application server it is an ultimate purpose to present to the user/controller, the location information ascertained by the application server so as to allow the controller to locate and track the rover as described above. This information can be presented in various visual formats depending on the type of controller device. For example, on wireless phones or handsets with larger screens or Personal Digital Assistants (PDAs), the information can be provided via the mapping visuals as well as the FIND feature with a directional arrow and distance visuals (displays) as described above. On wireless devices such as cell phones or handsets with smaller screens, the general mapping information can be replaced by a text message providing the user/controller with the approximate location of the rover. This can be accomplished by providing the rover's address, street intersection, and/or region such as neighborhood/city/state/country etc. The directional arrow and distance visual along with all of its features and accompanying information as described herein can also be provided on the controller's smaller screen. It is this latter visual and accompanying information, which presents the higher precision relative information between the controller and rover.

In yet another embodiment, the raw data (such as pseudoranges for GPS capable systems, and timing or angular measurements in EOTD, AFLT, AOA, TDOA, etc. systems) whether collected by the handset to be provided to the controller or collected by the PDE can be forwarded to the controller for position calculation as well as the relative distance and bearing calculations by the controller.

In all of the embodiments described herein, the system can enable the controller to track and locate multiple controllers or rovers if so desired. In addition, the controller user can request to ascertain its own location to be provided on the map for navigation purposes as described herein.

For the system to function safely, privacy and security issues should also be considered. The privacy issue applies to a scenario where one controller needs to find another controller (which is regarded as a rover in this scenario). In this situation, where cell phones are being used each cell phone needs to allow the location transaction to take place. This can be done by the user during the wireless call where each user presses a button to enable the tracking to take place. This permission will be in place for the current call only and the handset will default back to disable for future calls. In this manner privacy concerns are handled by the users and no one can be tracked without knowledge. The privacy issue does not affect rovers in applications where they are placed on individuals for whom privacy is not regarded as required such as young children or the elderly or on equipment such as automobiles where privacy concerns are not regarded as being present. These cases do, however, have security concerns. Only the child's parents must be able to find the child and not anyone else who possesses a controller and happens to get the child's rover number. Among other solutions, one approach will be to password protect location transactions between a rover and a controller. The rover will only respond to a controller which sends it the correct password. The password will have been assigned to the rover by the appropriate controller (user/parent).In an alternative embodiment, the application server may contain the password and would refuse to allow communication with the rover if the controller provides the incorrect password.

Application Server Embodiment

Figure 18:
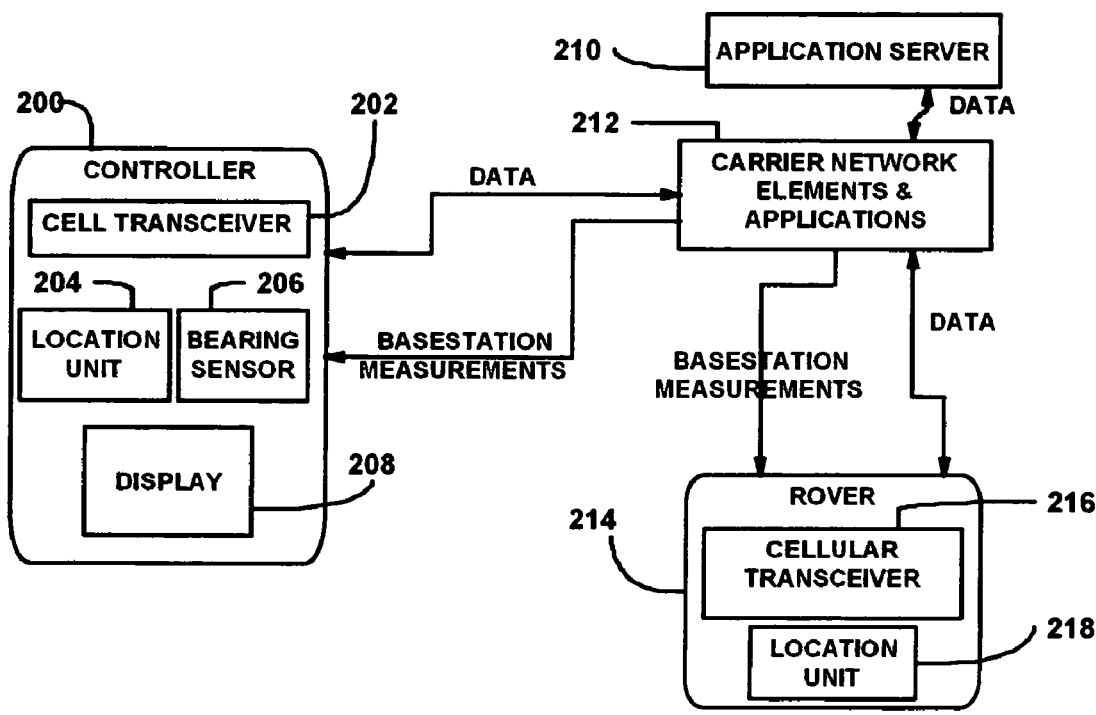
FIG. 18 is a diagram of basic system operational elements.

Referring to FIG. 18, a system according to an embodiment of the invention includes a controller unit 200 equipped with a cellular transceiver 202, a location sensor 204 and a bearing sensor 206, and a display 208. As understood from the context of the description of various embodiments, a particular implementation may not require all of the elements shown in FIG. 18. The system includes carrier network elements 212 and an application server 210. A rover unit 214 contains a cellular transceiver 216 and a location sensor 218. The controller unit 200 can communicate with the rover unit 214 to either obtain the rover unit's position which has been either calculated by the rover unit 214 or by the application server 210 and transmitted to the rover unit 214 or to the controller unit 200 or the rover unit 214 can send measurement data to the controller unit 200 that will enable the controller unit 200 to calculate the rover unit's position. This system may utilize the carrier network elements 212 both to aid in the location computation and to aid in acquiring measurements for location calculation. The rover unit 214 will respond to commands from the controller unit 200 and transfer the appropriate data to allow calculation and presentation at the controller unit of the relative and absolute location of the rover unit 214.

Figure 19A:
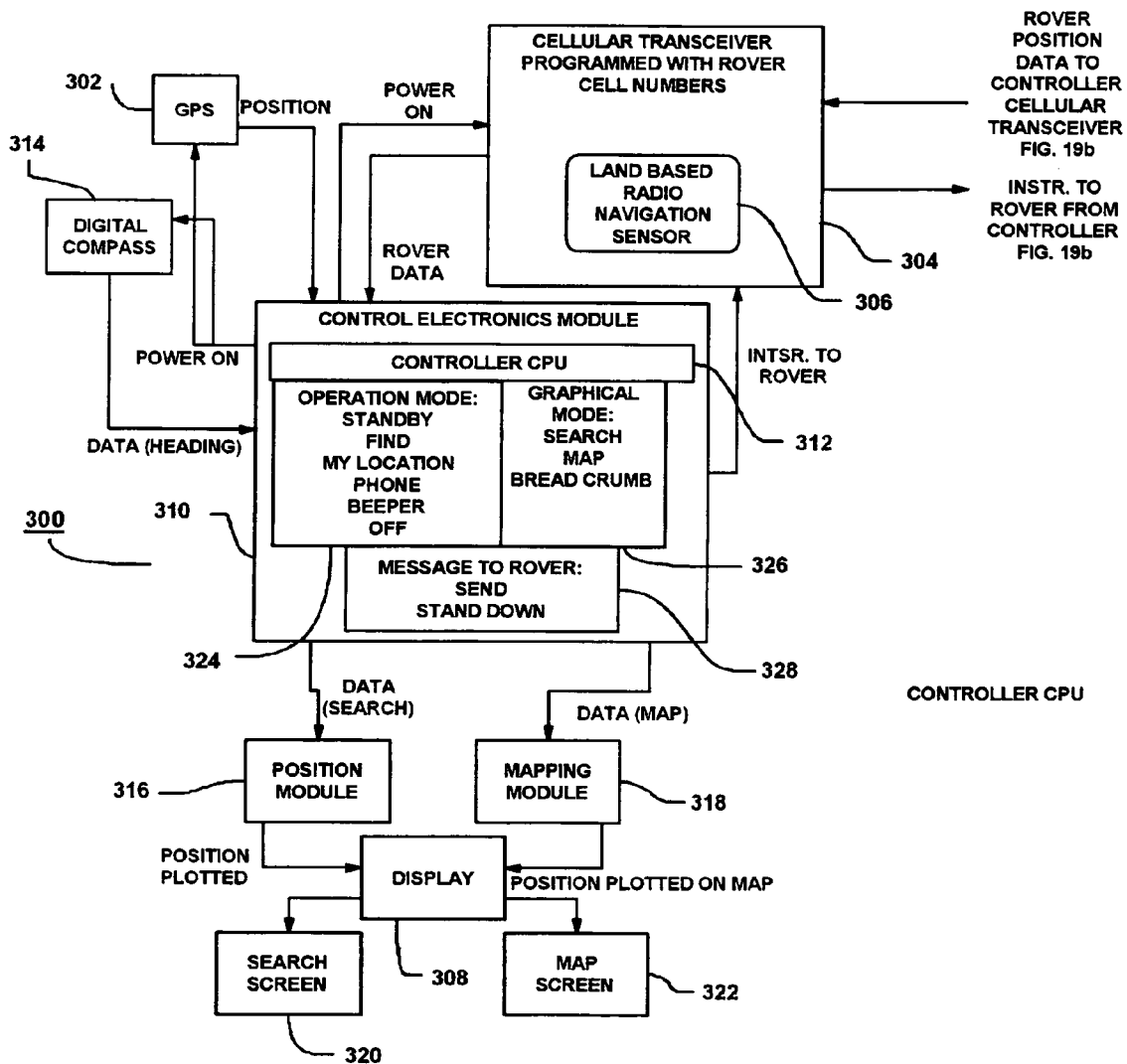
FIGS. 19a and 19b are a system operation diagram.
Figure 19B:
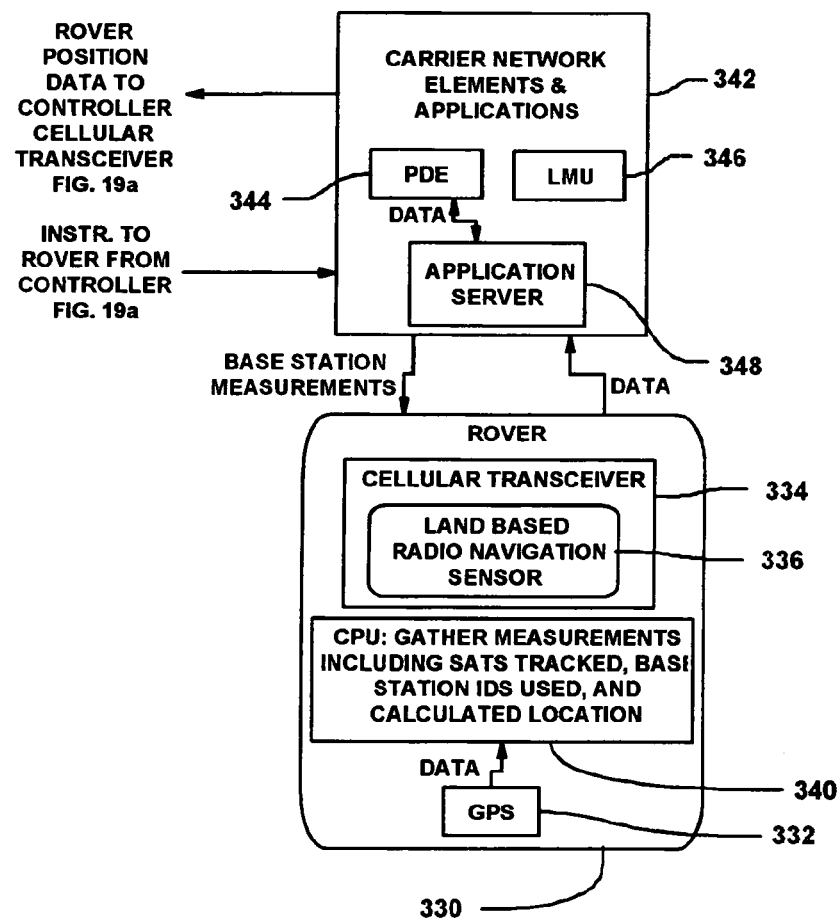

FIGS. 19a and 19b show more detailed block diagrams for the controller and the rover unit modules and their interrelationship via the carrier network using a GPS location technology and a land based location technology. As shown in FIG. 19a, a controller unit 300 has a GPS receiver 302, a cellular transceiver 304 with a land based radio navigation sensor 306, a display module 308, a control electronics module 310 including a specially programmed controller CPU 312, and a digital compass 314. There are also a position module 316, a mapping module 318, a search screen module 320 for selecting the rover unit to be located, and a map screen module 322 for displaying the position of the controller or the rover or both. The controller CPU 312 has three general functional modes, an operation mode 324 for controlling the behavior of the system, including maintaining a database of rover IDs, directing and maintaining the connection to a particular rover, performing various algorithms and controlling the interface from and output to the user, a graphical mode 326 for displaying the direction arrow 154 for the relative spatial position from the controller to the rover and for displaying a map as well as the other information displayed on the FIND DETAIL screen and the MAP screen, and a message to rover mode 328 for sending messages and commands to the rover.

As shown in FIG. 19b, a rover unit 330 has a GPS receiver 332, a cellular transceiver 334 with a land based radio navigation sensor module 336, and a specially programmed CPU 340.

The carrier network 342 has a Position Determination Entity (PDE) 344, a Location Measurement Unit (LMU) 346 and an application server 348. The system can make use of these elements in variety of ways depending on the particular circumstances as seen in FIGS. 20 through 24 and as described below.

Figure 20:
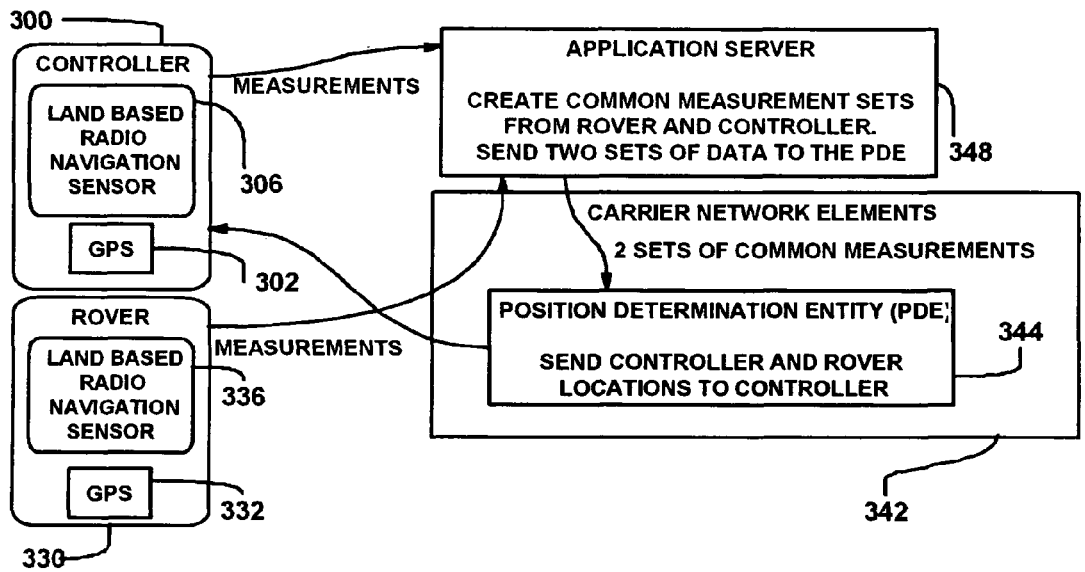
FIG. 20 is a system operation diagram.

Several modes of operation may be implemented based on the elements depicted in FIGS. 19a and 19b. FIG. 20 shows a mode of operation in which the application server 348 is implemented so that the raw data collected at the controller 300 either via the GPS receiver module 302 or the land based location sensor 306, or both, and the raw data collected at the rover 330 also from either its GPS receiver module 332 or from its land based navigation sensor module 336, or both, would be routed to the application server 348 before going to the PDE 344. The application server 348 would perform the necessary filtering to ensure the greatest overlap of the location data, that is selecting the location measurement sources that are the most common to the rover and the controller, and sending the appropriate data to the PDE 344 for location computations of the location of the rover 330 and the controller 300. Once the PDE 344 has completed the location computation, the data would be routed back to the controller 300 where the procedure for displaying the relative spatial location of the rover relative to the controller and for absolute location of at least the rover and if possible both the rover and the controller would continue as previously described.

Figure 21:
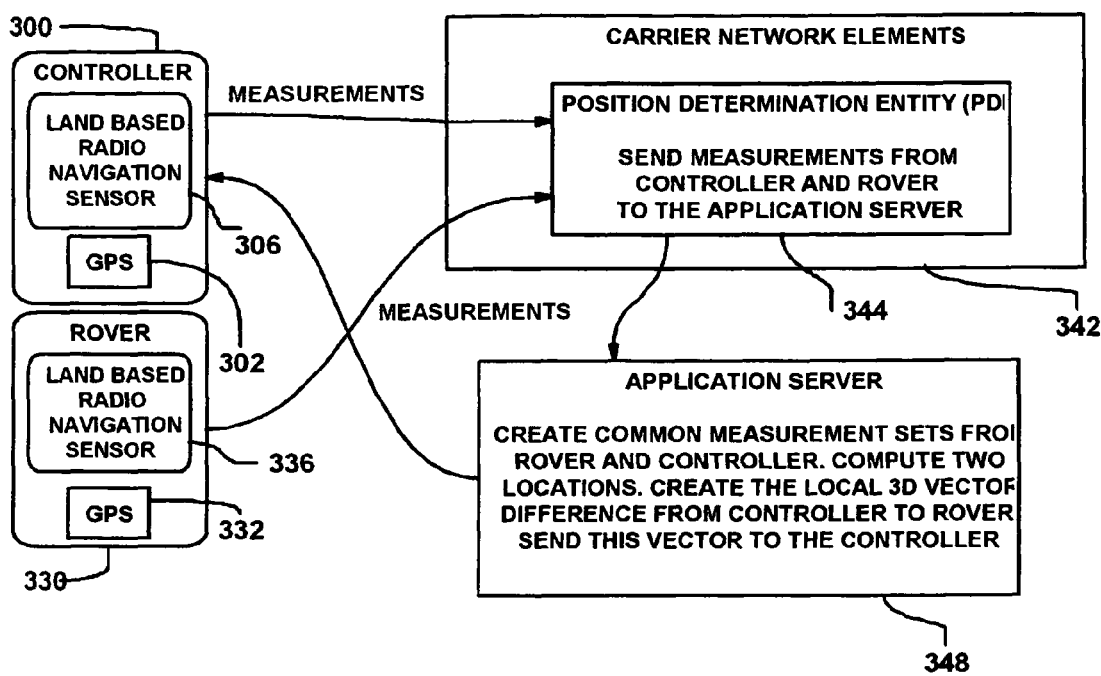
FIG. 21 is a system operation diagram.

FIG. 21 shows an architecture which is configured such that the raw data collected at the controller 300 either via the GPS receiver module 302 or the land based location sensor 306, or both, and the raw data collected at the rover 330, from the GPS receiver module 332, or from the land based location sensor 336, or both, would be routed to the PDE 344. The PDE 344 in this instance acts merely as a data router and passes the information to the application server 348. The application server 348 would then perform the necessary filtering to ensure the greatest relative positioning accuracy described earlier, perform the related location calculations, and would route the calculated data back to the controller 300 where the procedure would continue as previously described.

Figure 22:
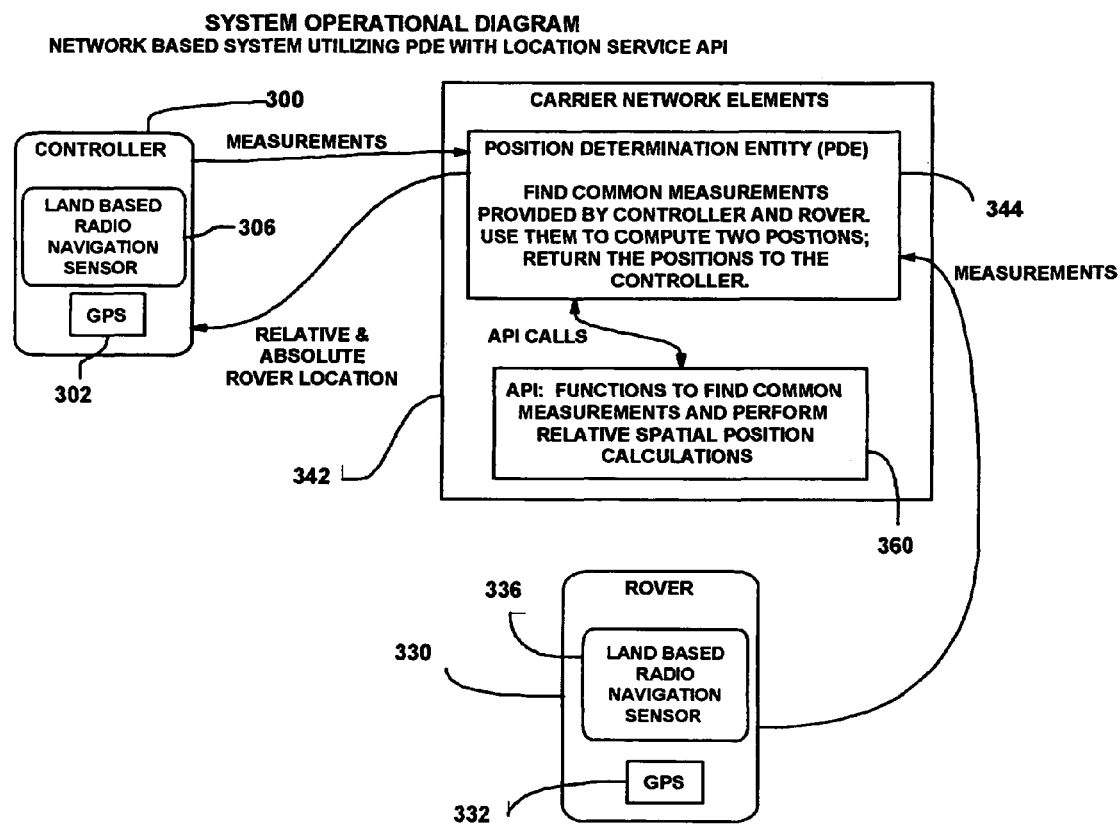
FIG. 22 is a system operation diagram.

FIG. 22 shows an architecture in which the application server functions reside on the PDE 344 or other system server. Those functions provided by the application server can be made available via a published API 360. The API 360 would be called during the PDE's 344 computations for the filtering steps to ensure greatest overlap of data as described earlier, prior to the PDE 344 performing its location calculations. In this instance the raw data collected by the controller 300 via the GPS unit 302 or the land based location sensor 306, or both, and the raw data collected at the rover 330, from the GPS unit 332, or from land based location sensor 336, or both, are routed to the PDE 344. The PDE 344 uses the API 360 calls and the functions necessary to perform the greatest relative positioning accuracy via the methods described earlier. The PDE 344 would then route the resulting data to the controller 300 where the procedure would continue as previously described.

FIGS. 23a, 23b and 23c show an architecture in which the server system functions reside in the controller 300. In this case, with or without an initial server assist, the rover 330 sends the positioning data directly to the controller. The controller 300 has three options for processing.

FIG. 23a shows Option 1: The controller 300 can filter the measurements collected by the controller 300 via the GPS unit 302 or the land based location sensor 306, or both, and the measurements collected at the rover 330, from the GPS unit 332, or from the land based location sensor 336, or both and the controller presents sequentially, two sets of measurements to the network for PDE 344 computation. For each set of measurements the PDE 344 would return the resultant position, and the controller 300 would perform the relative position calculation.

FIG. 23b shows Option 2: The controller 300 can do all of the filtering and the position calculations without relying on the network PDE 344 for positioning, but using the PDE 344 for aiding in acquiring GPS measurements for processing. In this instance the PDE 344 can aid the controller 300 or the rover 330 for acquisition assistance as necessary, then the controller 300 can filter the measurements collected by the controller 300 via the GPS unit 302 or the land based location sensor 306, or both, and the measurements collected at the rover 330, from the GPS unit 332, or from the land based location sensor 336, or both, and the controller 300 performs the relative and absolute location computation within its CPU.

FIG. 23c shows Option 3: The controller 300 can do all of the filtering and the position calculations without relying on the network PDE 344 for positioning. In this instance the controller 300 can filter the measurements collected by the controller 300 via the GPS unit 302 or the land based location sensor 306, or both, and the measurements collected at the rover 330, from the GPS unit 332, or from the land based location sensor 336, or both, and perform the relative and absolute location computation within the CPU of the controller 300 without requiring the use of the network PDE 344

The systems described do not require any particular transport mechanism. They can be implemented using the available communication protocols required by the supporting carrier network. It should be noted however that all of the above options are quite easily supported and adjusted as more networks move towards full support of TCP/IP.

Position Determination Entity Proxy Embodiment

Figure 24A:
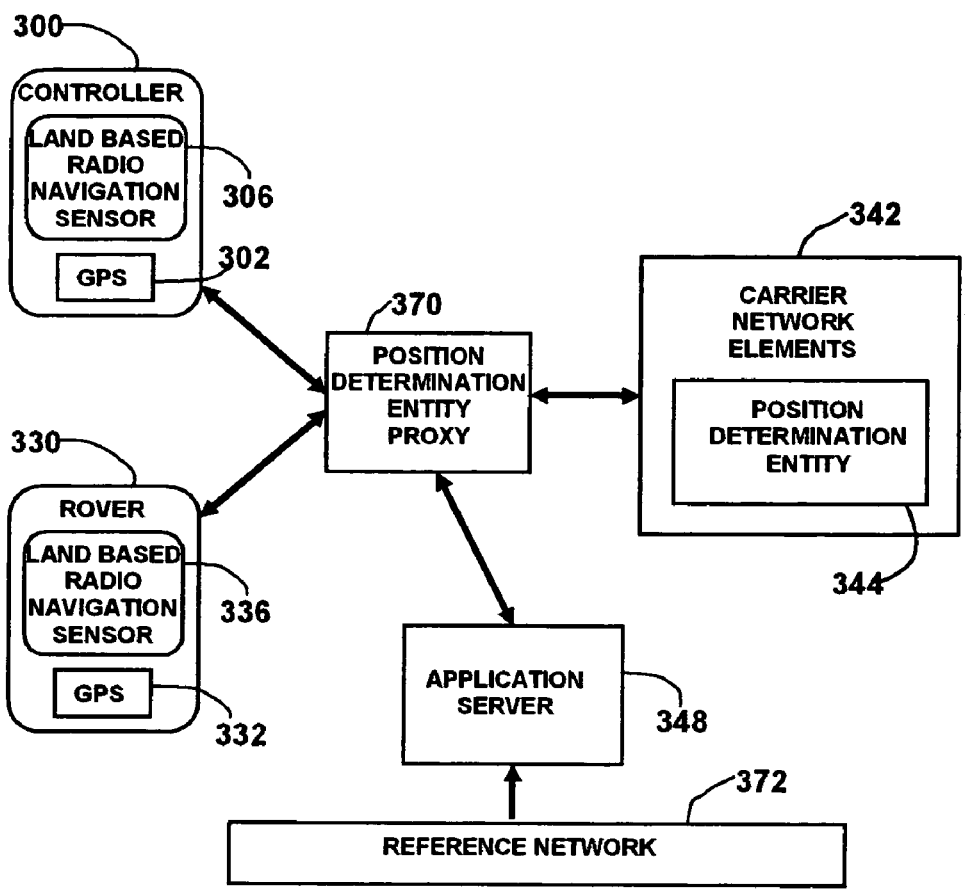
FIG. 24a is a system operation diagram.

FIG. 24a illustrates another embodiment of the present invention in which a PDEP is used to extract navigational data to facilitate relative navigation calculations. As discussed above, the controller 300 may comprise a satellite position data receiver 302, such as a GPS receiver, and a land based radio navigation sensor 306. The land based radio navigation sensor 306 may simply comprise a cellular network apparatus that detects a base station or may provide additional positioning and navigation capability. The rover 330 may comprise similar elements. Both the controller 300 and the rover 330 communicate position data through a position determination entity proxy (PDEP) 370 to a position determination entity (PDE) 344. As discussed above, the PDE 344 may be part of a carrier network 342. The PDEP 370 may also be coupled to an application server 348. Note that while FIG. 24a shows a single controller 300 and a single rover 330, alternative embodiments of the invention may have multiple controllers 300 and/or multiple rovers 330.

The system shown in FIG. 24a facilitates navigation by the controller 300 and/or the rover 330 as follows. The unit updating its navigation information (either controller 300 or rover 330) will connect to the PDEP 370. The PDEP 370 will connect to the PDE 344. The updating unit will then provide the PDE 344 with assisted navigation message that is forwarded through the PDEP 370. For example, if the updating unit is operating in a cellular network, the assisted navigation message may include the base station with which the updating unit is currently communicating (i.e., the Base Station Identification or BSID). The Base Station Identification may not be a specific portion of information received by the controller 300 or rover 330 but may be determined by measurements made by the controller 300 or rover 330. For example, in a CDMA system the Base Station Identification may be derived from pilot phase measurements.

The PDEP 370 may extract and save all or a portion of the information in the assisted navigation message sent from the updating unit to the PDE 344. For example, the BSID may be extracted from the message and saved for use for the application server 348. Note that in preferred embodiments of the invention, the extraction of data by the PDEP 370 will not alter the message forwarded to the PDE 344.

The assisted navigation message preferably contains a request to the PDE 344 for information to assist the updating unit in updating its navigation information. For example, in an assisted GPS system, the updating unit may request the PDE 344 to provide it with data on which satellites it should be listening to. If the PDE 344 has been provided with a BSID, the PDE 344 can determine the rough location of the updating unit by consulting a Base Station Almanac (BSA). The BSA is the database of base station locations, so the location of the updating unit is roughly determined to be within the coverage area of the indicated Base Station. Using the rough location of the updating unit, the PDE 344 can determine which satellites are in view at the location of the updating unit. After determining the rough location of the updating unit or performing other navigation assistance functions, the PDE 344 sends assistance data to the updating unit. This assistance data may also be extracted and saved by the PDEP 370.

The updating unit will then use the assistance data to update its navigation information. If the PDE 370 sends information regarding the GPS satellites in view of the updating unit, the updating unit will acquire the appropriate GPS satellites and make GPS pseudorange measurements. The updating unit may then send this pseudorange data to the PDE 344 for calculation of the location of the updating unit, especially in the case where the updating unit does not maintain its own ephemeris information database. The updating unit may use another method or apparatus to update its navigation information and send this updated navigation information to the PDE 344.

The PDEP 370 may extract and save all or a portion of the updated navigation information sent from the updating unit to the PDE 344. For example, the PDEP 370 may extract and save pseudorange data sent by the updating unit for use by the application server 348. Preferably, the extraction and saving of data will not alter the information transmitted by the updating unit to the PDE 344.

The PDE 344 uses the updated navigation information sent from the updating unit to more accurately determine the navigation status of the updating unit and sends that more accurate navigation status back to the updating unit. For example, if the updating unit sends pseudorange data, the PDE 344 will use ephemeris data obtained from a GPS reference network to compute the location of the updating unit. The location calculated from the ephemeris data will then be sent back to the updating unit, relieving the requirement on the updating unit to maintain its own ephemeris database.

The PDEP 370 may also extract and save all or a portion of the more accurate navigation status sent by the PDE 344 back to the updating unit. Hence, the PDEP 370 may save copies of some or all of the information communicated between each updating unit and the PDE 344. The PDEP 370 can then make this information available to the application server 348 to facilitate calculations of relative navigation data between two or more updating units.

The application server 348 may also be connected to a GPS reference network 372 to receive ephemeris data to calculate locations (or other navigation data) for controller 300 or rover 330 based on pseudorange data extracted by the PDEP 370. This may then facilitate the calculation of relative navigation data for the controller 300 and rover 330. The application server may also use any of the other extracted information to assist in the relative navigation calculations. The PDEP 370 allows multiple controllers 300 and rover 330 to simultaneously obtain their locations from the PDEP 370, and the PDEP 370 supports the calculation of relative distances and velocities between the multiple controllers and rovers by the application server 348.

The PDEP 370 may be particularly useful when unprocessed pseudorange data is not easily available from GPS systems or assisted GPS systems used within cellular devices. Some cellular devices do not provide pseudorange information to third party software programs running on the devices, so the calculation of relative navigation information on such devices may be difficult. The PDEP 370 allows for pseudorange data to be extracted and presented to the application server 348 for relative navigation calculations.

Figure 24B:
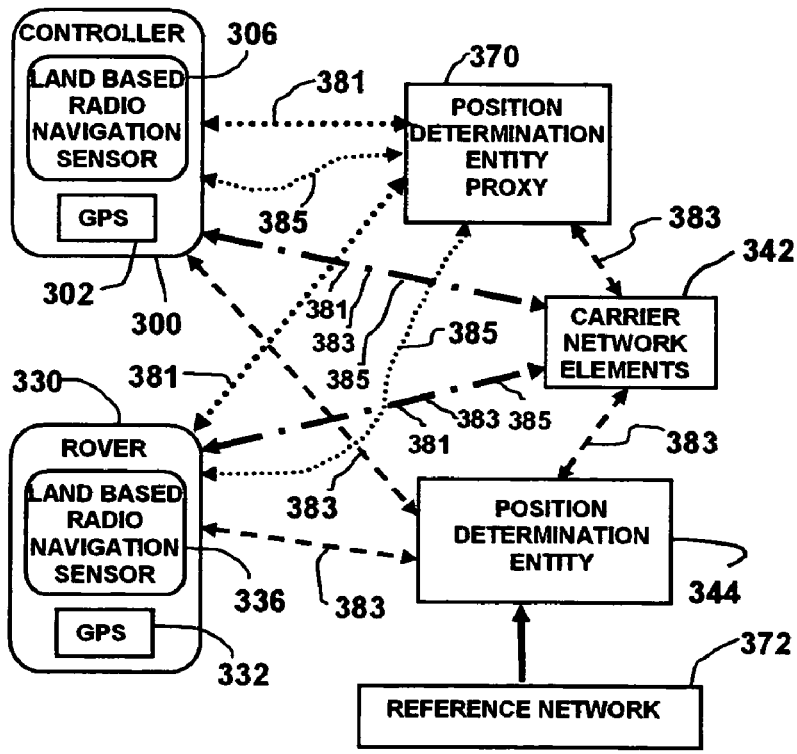
Figure 24C:
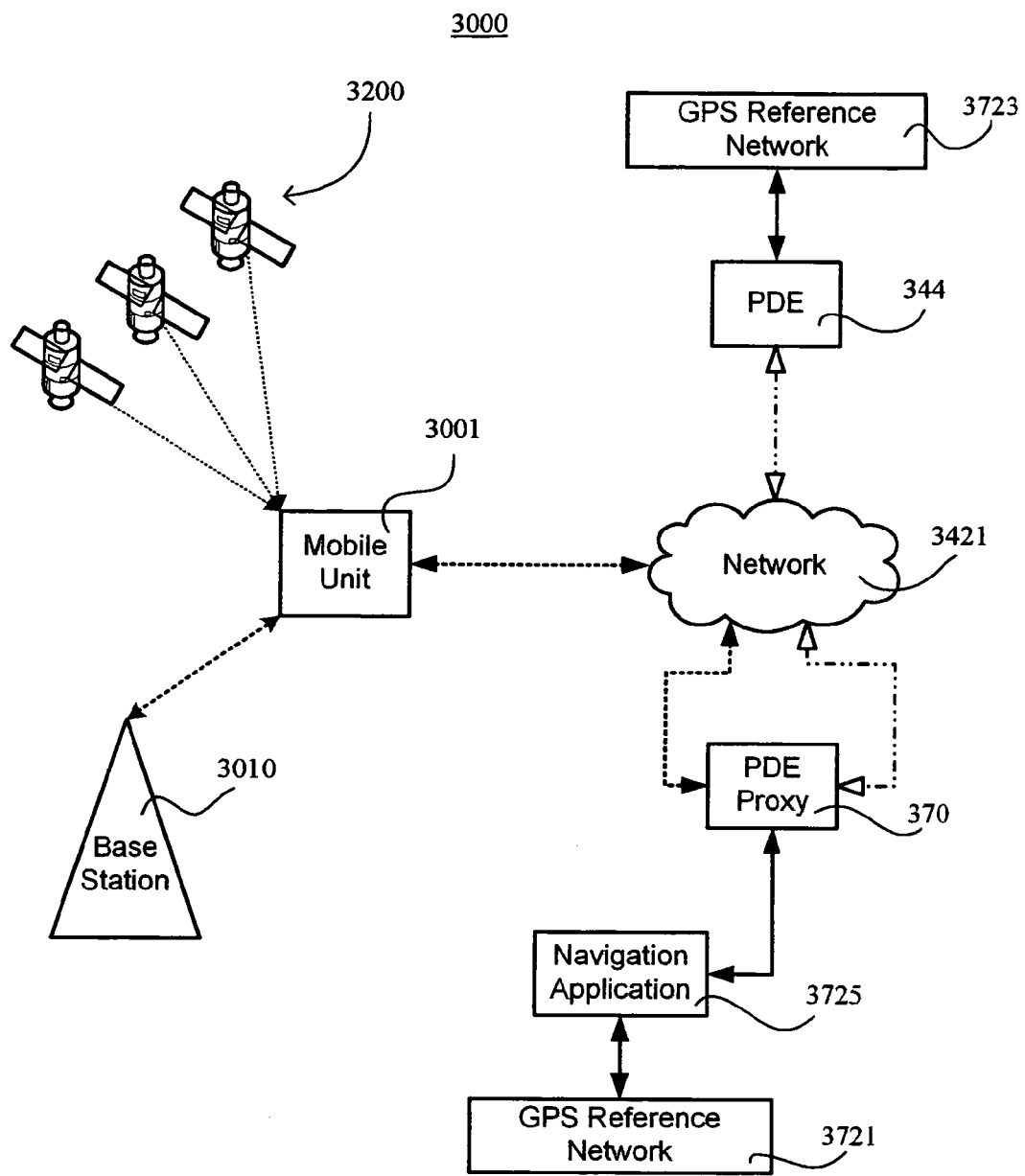

FIG. 24b shows a message flow through an embodiment of the system depicted in FIG. 24a. Typical Position Determination Entity messages 383 may be directly distributed to the controller 300 and/or the rover 330 from the position determination entity 344 or the Position Determination Entity messages 383 may be exchanged between the Position Determination Entity 344 and the Position Determination Entity Proxy 370 through a carrier network 342, such as the Internet. Position Determination Entity Messages 381 from the Position Determination Entity Proxy 370 may be sent directly to the controller 300 or the rover 330. Finally, the controller 300 and the rover 330 may exchange special navigation messages 385 through the Position Determination Entity Proxy 370.

Measurement Augmentation Embodiment

Relative positioning plays a significant role in embodiments of the present invention; but there are a variety of reasons why this is so. In urban environments where land-based positioning is used (either alone or to supplement GPS-based positioning) where one can expect to see multiple location measurement data sources, i.e., multiple Base Station transceivers (typically between 3 to 7), the dominant error sources are timing errors due to the unsynchronized bursts from the transceivers and multipath (reflections off of neighboring buildings and other landscape features). In satellite-based positioning, similar error sources are seen from the satellites that act as the location measurement data sources.

If two receivers track the same location measurement data sources and only the common location measurement data sources are used as measurement sources, the two receivers in question, and the location calculations for the two receivers are differenced, then the error due to the unsynchronized clock bursts are eliminated since they are common to both receivers. The dominant remaining error source is multipath. Multipath introduces errors because the Line of Sight (LOS) signals are either not present or are mixed with signals that have bounced off of the neighboring landscape (e.g., trees, hills or buildings). Each bounce adds a delay to the time that would be attributed to the LOS signal. The longer the added delay the worse the absolute position error becomes.

The advantage of a relative positioning technique that utilizes common measurement sources is that as the distance between two independent receivers gets smaller, the multipath environment becomes more and more similar, whether the positioning source is GPS or land-based. The greater the similarity, the more accurate the relative position data becomes, since the two locations will be differenced, thus removing common errors. However, when utilizing common measurement sources the measurements must be time correlated.

However, embodiments of the present invention do not require that the independent receivers be closely located to each other to reduce or eliminate multipath errors. Filtering may be performed on measurement data to improve the quality of the measurements and, therefore, reduce measurement errors.

The filtering that may be performed by a controller, rover, and/or application server may comprise state estimation. The states that are estimated are usually the location coordinates and the first derivative (i.e., velocity) of these coordinates. A necessary part of this estimation process is a transformation matrix that relates the states that are being estimated to the measurements that are made by the particular receiver. The states estimated by a filter-have memory of all of the previous measurements. The filter uses all of the past measurements to estimate the optimum set of state values for the current time. Since a filter has a bandwidth associated with it, and hence a time correlation, the impact of an old measurement on the current state estimate diminishes with time. The structure of a filter is often referred to as having a predictor/corrector structure. The current best estimate of the states is used to predict the next set of measurements, and the difference between the predicted set of measurements, created from the states by the transformation matrix described earlier, and the actual measurements is used to correct the states. Filtering can be looked at as an extrapolation of the current set of states to the best estimate of the states at the time of the next set of measurements, or any other time of interest. Such a state estimation filter may be a Kalman filter.

Embodiments of the present invention preferably employ a Kalman filter, which uses a series of measurements to estimate an optimum position as well as an optimum velocity observed during any positioning session. Typically, cellular handsets known in the art provide a position calculation derived from a single set of measurements. As a result, these handsets cannot use a history of the measurements to qualify a new set of measurements. The preferred Kalman filter helps prevent any random walk of position in small velocity situations caused by noisy measurements that may be provided by lower quality sensors.

A Weighted Least Squares Estimator (WLSE) may be used to provide an initial position estimate for the Kalman filter when a positioning session is entered. The least squares estimator solves for the set of states that minimizes the weighted sum of errors between a set of measurements and a set of calculations; e.g., measured satellite ranges and the calculated satellite ranges based upon the current position estimate. If only a single set of measurements is available, the WLSE may be used to derive the best position solution.

Preferred embodiments of the present invention may also use additional techniques to improve the quality of the measurements provided to the estimator. These techniques for improving the quality of measurements are described in additional detail below. These techniques may help to improve lower quality measurements, which should then tend to improve the overall navigation solution provided by the estimator. These techniques for improving the quality of measurements are particularly adapted for use with open-loop receivers, since such receivers generally tend to provide lower quality measurements for position and velocity. Note that these techniques may be performed by any location subject, that is, by controller units alone, rover or tag units alone, or combinations of the controller and rover or tag units, with or without navigation data transfers from controller units to rover or tag units or from rover or tag units to controller units.

A first measurement improvement technique, hereinafter referred to as measurement augmentation, is similar to Carrier Aided Smoothing (CAS), which is a well-known GPS process. However, CAS requires that the pseudorange measurement be accompanied by a correlated Carrier Phase measurement. On the other hand, measurement augmentation, according to embodiments of the present invention, provides for measurement improvements when the measurements provided do not include a pseudorange and correlated Carrier Phase, usually because no carrier measurement is provided at all, or only a rough estimate of Doppler is provided. Measurement augmentation establishes a consistency between the measurements and the theoretical ranges to the satellites. This technique filters large measurement excursions often seen in non-continuous tracking receivers, dramatically reducing the impact on the position solution of the estimator.

CAS is a technique typically employed in all high precision GPS receivers. CAS makes use of the fact that integrated carrier phase contains all of the relative motion between the receiver and the satellite since the beginning of the integration period. This movement is also contained in the series of pseudorange measurements taken during the integration period provided by the receiver. The dynamics represented by the integrated Carrier Phase are identical to the dynamics seen in this series of pseudoranges, except for the small, slowly varying, ionospheric induced divergence. The difference between the integrated Carrier Phase and the series of pseudorange measurements is equivalent to a constant of integration. Since the Carrier Phase measurements are significantly more accurate and equivalent multipath induces a significantly smaller range error on them, the dynamics on the pseudorange measurements can be removed by subtracting the integrated Carrier Phase range from the pseudorange measurement, resulting in a noisy measurement of the integration constant. The largest contributor to the noise on this constant is slowly varying multipath, but since the "constant" is an even slower varying measurement of the ionospheric divergence of the code and carrier, it can be filtered for a very long time. The result is a measurement of the slowly varying ionosphere-induced error with the multipath greatly reduced in magnitude by the filtering. The series of pseudoranges are then reconstructed by adding the filtered version of the integration constant to the integrated Carrier Phase measurement.

Figure 26:
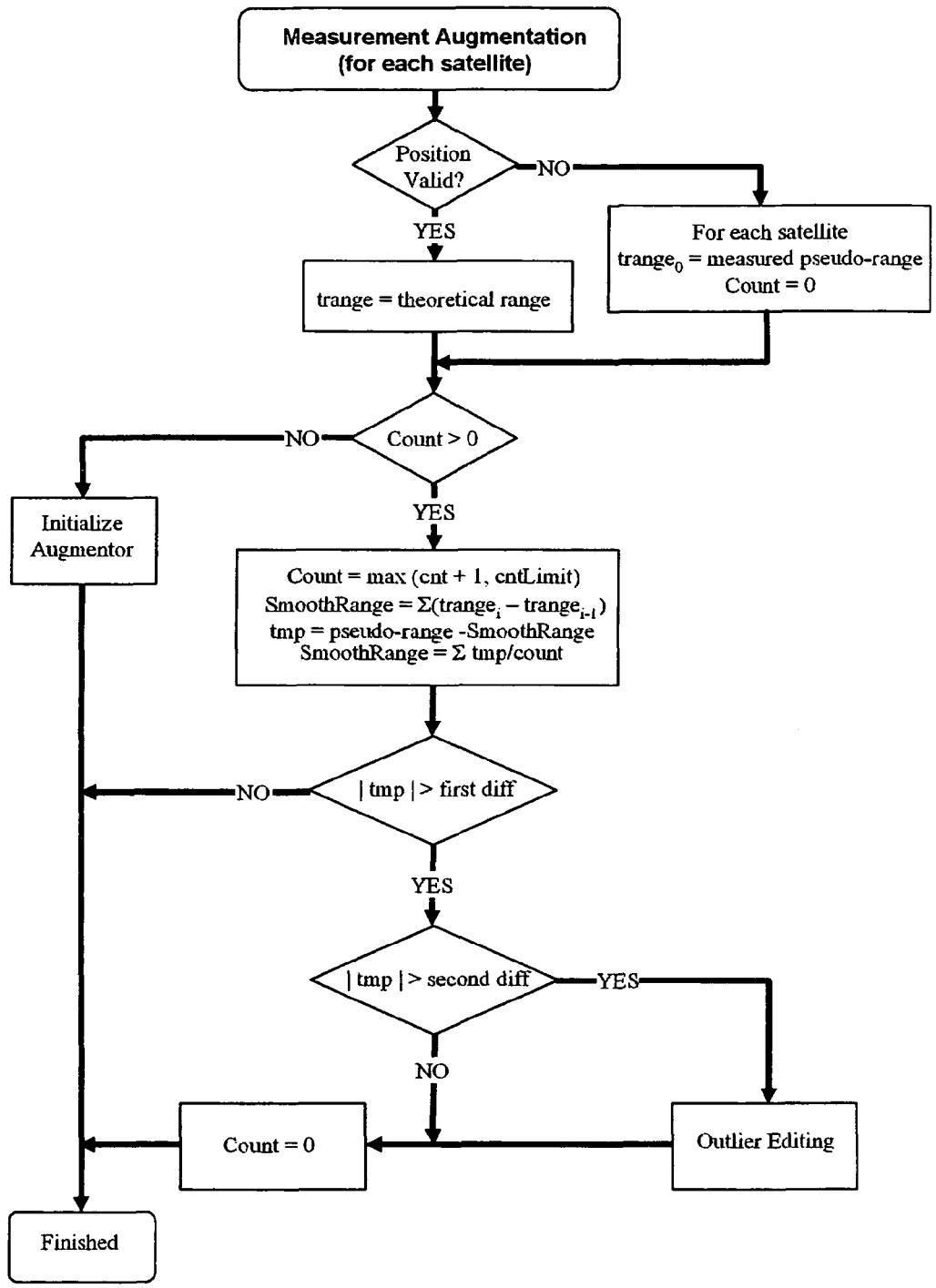
FIG. 26 is flow chart of a measurement augmentation procedure.
Figure 28:
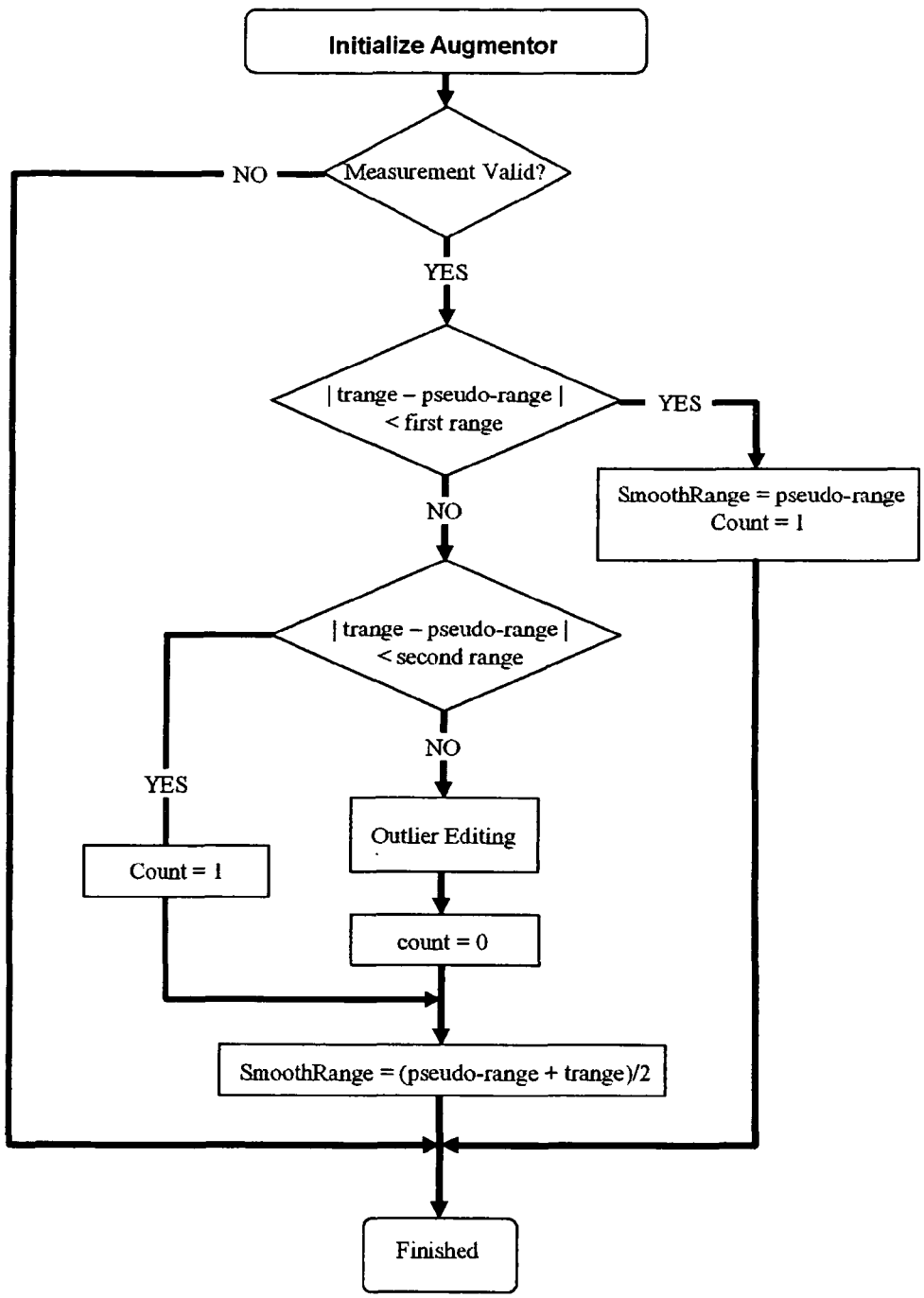
FIG. 28 is a flow chart of an augmentation initialization procedure.

The measurement augmentation technique according to embodiments of the present invention is depicted in FIG. 26 and FIG. 28. In general, the measurement augmentation technique creates a pseudo-Carrier Aided Smoothing by computing a smoothed range quantity for each satellite, hereinafter referred to as "SmoothRange." The SmoothRange is the theoretical range plus a percentage of the difference between the theoretical range and the measured range. The percentage is decreased, as more measurements are included, up to a defined minimum percentage, hereinafter referred to as "SmoothLimit." The SmoothRange is only updated for satellites that have a current valid measurement and the time since the last update is less than a prescribed limit. If the time since the last update is greater than this limit, the augmentor is reset and SmoothRange is re-initialized.

As shown in FIG. 26, the measurement augmentation technique is started by first determining whether a current valid measurement from a satellite has been established. If not, the theoretical range is established as the measured pseudorange and the SmoothRange value is initialized as shown in FIG. 28. That is, the count value is set to zero and that zero value results in the invocation of the augmentor initialization steps of FIG. 28.

As shown in FIG. 28, the SmoothRange value is initialized with the measured pseudorange and a count value is set to 1, unless the pseudorange is more than a first range value, preferably 50 meters, different from the theoretical range. If the difference between the measured pseudorange and the theoretical range is greater than a second range value, preferably 100 meters, the outlier editing technique described below is used to determine whether to use the measurements in the navigation solution and a count value is reset to 0. If the difference is less than the second range value, the count value is set to 1. In either case, the SmoothRange value is initialized as the average of the pseudorange and the theoretical range.

Returning to FIG. 26, after the SmoothRange value has been initialized and after another valid measurement, the SmoothRange value is updated. If the difference between any new measurement and the previous SmoothRange, plus the incremental theoretical range (equivalent to the integrated Carrier Phase used in CAS) since the last computation of SmoothRange, is greater than a first defined difference, preferably 100 meters, the augmentor for that satellite is reset, and must be re-initialized with a new measurement. If the difference between any new measurement and the previous SmoothRange, plus the incremental theoretical range since the last computation of SmoothRange, is greater than a second defined constant, preferably 175 meters, including during initialization, the outlier editing technique described below is invoked.

Embodiments of the present invention may also provide a determination of measurement errors that are so large such that a measurement should not be included in the navigation solution calculations for a unit. This determination is provided by a technique, hereinafter referred to as the outlier editing technique, that provides for the exclusion of measurements determined to be inconsistent with other measurements or the solution state. The outlier editing technique is used to determine if a measurement should be excluded from the measurement augmentation technique described above. The outlier editing technique may also be used in determining the correct set of measurements to use to establish the "initial conditions" for the re-normalization technique described below. The editing applies consistency metrics and statistical tests to determine whether a measurement should be classified as an outlier, and, therefore, excluded.

Figure 27:
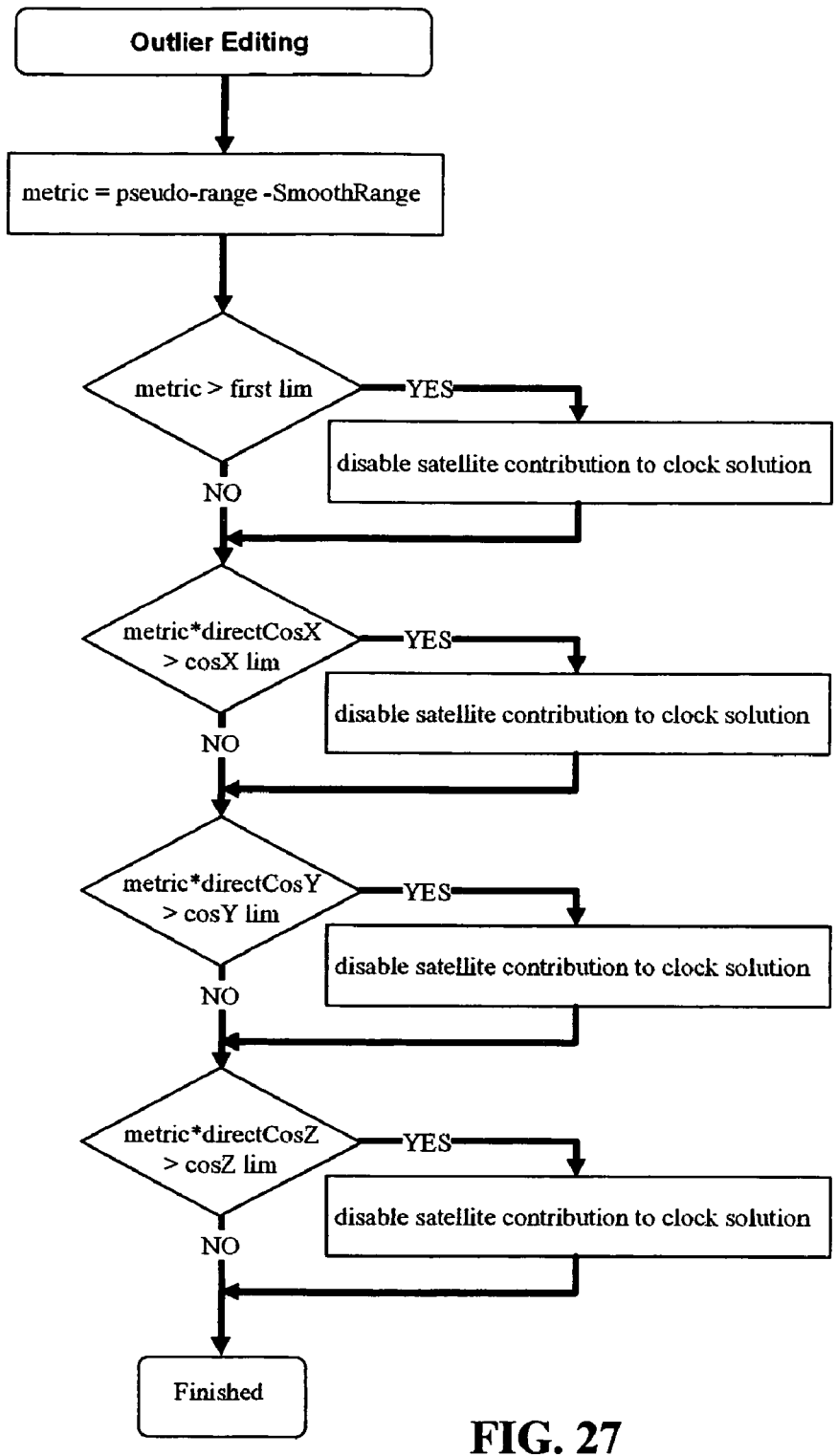
FIG. 27 is a flow chart of an outlier editing function.

Outlier editing attempts to remove any measurement that does not generally agree with the other measurements contained in the measurement suite that will be used in the position calculation. As shown in FIG. 27, this is done on a coordinate axis basis, i.e. if the error for a particular measurement is greater than a defined constant, preferably 175 meters, in a particular axis (x,y,z,b), then it is removed from the navigation filter update for that axis. This is accomplished by calculating the dot-product of the line-of-sight (LOS) error vectors and the direction cosines for that satellite, resulting in the x,y,z and clock(b) error components. Therefore, the contribution of a particular satellite to the computation of the clock offset is eliminated if the LOS error vector is greater than the defined constant.

When a filter is used as an estimator, it is preferred that the series of measurements taken during a positioning session all contain an identical initial condition, i.e. any measurement biases must be consistent over the entire interval and identical in all measurements. This is not always the case for receivers that report single measurement sets that are unrelated to other measurement sets reported at different times. Lower cost receivers may demonstrate this condition. Such measurements could easily contaminate a solution created by an estimator with memory. Embodiments of the present invention use a technique, hereinafter referred to as the measurement re-normalization technique and depicted in FIG. 25, to detect this condition and re-normalize the measurement set such that the measurement set contains a consistent initial condition with the measurements taken during the positioning session.

Estimating the average range residual for the suite of measurements begins the mitigation process for this possibly changing initial condition. The range residual for each satellite is the difference between the measured pseudo-range and the theoretical range to the satellite. The measured pseudo-range includes any clock error between the receiver and the satellite, so, if the time base used to measure the pseudo-range changes from one measurement to the next, residuals will change as well. Since the time base used to measure the pseudo-range is often based upon the Cellular Base Station clock, if the Base Station servicing the user changes, a step in the time base will be experienced. This clock (or common range) step creates a discontinuity in the pseudo-ranges for the satellites. A receiver attempting to filter the pseudo-ranges, as part of the positioning process, will experience an error impulse causing the position to contain a transient error, while the new common clock error is estimated and removed.

The average range residual and a population standard deviation (C) is calculated across the entire suite of satellite pseudo-ranges that are available for a particular measurement epoch. The sigma is then filtered with a low pass filter, and a threshold is created that is a constant, preferably 2 times the filter output, but limited to a specified range value, preferably 100 meters. The satellite that has the largest difference between its range residual and the calculated mean range residual for the current suite of measurements is identified. This identified maximum difference is compared to the threshold that was just calculated. If this maximum difference is larger than the threshold, the associated satellite is removed from the suite of measurements that will be used to recompute the mean and standard deviation of the residuals. The mean and standard deviation low pass filters are restored to the previous states to remove the impact of the contaminated inputs, and the process of calculating the mean and standard deviation is repeated. If this maximum difference is smaller than the threshold, the mean residual low pass filter is updated with the new mean residual value, and then each pseudorange of the entire measurement suite is modified by subtracting the surviving mean residual from the pseudorange. This removes any step change in reference time and maintains a consistency of initial conditions necessary for the navigation filter to estimate the position coordinated without the step time errors propagating into the position coordinate states.

Navigation Process Embodiment

Figure 25:
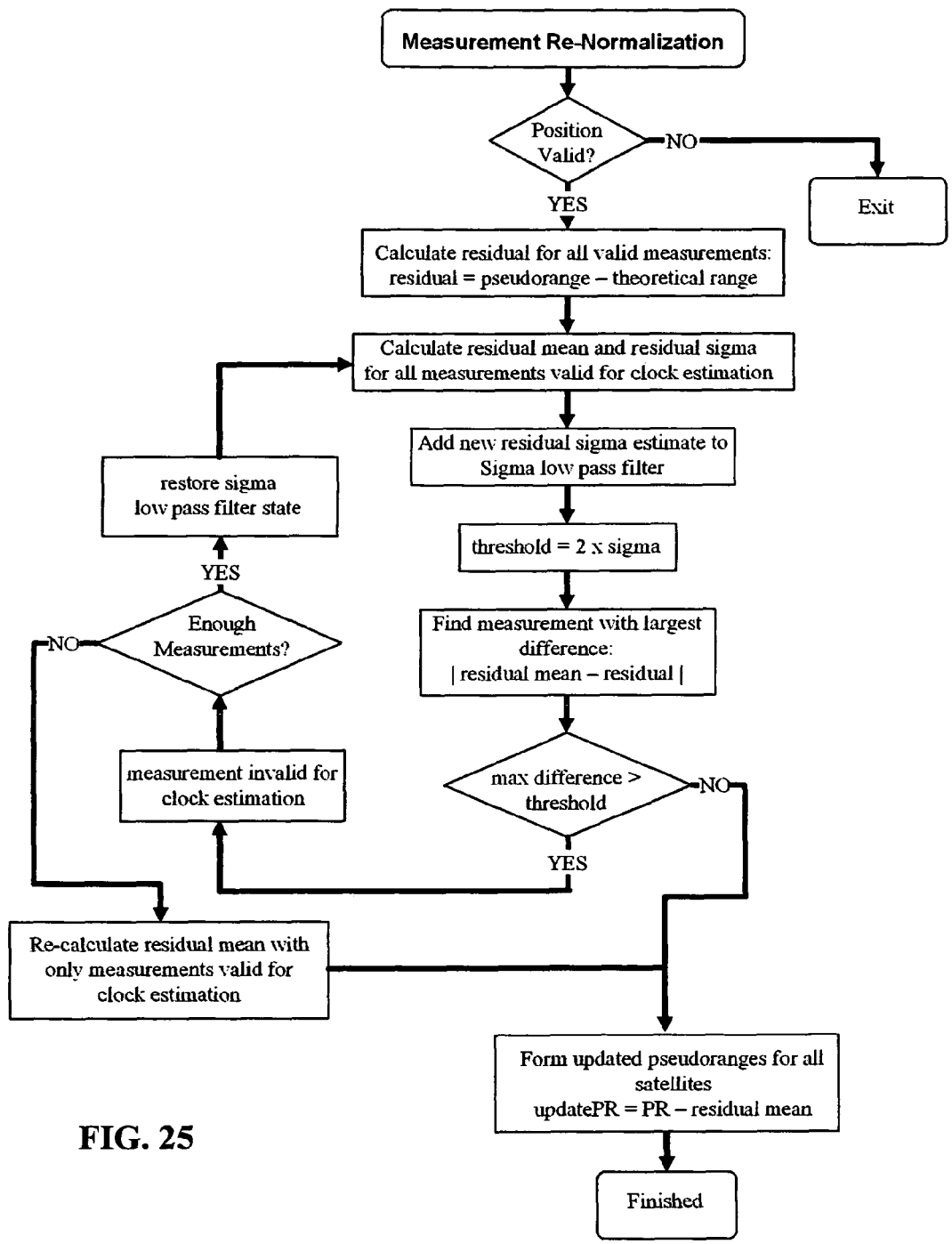
FIG. 25 is a flow chart of a measurement renormalization procedure.
Figure 29:
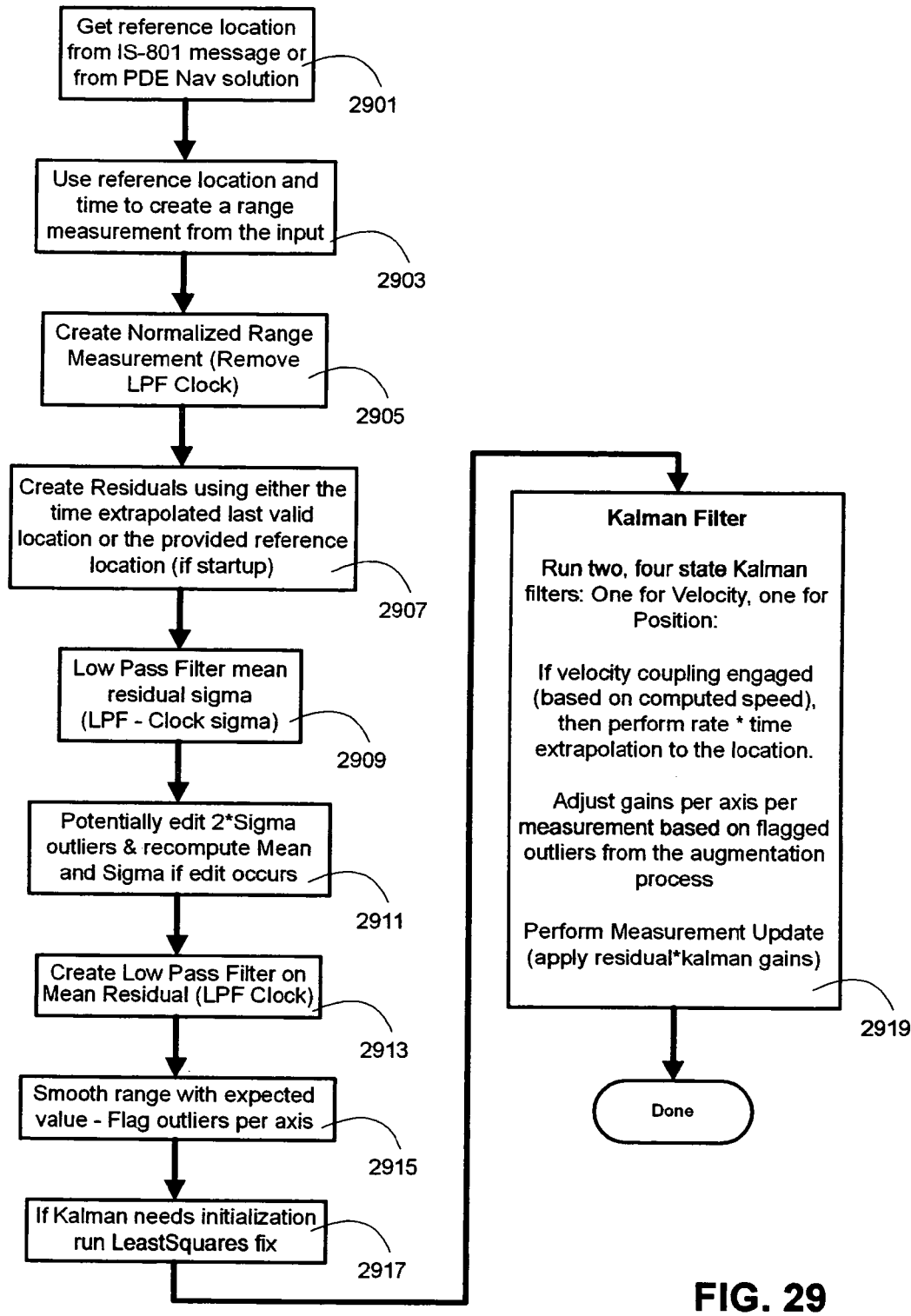
FIG. 29 shows an overall flow chart of a navigation process.

FIG. 29 illustrates how the measurement improvement techniques described above may be used to improve navigation results. In step 2901, the location of the location measurement data source is determined. As shown in step 2903, knowledge of the location of the location measurement data source along with the location data produced by the location measurement data source and received by the location subject provides range data. Step 2905 provides for normalizing the range measurements. Steps 2907 to 2913 summarize the steps used for measurement renormalization as depicted in FIG. 25 above. Step 2915 summarizes the steps used for measurement augmentation and outlier editing as depicted in FIGS. 26 and 27 above. Then, as shown in steps 2917 and 2919, Kalman filtering may be used to provide position and velocity updates. The Kalman filters may also produce corrected time and heading values.

The measurement improvement techniques described above may be performed within each location subject making navigation measurements, i.e., within each controller and rover or tag, or within a separate application server, or some combination thereof. If the device making measurements also performs the measurement improvement techniques described above, the devices may provide both the improved position information along with the original measurements to any device or system requesting the position information. If the measurement improvement techniques are being performed within an applications server, each device making measurements will provide the original measurement data to the server and the server will calculate the position and velocity of each device based on the measurement improvement techniques and will then provide calculated device positions and velocities to requesting devices and systems.

When the measurement quality is sufficiently high and it is determined that the majority of the measurement noise is correlated between a controller and a rover, direct calculation of the relative distance and bearing between the controller and rover is preferred. High quality position sensors, such as carrier tracking GPS receivers in physical environments permitting carrier tracking, experience high spatial correlation of the largest error sources. In such environments, one can take advantage of this high correlation by employing, effectively, differential measurements to provide very accurate relative distance and bearing information. Preferably, these calculations are performed within an estimator such as a Kalman filter.

However, when the measurement quality of the positioning sensor is not sufficient to achieve high quality relative navigation, usually caused by the dominant error sources being random in nature and/or having low spatial correlation, it is preferred that the individual positions and bearings of the controller and navigator be calculated, if the pseudorange measurements are available from these devices. The measurement enhancement techniques described above may be used to extract the maximum information possible from a series of measurements taken during a "Positioning Session." Velocity estimation derived from Doppler measurements or from finite differences of noisy pseudoranges is typically dominated by the measurement noise when the mean is small (i.e., at low velocities). Hence, random walk of the extrapolated position can be the result of this noisy velocity. To prevent this, embodiments of the present invention may employ a random walk detector that decouples the velocity estimate from the position extrapolation. The augmentation and renormalization techniques described above may also be used to maintain measurement consistency over a positioning session.

The results provided by the calculations based on the absolute positions of the controller and rover may not be as precise as the calculations based on the relative positions, but the results will be significantly enhanced by the techniques described above over the results obtained from a single set of measurements.

Figure 33A:
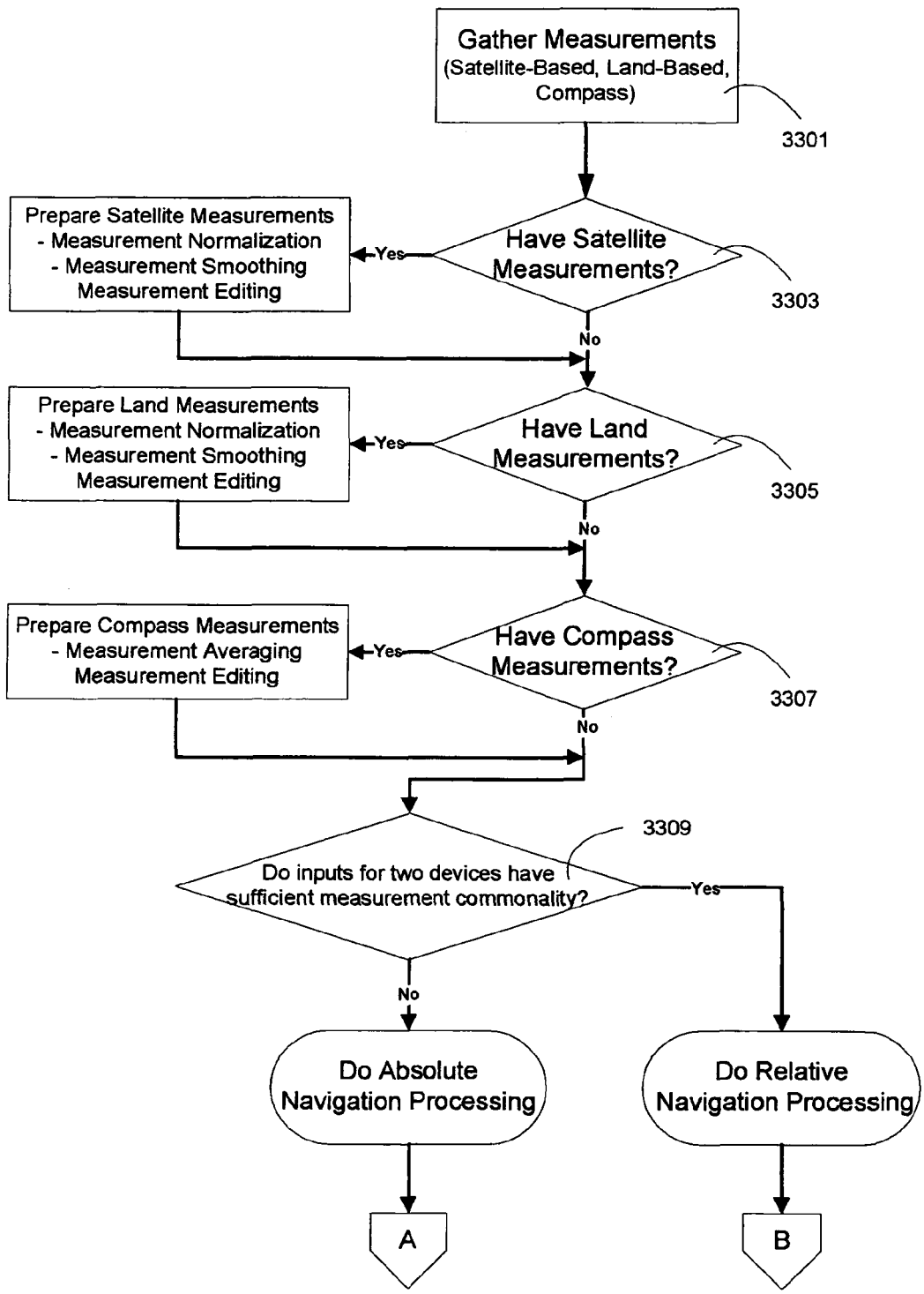
FIGS. 33A and 33B present a flow chart showing a navigation process.
Figure 33B:
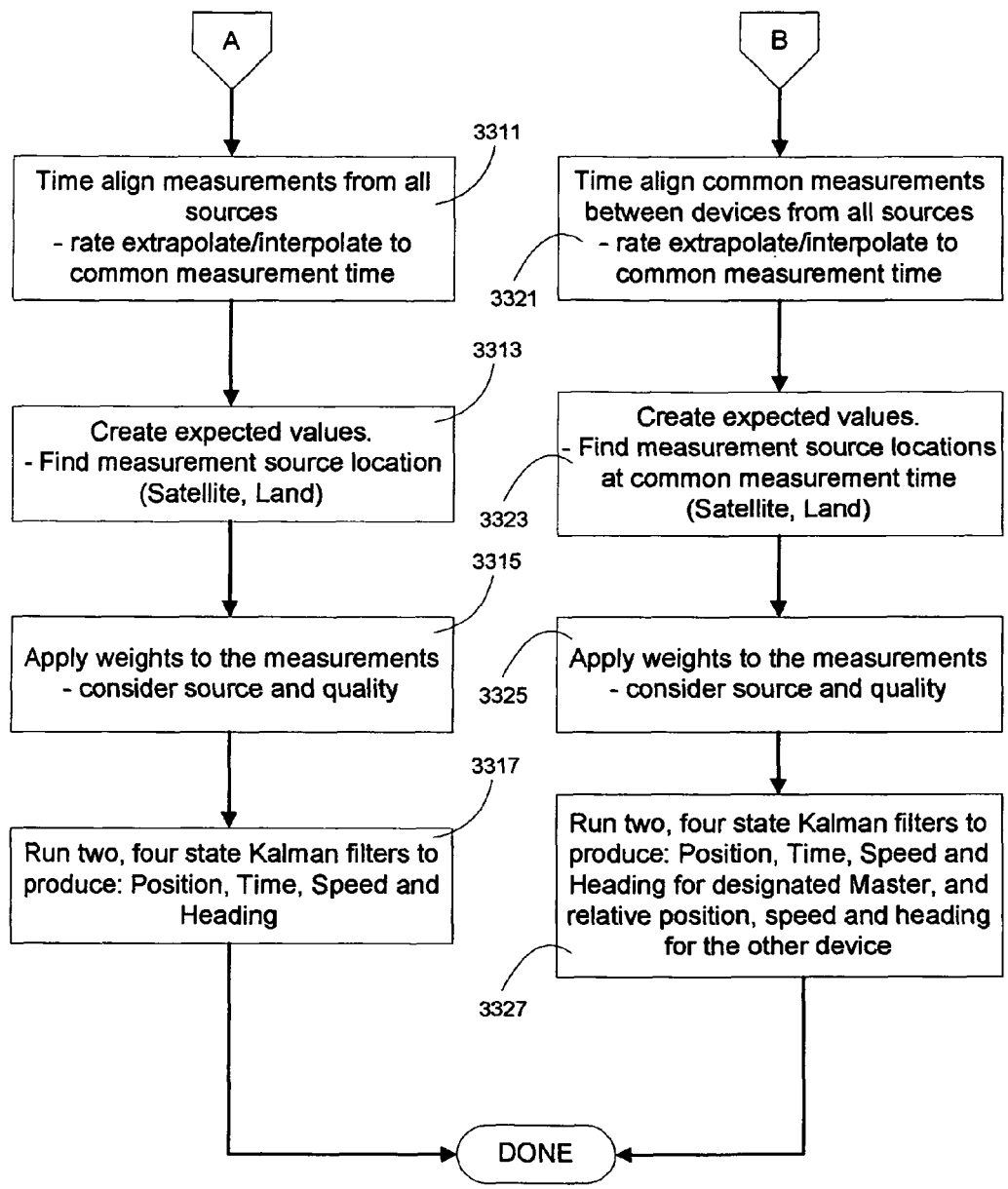

FIGS. 33A and 33B illustrate the steps for producing improved measurements in either the absolute navigation case, where the navigation data for two (or more) location subjects are separately calculated, or the relative navigation case, where the navigation data is calculated on the basis of designating one location subject as a master device (e. g. a controller) and one or more location subjects as slave devices (e. g. a rover or tag) and calculating relative navigation data between the master and slave. FIGS. 33A and 33B also illustrate that the navigation solution may be based on a "blended" solution, where data from multiple positioning sources may be used.

Figure 30A:
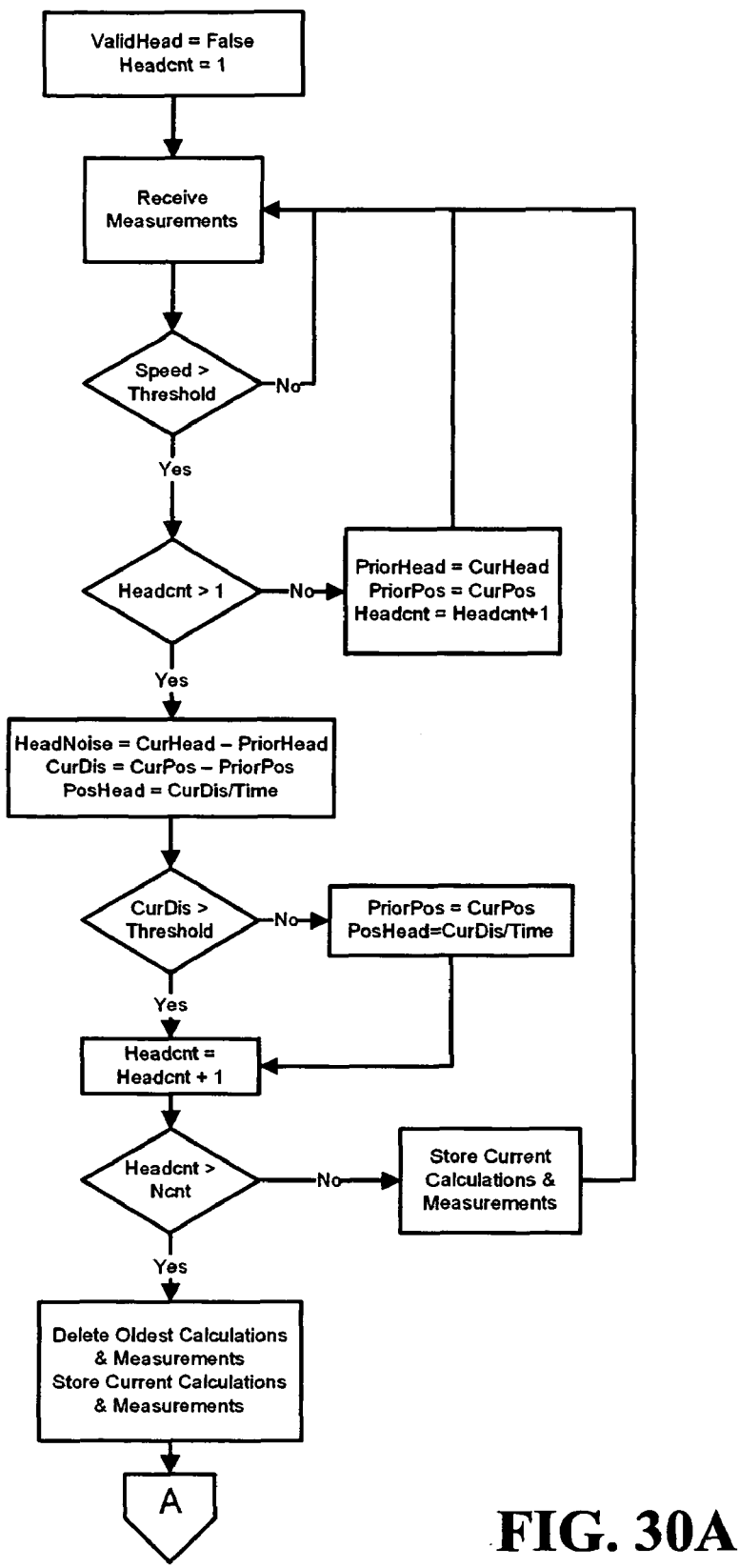
FIGS. 30a and 30b present a flow chart of a heading smoother procedure.
Figure 30B:
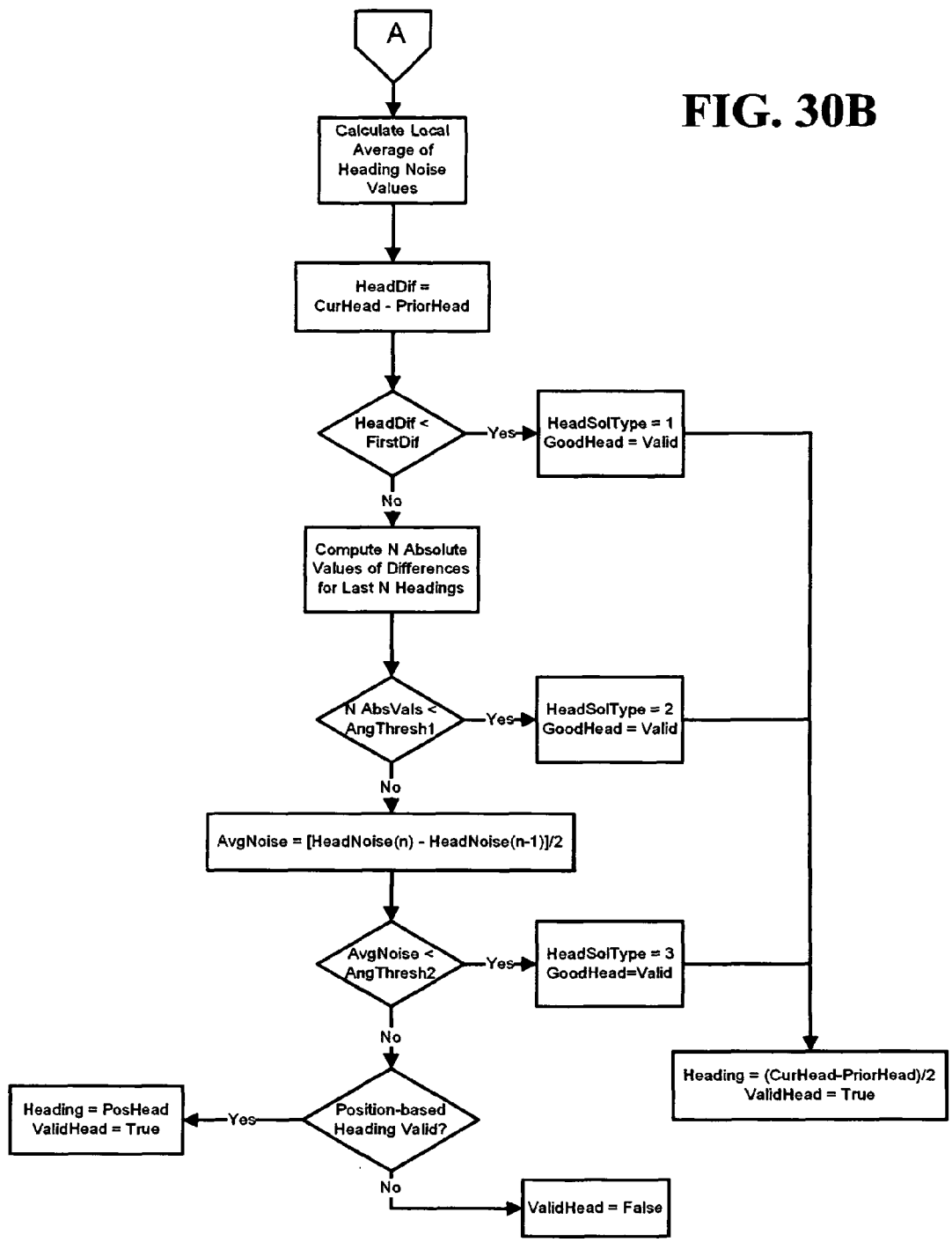

Step 3301 in FIG. 33A shows that measurement data may be obtained from satellite-based location measurement data sources, land-based location measurement data sources, or even compass data obtained from a compass source onboard the device for which navigation data is to be determined. Satellite-based location measurement data sources may be, for example, GPS satellites. Land-based location measurement data sources may be, for example, cellular telephone-based systems such as network wireless triangulation using Time Difference of Arrival (TDOA), Advanced Forward Link Trilateration (AFLT), Enhanced Observed Time Difference (EOTD), and/or Angle of Arrival (AOA). Step 3303 shows that if satellite measurements have been made, the measurement improvement techniques as depicted in FIGS. 25-28, i.e., the measurement normalization, smoothing and editing techniques shown in FIGS. 25-28, may be used to improve these measurements. Similarly, step 3305 shows that the same measurement improvement techniques may also be applied to measurement data obtained from land-based sources. Note that while step 3303 shows satellite measurements and step 3305 shows land measurements, other embodiments may use measurements from two or more different satellite-based systems or two or more different land-based systems or any combination thereof. Step 3307 shows that compass measurements may also be made and improved by averaging the compass data or editing measurements that are not consistent. FIGS. 30A and 30B and the associated text below depict and describe additional techniques that may be used for measurement editing.

The decision whether to perform absolute navigation processing or relative navigation processing may be based on whether there is sufficient commonality between the location measurement data sources for the location subjects for which navigation data is to be produced, as shown in step 3309. For example, if the GPS measurement data for two location subjects is obtained from the same set of GPS satellites, relative navigation processing may be preferred. On the other hand, if, for example, one location subject receives its measurement data from four GPS satellites, and another location subject receives its measurement data from four different GPS satellites, absolute navigation processing may be preferred. The determination of sufficient commonality may be different in different situations and may be determined based on empirical data, theoretical data, or based on some defined settings. The removal of measurement data from specific location measurement data sources by measurement editing may also impact the determination of sufficient commonality. For example, if the outlier editing shown in FIG. 27 results in the measurements from a specific location measurement data source being dropped, this may impact the determination of sufficient commonality.

FIG. 33B depicts the steps that may be taken after it is determined whether to perform absolute or relative navigation processing. When measurement data from multiple sources (satellite-based, land-based, compass, etc.) is used, it is important that the measurements be time aligned. Steps 3311 and 3321 depict the alignment of the measurements by extrapolation, interpolation, or some other technique, so that the measurement data from the different sources is modified to appear that all of the measurements were made at a common time. Steps 3313 and 3323 show the creation of expected position values based on the modified measurement data. The expected position values may be derived from the determined position of the land-based and/or satellite-based location measurement data source of the measurement data. Step 3323 shows that if relative navigation calculations are being made, the expected position values should be based upon the positions of the location measurement data sources at a common measurement time.

Steps 3315 and 3325 show that the expected position values may be weighted based upon the source of the measurement data and/or the quality of the data. Various techniques may be used to determine the quality of the measurement data. For example, the quality of data from satellite-based measurement may be considered to be lower if certain components of the satellite-based measurements have been eliminated, as discussed above in regard to FIG. 27. Quality may also be determined to be less if the residual sigma estimate is larger, as discussed above in regard to FIG. 25. Weighting the data from the different measurement sources should blend the data to provide more accurate location data. Steps 3317 and 3327 show the use of a Kalman filter to provide position, time, speed and heading data. Step 3327 shows that position, time, speed, and heading data will be calculated for the master device and relative position, speed, and heading data (relative to the master) will be calculated for the slave device.

The techniques for improving measurements and calculating navigation data described above may be performed by position processing systems resident on the location subjects themselves or resident in other processing systems. The position processing systems may be one or more computers, microprocessors, microcontrollers, or other processing devices. The computer-executable instructions for executing the techniques may be resident in memory in the position processing systems or may be provided to the position processing systems by floppy disks, hard disks, compact disk (CDs), digital versatile disks (DVDs), read only memory (ROM), or any other storage medium.

Heading Consistency Embodiment

Further improvements to the heading or bearing information provided by embodiments of the present invention may also be provided by examining the consistency of that information. Embodiments of the present invention are likely to be deployed in situations where large excursions in the values of measurement parameters such as position, velocity, heading, or bearing are not expected. That is, it is unlikely that these values will change greatly in a matter of seconds. However, in challenging measurement environments, such as an environment in New York City for GPS measurements, the GPS receivers may generate measurements that show large changes in these measurements. Therefore, embodiments of the present invention incorporate techniques for detecting and smoothing out those large excursions.

A preferred technique for smoothing comprises a heading smoother that uses consecutive positions, heading and speed returned from a location subject with a location data receiver to optimize the output heading even in conditions when the location data from the location measurement data source is degraded. A location subject with a GPS receiver operating in poor GPS conditions would be an example where the heading smoother may be advantageous. The technique will first store up to "n" consecutive sets of measurements. For example, a system that receives input about every 10 seconds may use three consecutive sets of measurements. Once the "n" sets of measurements are received, the older sets of measurements are removed in a first-in first-out order so that the latest sets of measurements are always used. The measurement information may be taken directly from the location data receiver. A measurement of the noise level of this measurement may be used, if provided by the location data receiver. Otherwise, taking the differences between the current and previous measurements will be used to derive the noise levels.

For example, if the measurement parameter to be smoothed is heading, embodiments of the present invention may use two techniques to determine the heading. First, the location data receiver supplied headings will be compared against an angular displacement threshold. If the headings are determined to be within a defined threshold, the output heading will be the running average of the prior heading and the latest heading measurement. Second, if the location data receiver supplied heading input fails the threshold test, a heading may be computed by projecting the difference vector between a current geodetic location and a previous or anchor geodetic location onto the horizontal plane at the user's location.

FIGS. 30A and 30B illustrate the steps to smooth a heading value according to an embodiment of the present invention. Starting with FIG. 30A, it is noted that heading data may not be valid for very low velocities, so a check is made to see if the velocity is above a certain threshold. A check is then made to see if multiple heading measurements have been made. If so, a heading noise value is calculated as the difference between the current heading and the previous heading. A distance and heading is also calculated based on the current and prior geodetic positions. If the calculated distance is greater than a distance threshold (preferably 75 meters), the current position value is saved (by setting the prior position value equal to the current position value) and proceeding through the logic as discussed below. The "prior position" value may also be considered an anchor position value where the anchor position value is the first received position value. Additional position values may be obtained, but if they are less than the threshold value distance away from the anchor position, the anchor position value is preferably not updated. The position based heading (PosHead as shown in FIG. 30A) is the heading based on the difference between the current position and the anchor position. Proceeding through the remaining logic as shown in FIG. 30A, if fewer than the desired number of heading measurements have been made, the current heading and current heading noise values are stored and the system is set up to take another measurement. If enough measurements have been made, the oldest calculations and measurements are deleted and the latest measurements and calculations are stored for use.

FIG. 30B then shows the steps to determine if the current heading value is consistent. If enough measurements have been made, the "n" most recent measurements are examined. A local average of the heading noise value is calculated from the average of the current and "n" most recent heading noise values. The heading difference is calculated by subtracting the current heading from the previous heading. If the absolute value of the difference is less than a first threshold, preferably 10, the heading is considered to be valid and the heading solution type is "1." If the absolute value is greater than the threshold, a set of differences is calculated from the last "n" headings. That is, the current heading is subtracted from the previous heading to provide a first difference, the current heading is subtracted from the second previous heading to provide a second difference, the previous heading is subtracted from the third previous heading to provide a third difference, etc. If the absolute value of all these differences is less than a first angular threshold, the heading is considered to be valid and the heading solution type is "2." If the heading is still not found to be valid, the last two noise heading values are averaged. If the average noise heading is less than an angular noise threshold, the heading is considered to be valid and the heading solution type is "3." If these tests indicate that the heading is valid, the last two headings are averaged to provide a final heading estimate. If the tests provide that there is no valid heading, the final heading estimate will be based on the heading from the current and prior geodetic positions and considered to be valid and the heading solution type is "4." The heading solution type may be used to determine the quality of the heading solution.

Additional Applications

The capabilities and methods outlined will enable the roll out of other applications including:

1. Voice Recognition—Incorporating voice recognition either at the handset or the server where the tracking application can be interacted with through voice prompts. For example "Find John", "Find Honda", "Find Me", etc.

2. Guidance for the blind—A handset can utilize the relative techniques disclosed to provide a blind person with accurate guidance as to how to navigate to a destination. For example, the user can preprogram locations of interest/way points be they home, supermarket, mom's house, etc., and when requested, the handset can give audible information to the user as to how to get to the destination of desire. For instance "walk straight 50 feet, now turn left 40 feet, etc." until the destination is reached. The way points can either be programmed as lat/long, address, or getting a lat/long fix when the user is at the destination for it to be placed in memory. The user can interact with the handset either through the keypad or voice recognition as previously described.

3. Find location of interest—The user can request location information of targets of interest such as stores or restaurants. The application can search a server database to locate the nearest 2 or 3 targets closest to the user's location (lat/long). The information can then be presented to the user on a map on the handset showing the user the targets as well as the user's location. Navigation information to the target as well as bearing and distance can be provided. The user can interact with the handset either through the keypad or voice recognition as previously described. The FIND function of the system can also be used as an aid in finding a location of interest, which can be referred to as a FIND IT function. When the geocoded location such as (Latitude and Longitude) of a point of interest is known from some external source, the FIND function can display not only a map showing the location of the point of interest but also a bearing arrow showing the direction to be traveled to reach the point of interest. In addition, other useful data such as direct distance and/or distance given in compass direction can be shown. For example the user can be given information that the target location is 2.1 miles south and 0.5 miles east. Geocodes for points of interest or addresses can be obtained by having the controller call a server which has been set up for this purpose and the server will download to the controller the geocodes for each point of interest or address on the controllers FIND IT list or alternatively in the controller's address book. The address book is an application, which can be resident on the phone or PDA on which the system is installed.

4. Traffic information—The user can receive updated traffic information as he is traveling. The information can be provided on the handset utilizing the map showing his location as well as nearby and upcoming streets/highways. Streets/highways where traffic is slow/congested can be highlighted in red. The user may be able to request detail information about a red zone by clicking on it or highlighting it. The user can interact with the handset either through the keypad or voice recognition as previously described.

5. Other public/private information—Various other public data can be provided on the handset. For example, the user can request the location of a particular bus or train line in his area. This way he can assess which bus or train to catch. This information can be provided on the map in real-time. This capability can be extended to any other public or private application such as school buses, car services, taxis, etc. The only requirement is that the application needs access to a database where the information is maintained. The user can interact with the handset either through the keypad or voice recognition as previously described.

6. Self Navigation—In addition to finding "Me" which displays the user's current location on a map, the user can also enter a fixed destination such as an address. The destination can be entered either through the keypad or voice recognition. The system can then display the location of the destination in addition to the user's current position on the map for self navigation purposes. The system can also provide turn-by-turn instructions to the user to help in navigating to the destination.

7. Zones. Embodiments of the present invention may also provide the ability to establish whether a device is within or outside of a defined zone. This capability may be represented by ACTIVATE ZONE button 118 shown in FIG. 15 and described above. The zone may be defined as geographical areas with boundaries and may also include whether a device is inside or outside a particular area during some specified period of time. Business rules may be created for a zone that includes the effective date(s), day(s) of the week, and hours of the zone. "Event" zones may also be created to determine whether a specified device is within a selected area or areas. For example, an event zone may be set up for a parent to determine whether a dependent child is at school during school time and at home after school.

Cellular networks may be particularly adapted to provide the desired zone features according to embodiments of the present invention. Preferably, zones according to embodiments of the present invention minimize the traffic load on the carrier's network, while providing a system that meets the accuracy and timeliness requirements. The term: "zone" is defined to include all of the parameters pertaining to a geographical zone, the time of applicability, and whether or not the area is one of exclusion or inclusion. The business rules may allow for bandwidth to be minimized. Because a zone has a "Time-of-applicability" associated with it, the first step in zone detection is to verify whether or not a zone is active. A zone is active if the current time falls within the time bracket of the defined zone for a particular system. Once it is established that a zone is active, embodiments of the present invention attempt to determine where a device is with respect to any zone boundaries. In a cellular network, an examination of the base station identification information for the base stations that are within range, coupled with a base-station almanac that includes the general location information of the base station, can provide a neighborhood estimate of a user location. This location is tested against the zone to determine if a more precise estimate is necessary. In certain networks more advanced base-station almanac information is available, where the sector angle and signal range are provided, which can further tighten the rough estimate of user location. As long as it is determined that the user is not "near" a zone border, this type of location estimate is used to avoid a costly connection to the system resources. The determination of "near" a border is based on a number of factors such as: calculated distance to the nearest boarder, location estimate figure of merit (confidence in the location estimate) and velocity. If it is determined that the device in question is "near" a border region, a more precise location estimate may be made.

Multiple measurements are made to calculate the user location to compare against the zone. The rate at which these calculations are made is based on the expectation of performance, determined by the accuracy and timeliness requirements. The determination of the interval period to the next zone integrity check may depend on the proximity of a device to a zone violation (i.e., being outside of an inclusive zone or inside an exclusionary zone), the speed and direction of a device with regard to the zone, the battery life remaining, the type of a fix, and other possible parameters. The interval can vary from a few minutes to a few hours depending on the weighting of those parameters. Longer interval periods may also decrease the use of system resources.

Embodiments of the present invention can be implemented in a service for users whose handsets are appropriately equipped with a specially programmed application server deployed by the service provider in communication with the communication network being employed. The application server does the filtering to obtain the most commonality of satellites or of land based sources of measurement data. The implementation of an application server as described above to filter measurement data and make calculations can be in a manner where the application server is co-located with the PDE or it can be located at a desirable location on the internet or any other accessible network. In this manner, application servers for other purposes, such as storing mapping data, can also be co-located with the PDE or can be located at a desirable location on the internet or any other accessible network. It is envisaged that such an application server could be implemented to calculate and provide data for a fee or as part of a chargeable service offered by service providers such as the cellular telephone network operators like AT&T, Verizon, Sprint and others.

Another method for achieving precise relative location of the rover with respect to the controller is to compute relative differential corrections from the measurement taken at the controller and applied to the measurements taken at the rover. This is done by using pseudorange residuals from the measurements taken at the controller to create corrections and then applying the corrections to the rover measurements. The corrections can be generated either within the controller or within the network. The corrections can then be sent either in a proprietary message format or as standard RTCM 104 DGPS correction messages. Similarly the corrections can be applied at the network or at the rover or at the controller for the measurements taken at the rover. By "relative" DGPS corrections it is meant that even though the controller is not at a known static location, the controller's location can be calculated from the measurements taken at the controller, and the pseudorange residuals, relative to this computed location can then be used to create corrections.

Web Browser Embodiment

Figure 31A:
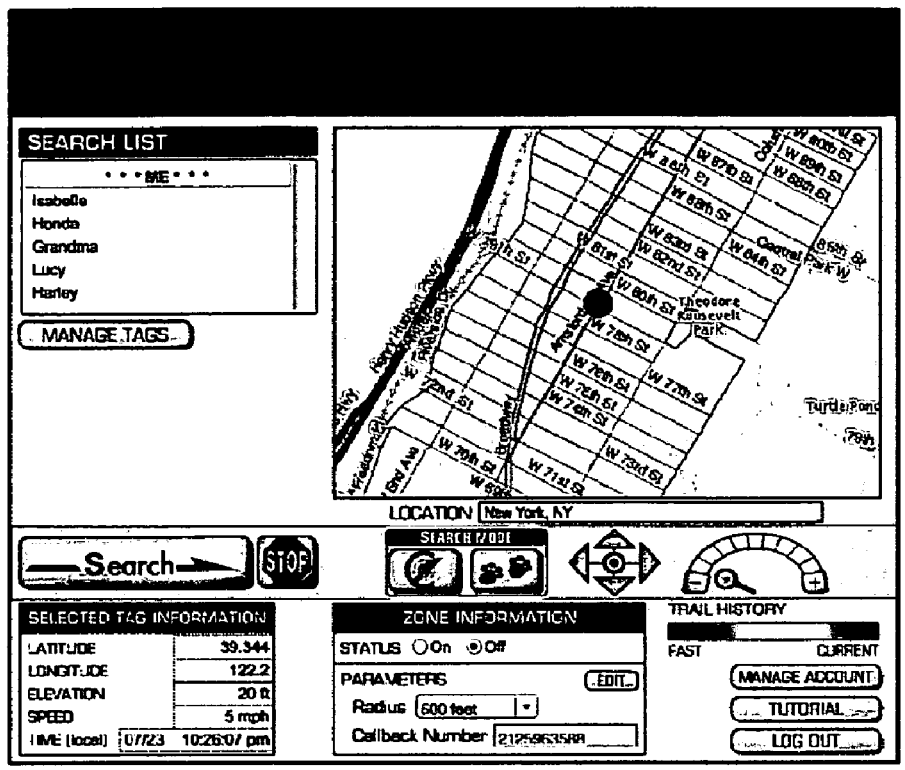
FIGS. 31A and 31B show sample web browser screens used for locating and tracking a device.
Figure 31B:
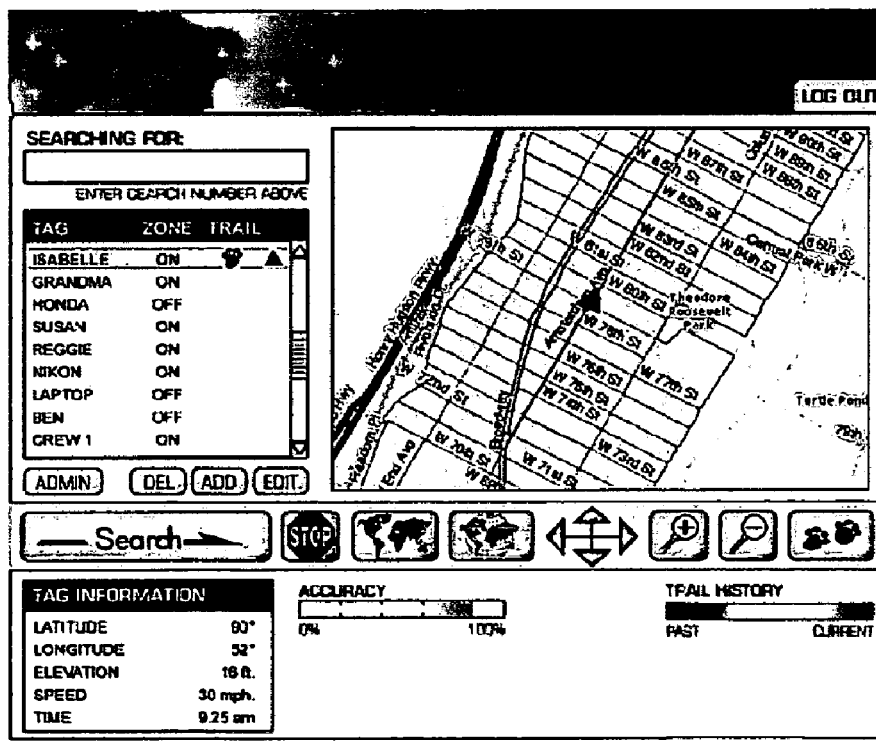

Embodiments of the present invention are not limited to locating and/or tracking a mobile rover or tag from a mobile controller. Other embodiments of the present invention provide that a mobile rover may be located or tracked using a web browser, such as Internet Explorer™. The navigation information regarding the rover may be reported to an application server, which may then provide that information over the Internet or other computer network to the web browser, either automatically or upon initiation by a user. FIGS. 31A and 31B show two examples of web browser screens that show the location of a tracked tag. FIG. 31A shows the location of a tag indicated on a map, and various controls and displays that may be used to provide information about the tracked tag, establish zones for the tag, or select other tags. FIG. 31B also shows the location of a tag on a map with a heading arrow and other controls and displays for tracking the tag or administering the tracking functions.

Figure 34:
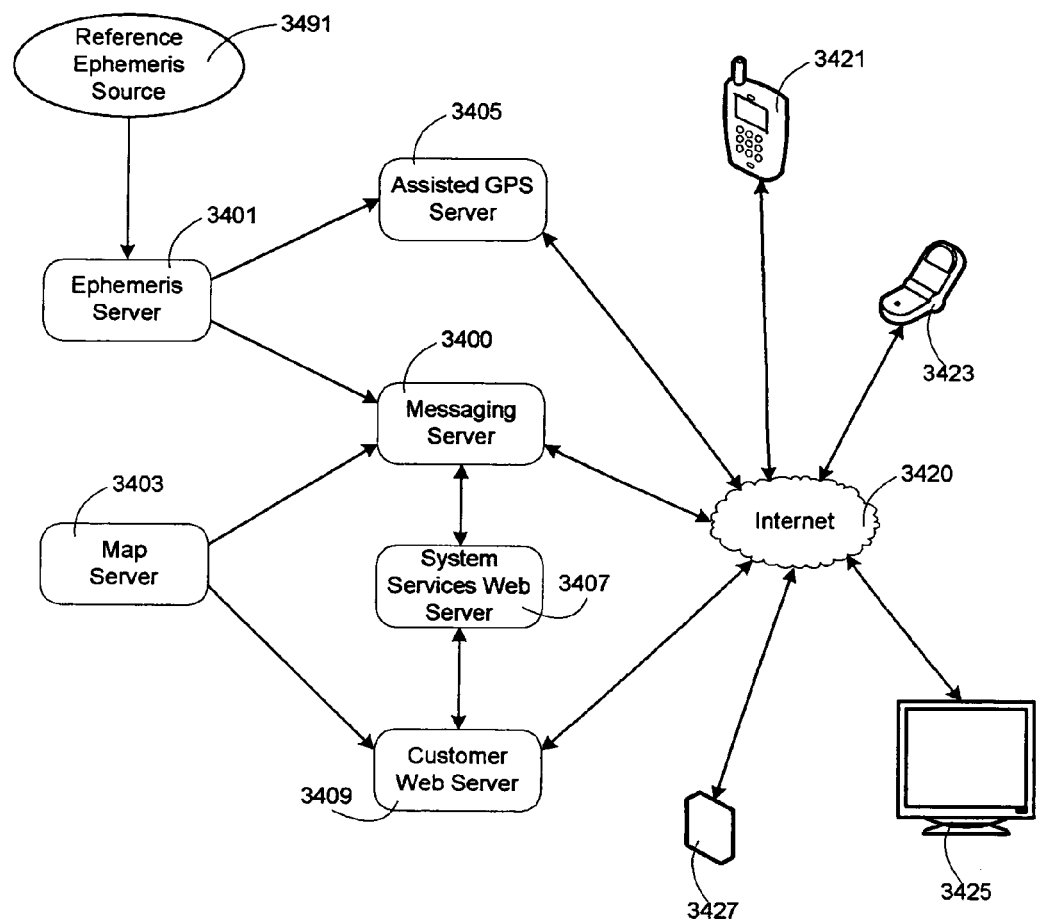
FIG. 34 shows a system according to an embodiment of the present invention.

FIG. 34 shows a system using the Internet for transfer of navigation data along with supporting the use of a web browser to track devices. The system shown in FIG. 34 shows many of the servers that may be used to transfer, extract, and process navigation data along with providing other processing and server functions to support device tracking. Many of these servers are particular embodiments of the application servers described above in regard to FIGS. 18, 19*a*, 19*b*, 20, 21, 22, 23*a*, 23*b*, 23*c*, 24*a*, and 24*b*. The devices that may act as controllers for device tracking include a cell phone 3423, a cell phone having assisted GPS capability 3421, and device 3425 having a web browser for receiving tracking information over the Internet 3420. Of course, the cell phones may also act as mobile rovers. A simple tag device 3427 having only the minimal equipment needed for tracking may also act as a mobile rover.

In FIG. 34, the messaging server 3400 provides the main conduit for navigation data transfer between devices such as mobile controllers, mobile rovers, tags, etc. The messaging server may also perform absolute or relative navigation data calculations, using data obtained directly from the tracked devices or via the proxy method described above and shown in FIGS. 24*a* and 24*b*. The messaging server 3400 may also provide additional functions, as described in additional detail below.

As discussed above and shown in FIG. 24*a*, an ephemeris source may be used to provide updated ephemeris data to devices using satellite-based measurement sources. FIG. 34 shows a reference ephemeris source 3491 providing ephemeris data to an ephemeris server 3401. The ephemeris server 3401 distributes ephemeris data to systems and servers that may use that data for satellite-based location determination. The messaging server 3400 and the assisted GPS cell phone 3421 are two devices that may use ephemeris data.

A map server 3402 may be used to provide rendered map images, location data (address, street names, sates, etc.) for a given latitude/longitude pair or for regions described by bounding sets of latitude/longitude pairs. This map data may be used by the messaging server 3400 and other servers that perform map data processing or map data display. An altitude map server, part of or separate from the map server 3402, may be used to send small portions of an altitude map covering a large area to a device or the message server 3400 so that the device or messaging server 3400 can more accurately compute the position of the device.

An assisted GPS server 3405 may use ephemeris data from the ephemeris server 3401 to provide specialized ephemeris data to the assisted GPS cell phone 3421. The specialized ephemeris data may use an industry standard protocol or a vendor proprietary protocol. For example, the assisted GPS cell phone 3421 may use the X1 assistance protocol. In that case, the assisted GPS server 3405 will receive the ephemeris data from the ephemeris server 3401 and process and transfer that data to the assisted GPS cell phone 3421 using the X1 assistance protocol.

Additional servers, such as a system services web server 3407 and a customer web server 3409, may be used to provide customer access to the system and to provide such functions as accounting, provisioning etc. As indicated above, the messaging server 3400 may also provide some of these functions. Additional functions that may be provided by any of these servers 3400, 3407, 3409 include security protection to ensure that devices are not tracked without explicit permission, privacy protection to ensure that position information is not being monitored, storage of accounting data, authorization to ensure that accounts using the system are active and paid, and, as indicated above, mapping processing and displays.

FIG. 34 shows that information transfer between the servers and the tracked and/or controller devices may be accomplished through the use of the Internet 3420. Other embodiments of the present invention may use other systems or mechanisms for information transfer, including, but not limited to, land-based wired or wireless networks, satellite-based wireless networks, optical networks, and any combinations thereof. Embodiments of the present invention are not limited to the use of the Internet for transfer of data among and between server devices and systems.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . "

What is claimed is:

1. A method for determining navigation data for a location subject having at least one location data receiver using location measurement data provided by one or more location measurement data sources of a location technology source, the method comprising:
   (a) establishing a location for the location subject
   (b) calculating one or more theoretical ranges from the location subject to the one or more location measurement data sources based on the location of the location subject
   (c) obtaining location measurement data via a location receiver of the location subject from the one or more location measurement data sources;

(d) calculating one or more augmented ranges from the one or more theoretical ranges and a percentage of a difference between the theoretical ranges and one or more range related parameters contained in the location measurement data;

(e) establishing an updated location of the location subject based on the augmented ranges; and (f) repeating steps (b) through (e) while decreasing the percentage of the difference between the one or more theoretical ranges and the one or more range related parameters until a defined minimum percentage is reached, wherein a range residual is calculated for each location measurement source providing location measurement data to the location subject and the method further comprises:

determining a mean range residual and a population standard deviation for range related parameters obtained from all location measurement data sources;

low pass filtering the population standard deviation;

identifying a location measurement data source having a largest difference between its range residual and the mean range residual; and comparing the largest difference with a defined maximum threshold and eliminating location measurement data from the identified location measurement data source from calculations.

2. A method for determining navigation data for a location subject having at least one location data receiver using location measurement data provided by one or more location measurement data sources of a location technology source, the method comprising:

(a) establishing a location for the location subject (b) calculating one or more theoretical ranges from the location subject to the one or more location measurement data sources based on the location of the location subject (c) obtaining location measurement data via a location receiver of the location subject from the one or more location measurement data sources;

(d) calculating one or more augmented ranges from the one or more theoretical ranges and a percentage of a difference between the theoretical ranges and one or more range related parameters contained in the location measurement data;

(e) establishing an updated location of the location subject based on the augmented ranges; and (f) repeating steps (b) through (e) while decreasing the percentage of the difference between the one or more theoretical ranges and the one or more range related parameters until a defined minimum percentage is reached, wherein the at least one location subject comprises at least two location subjects, wherein one location subject is a controller and another location subject is a rover and the method further comprises:

determining an extent of commonality between location measurement data sources providing location measurement data to the controller and to the rover;

if the extent of commonality is greater than a specified value, calculating absolute navigation data for the controller and calculating relative navigation data for the rover relative to the controller; and if the extent of commonality is less than a specified value, calculating absolute navigation data for the controller and calculating absolute navigation data for the rover.

3. The method according to claim 2, wherein the controller has a display and the method further comprises displaying a bearing line from the controller to the rover relative to the heading and position of the controller.

4. A method for calculating navigation data for one or more location subjects, the method comprising:

obtaining location measurement data at the one or more location subjects from a plurality of location measurement data sources of a location technology source;

generating augmented location measurements by one or more of the following three steps:

normalizing the location measurement data to maintain a consistent initial condition for a measurement set, smoothing the location measurement data, and eliminating any location measurement data outside specified limits;

time aligning all augmented location measurements;

determining expected position values based on time aligned location measurements;

filtering the expected position values and time aligned location measurements to provide calculated navigation data for the one or more location subjects, wherein the one or more location subjects comprise a controller and at least one rover unit and the method further comprises:

determining an extent of commonality between location measurement data sources providing location measurement data to the controller and to the at least one rover;

if the extent of commonality is greater than a specified value, calculating absolute navigation data for the controller and calculating relative navigation data for the at least one rover relative to the controller; and if the extent of commonality is less than a specified value, calculating absolute navigation data for the controller and calculating absolute navigation data for the at least one rover.

5. The method according to claim 4, wherein the controller has a display and the method further comprises displaying a bearing line from the controller to the at least one rover on the display relative to the heading and position of the controller.

6. A method for providing improved pseudorange values to a location subject using pseudorange data provided by a plurality of location measurement data sources of a location technology source, the method comprising steps of:

(a) obtaining pseudorange data at the location subject from each location measurement data source;

(b) establishing a position for the location subject;

(c) determining a theoretical range between the position of the location subject and each location measurement data source;

(c) calculating a plurality of range residuals, each range residual being calculated for each location measurement data source based on a difference between the theoretical range to the location measurement data source and the pseudorange data obtained from the location measurement data source;

(d) calculating a residual mean and a residual sigma for the plurality of range residuals;

(e) establish a threshold value based on the residual sigma;

(f) determine if a difference between the range residual for any one location measurement data source and the residual mean is greater than the threshold;

(g) if there is no difference greater than the threshold, calculate an improved pseudorange value for each location measurement data source by subtracting the residual mean from the pseudorange data obtained from that location measurement data source;
(h) if there is a difference greater than the threshold, determine if valid pseudorange data has been obtained from enough location measurement data sources to establish a position;
(i) if valid pseudorange data has been obtained from enough location measurement data sources, calculate an improved pseudorange value for each location measurement data source that has a difference less than or equal the threshold by subtracting the residual mean from the pseudorange data obtained from that location measurement data source; and
(j) if valid pseudorange data has not been obtained from enough location measurement data sources; add a low pass filtered residual sigma to the residual sigma and repeat steps (a) through (j).

7. A tangible computer-readable medium having computer-executable instructions for performing the method according to claim 6.

8. The method according to claim 6, wherein the location subject comprises a cellular telephone communicating with a cellular network, whereby the method improves a determined location for the cellular telephone.

* * * * *